(12) United States Patent
Rains, Jr. et al.

(10) Patent No.: US 9,706,623 B2
(45) Date of Patent: Jul. 11, 2017

(54) LEARNING CAPABLE CONTROL OF CHAOTIC LIGHTING

(71) Applicant: ABL IP HOLDING LLC, Conyers, GA (US)

(72) Inventors: Jack C. Rains, Jr., Herndon, VA (US); Januk Aggarwal, Tysons Corner, VA (US); David P. Ramer, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 256 days.

(21) Appl. No.: 14/476,341

(22) Filed: Sep. 3, 2014

(65) Prior Publication Data

US 2014/0375222 A1    Dec. 25, 2014

Related U.S. Application Data

(63) Continuation-in-part of application No. 14/303,643, filed on Jun. 13, 2014, now Pat. No. 8,994,291, which
(Continued)

(51) Int. Cl.
*H05B 37/02* (2006.01)
*G01J 3/50* (2006.01)
(Continued)

(52) U.S. Cl.
CPC ........ *H05B 37/0227* (2013.01); *G01J 1/4204* (2013.01); *G01J 3/50* (2013.01);
(Continued)

(58) Field of Classification Search
CPC .............. H05B 37/02; G01J 1/42; G06N 3/08
(Continued)

(56) References Cited

U.S. PATENT DOCUMENTS 5,404,298 A    4/1995   Wang et al.
5,877,490 A    3/1999   Ramer et al.
(Continued)

FOREIGN PATENT DOCUMENTS

CN    101315544 A   * 12/2008
CN    101957602 A     1/2011
(Continued)

OTHER PUBLICATIONS

Entire patent prosecution history of U.S. Appl. No. 14/618,690, filed Feb. 10, 2015, entitled "Chaotic Approach to Control of Lighting ."
(Continued)

*Primary Examiner* — Douglas W Owens
*Assistant Examiner* — Amy Yang
(74) *Attorney, Agent, or Firm* — RatnerPrestia

(57) ABSTRACT

At least one controllable source of visible light is configured to illuminate a space to be utilized by one or more occupants. A controller causes the source(s) to emit light in a manner that varies at least one characteristic of visible light emitted into the space over a period of time at least in part in accordance with a chaotic function. Responsive to user input, sensed activity, and/or acquired information, the source(s) are controlled by the controller in accordance with a lighting control function which may be modified based on learning by a device or system including the controller.

30 Claims, 25 Drawing Sheets

Related U.S. Application Data is a continuation of application No. 13/594,206, filed on Aug. 24, 2012, now Pat. No. 8,779,669, application No. 14/476,341, filed on Sep. 3, 2014, which is a continuation-in-part of application No. 14/252,397, filed on Apr. 14, 2014.

(51) Int. Cl.
| | |
|---|---|
| G01J 1/42 | (2006.01) |
| G01M 11/02 | (2006.01) |
| G06N 3/08 | (2006.01) |
| H05B 33/08 | (2006.01) |

(52) U.S. Cl.
CPC .............. *G01M 11/02* (2013.01); *G06N 3/08* (2013.01); *H05B 33/086* (2013.01); *H05B 37/0218* (2013.01); *H05B 37/0236* (2013.01); *H05B 37/0245* (2013.01); *Y02B 20/46* (2013.01)

(58) Field of Classification Search
USPC ........ 315/294–297, 152, 151, 307, 312, 158
See application file for complete search history.

(56) References Cited

U.S. PATENT DOCUMENTS

| | | | |
|---|---|---|---|
| 5,914,487 A | 6/1999 | Ramer et al. | |
| 5,926,385 A | 7/1999 | Lee | |
| 6,049,614 A | 4/2000 | Kim | |
| 6,377,858 B1 | 4/2002 | Koeppe | |
| 6,483,484 B1 | 11/2002 | Yamazaki et al. | |
| 6,542,077 B2 | 4/2003 | Joao | |
| 6,986,056 B1 | 1/2006 | Dultz | |
| 7,924,206 B2 | 4/2011 | Sano | |
| 7,990,252 B2 | 8/2011 | Barton | |
| 8,141,373 B2 | 3/2012 | Peterson et al. | |
| 8,160,729 B2 | 4/2012 | Ahmed | |
| 8,373,107 B2 | 2/2013 | Meyers | |
| 8,519,566 B2 | 8/2013 | Recker et al. | |
| 8,715,327 B1 | 5/2014 | Lovett et al. | |
| 8,760,074 B2 | 6/2014 | Raj et al. | |
| 8,779,669 B2 | 7/2014 | Ramer et al. | |
| 9,137,878 B2 | 9/2015 | Thompson | |
| 9,410,903 B2 | 8/2016 | Duncan | |
| 2002/0176455 A1 | 11/2002 | Triandaf et al. | |
| 2003/0151501 A1 | 8/2003 | Teckchandani et al. | |
| 2004/0212309 A1 | 10/2004 | St.-Germain | |
| 2005/0007779 A1 | 1/2005 | Nozawa et al. | |
| 2007/0141163 A1 | 6/2007 | Vitaliano et al. | |
| 2007/0247414 A1 | 10/2007 | Roberts | |
| 2009/0045748 A1 | 2/2009 | You | |
| 2009/0276062 A1* | 11/2009 | Kanai .................. A61B 5/16 700/45 |
| 2010/0141153 A1 | 6/2010 | Recker et al. | |
| 2010/0327766 A1 | 12/2010 | Recker et al. | |
| 2011/0031806 A1 | 2/2011 | Altonen et al. | |
| 2011/0062888 A1 | 3/2011 | Bondy et al. | |
| 2011/0133649 A1 | 6/2011 | Kreiner et al. | |
| 2011/0133655 A1 | 6/2011 | Recker et al. | |
| 2012/0007515 A1 | 1/2012 | Krummel | |
| 2012/0169490 A1 | 7/2012 | Yu et al. | |
| 2012/0206050 A1 | 8/2012 | Spero | |
| 2013/0093599 A1 | 4/2013 | Duncan et al. | |
| 2013/0293115 A1* | 11/2013 | De Groot ........... H05B 37/0227 315/152 |
| 2014/0058566 A1* | 2/2014 | Rains, Jr. ............... G05B 15/02 700/276 |
| 2015/0156848 A1* | 6/2015 | Ramer ............... H05B 37/0209 315/297 |

FOREIGN PATENT DOCUMENTS

| | | | | |
|---|---|---|---|---|
| NL | WO 2010079388 A1 * | 7/2010 | ......... | H05B 37/0245 |
| WO | 2010079388 A1 | 7/2010 | | |

OTHER PUBLICATIONS

Non-final Office Action dated Oct. 22, 2015, issued in U.S. Appl. No. 14/618,690 entitled "Chaotic Approach to Control of Lighting," filed Feb. 10, 2015.
"Circadian rhythm," Wikipedia, <http://en.wikipedia.org/wiki/Circadian_rhythm>, Retrieved on May 9, 2012.
"Chaos theory", WhatIs.com <http://whatis.techtarget.com/definition/chaos-theory?vgnextfmt=print>, Retrieved Jul. 17, 2012.
"Chaos theory," Wikipedia, <http://en.wikipedia.org/wiki/Chaos_theory>, Retrieved on Jul. 17, 2012.
Entire patent prosecution history of U.S. Appl. No. 13/594,206, filed Aug. 24, 2012, entitled, "Chaotic Approach to Control of Lighting."
Entire patent prosecution history of U.S. Appl. No. 14/252,397, filed Apr. 14, 2014, entitled, "Learning Capable Lighting Equipment."
Entire patent prosecution history of U.S. Appl. No. 14/303,643, filed Jun. 13, 2014, entitled, "Chaotic Approach to Control of Lighting."
Final Office Action dated Dec. 24, 2015, issued in U.S. Appl. No. 14/618,690, filed Feb. 10, 2015, entitled "Chaotic Approach to Control of Lighting."
Final Office Action dated Dec. 21, 2015, issued in U.S. Appl. No. 13/594,236, filed Aug. 24, 2015, entitled "Environmental Control Using a Chaotic Function."
English translation of Chinese Patent No. CN101315544A—Greenhouse intelligent control method.
Non-final Office Action dated Feb. 26, 2016, issued in U.S. Appl. No. 14/618,690, filed Feb. 10, 2015, entitled "Chaotic Approach to Control of Lighting."
Non-final Office Action dated May 26, 2016, issued in U.S. Appl. No. 13/594,236, filed Aug. 24, 2012, entitled "Environmental Control Using a Chaotic Function."
Non-final Office Action dated May 31, 2016, issued in U.S. Appl. No. 14/618,690, filed Feb. 10, 2015, entitled "Chaotic Approach to Control of Lighting."
Non-final Office Action issued in U.S. Appl. No. 13/594,236 dated Dec. 29, 2014.
Notice of Allowance issued in U.S. Appl. No. 14/303,643 dated Nov. 24, 2014.
Final Office Action for U.S. Appl. No. 13/594,236, dated Sep. 22, 2016, 57 pages.
RunJie, Liu, CN101957602 (A) English Translation—Method and system thereof for monitoring and controlling environments of public place based on Zigbee, dated Jan. 26, 2011, 11 pages.
Notice of Allowance for U.S. Appl. No. 14/618,690, mailed Dec. 27, 2016, 17 pages.
Notice of Allowance issued in U.S. Appl. No. 13/594,236 dated Apr. 5, 2017 (22 pages).

* cited by examiner

Chaotic
Equation sine
Equation sine
Equation
*
(1-Chaotic
Equation*D)

Where D equals dampening function constant

High-frequency Chaotic Equation

Low-frequency Chaotic Equation

Combined with damping

LEARNING CAPABLE CONTROL OF CHAOTIC LIGHTING

RELATED APPLICATION

The present application is a Continuation-In-Part of U.S. patent application Ser. No. 14/303,643, Filed Jun. 13, 2014, entitled "CHAOTIC APPROACH TO CONTROL OF LIGHTING," which is a Continuation of U.S. patent application Ser. No. 13/594,206, Filed Aug. 24, 2012, entitled "CHAOTIC APPROACH TO CONTROL OF LIGHTING," now U.S. Pat. No. 8,779,669 the disclosures of which are entirely incorporated herein by reference.

This application also is a Continuation-In-Part of U.S. patent application Ser. No. 14/252,397, Filed Apr. 14, 2014, entitled "LEARNING CAPABLE LIGHTING EQUIPMENT," the disclosure of which is entirely incorporated herein by reference.

BACKGROUND

Electrical lighting has become commonplace in modern society. Electrical lighting devices are commonly deployed, for example, in homes and buildings of commercial and other enterprise establishments. Traditional general lighting devices have tended to be relatively dumb, in that they can be turned ON and OFF, and in some cases may be dimmed, usually in response to user activation of a relatively simple input device. Such lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often such devices are controlled individually or as relatively small groups at separate locations.

With the advent of modern electronics has come advancement both in the types of light sources and in the control capabilities of the lighting devices. For example, solid state sources are now becoming a commercially viable alternative to traditional light sources such as incandescent and fluorescent lamps. By nature, solid state light sources such as light emitting diodes (LEDs) and organic LEDs (OLEDs) are easily controlled by electronic logic circuits or processors. For example, many fixtures or systems using solid state light sources enable control of both intensity and color characteristics of the overall light output. Electronic controls have also been developed for other types of light sources.

Traditional control algorithms involved setting a condition or parameter of the light output, such as intensity and/or color and then maintaining the set condition within some minimal variance for a relatively long period of time, e.g. over a work day or a period of occupancy. Advanced electronics in the control elements, however, have facilitated more sophisticated control algorithms. For example, some systems have been configured to vary a condition of lighting in accordance with a circadian rhythm. A circadian rhythm is a biological function that corresponds to a natural 24 hour cycle. For lighting purposes, lighting in an office or the like has been controlled in a manner to simulate variations of natural daylight over some portion of the daytime during which the office is expected to be occupied, so as to simulate that portion of the natural 24 hour cycle of sunlight.

Control algorithms based in whole or in part on a circadian rhythm may help to promote harmony of the occupants with the lighted environment. However, such algorithms are still somewhat limited in that they tend to follow a general trend, such as average intensity of daylight, over the relevant period of the day.

The Fraunhofer Institute developed a Virtual Sky® in the form of a ceiling grid that was illuminated to appear as a moving sky with variable light intensity and sky colors. However, this approach is essentially an emulation of a natural environmental condition not specifically configured to manipulate the environment to influence an occupant's sense of being. Also, such a lighting grid is far too complex and expensive for wide adoption in environments for typical spaces intended for human occupancy, such as homes, offices, agricultural buildings, commercial buildings or the like.

Other types of lighting have been controlled in response to various conditions or inputs, for example, in response to music. At least some musical sound may be considered chaotic. However, lighting in response to or coordinated with music has been intended for special effects lighting or entertainment and not for control of general lighting such as task lighting in an enterprise or residential space.

Hence, there is room for still further improvement in a lighting control algorithm to better promote an objective purpose of an illuminated area or space when occupied, and/or which can be implemented using devices or systems for general lighting that are readily adaptable to environments for typical spaces, such as homes, offices, agricultural buildings, commercial buildings or the like as well as the ability to learn and adjust a lighting system based on past and current user interaction.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may, be practiced without such details. In other instances, well known methods, procedures, components, and/or circuitry have been described at a relatively high-level, without detail, in order to avoid unnecessarily obscuring aspects of the present teachings.

The various examples disclosed herein relate to lighting devices, fixtures or systems and ways to control such equipment to provide controlled variation of one or more characteristics of emitted light in a chaotic manner. Reference now is made in detail to the examples illustrated in the accompanying drawings and discussed below.

Figure 1:
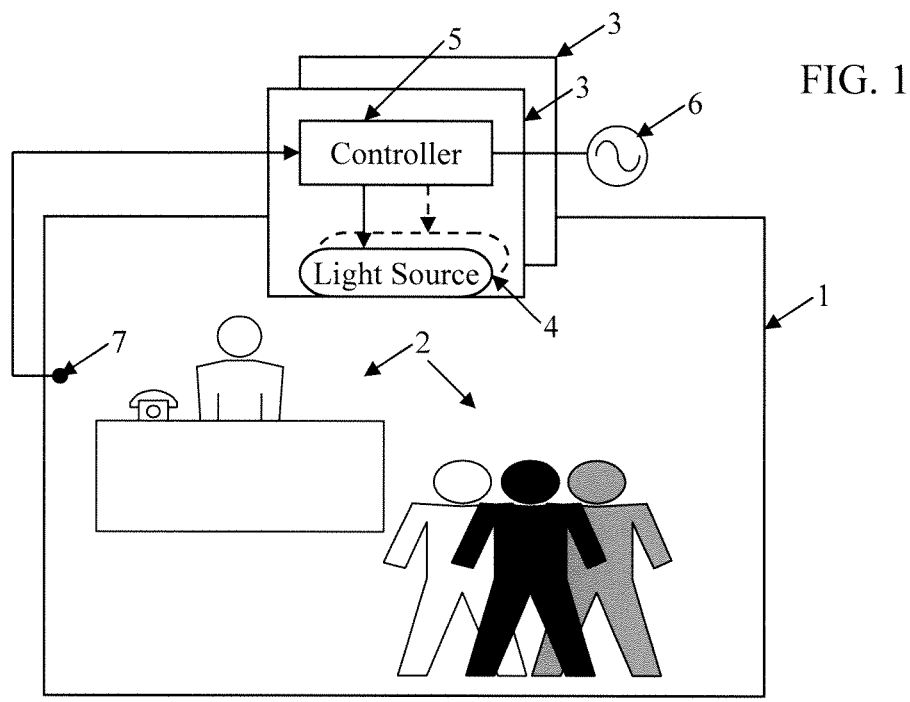
FIG. 1 is a simplified diagram showing an example of a number of lighting devices illuminating a space to be utilized by one or more occupants, where the lighting devices are configured to vary operation of the light source(s) so as to vary at least one characteristic of visible light emitted into the space over a period of time at least in part in accordance with a chaotic function.

FIG. 1 illustrates a simple first example. The drawing shows a region or space 1, which is intended to be utilized by one or more occupants 2. In the specific example, the occupants shown are human. However, the lighting control technology may be applied to light spaces intended for other biological occupants in addition to or instead of humans. For purposes of illustration and further discussion of the examples, we will assume human occupancy. The space 1, for example, may be a room in a building; although the lighting techniques under consideration here may be applied to any indoor or outdoor region or space that requires at least some artificial lighting. The lighting equipment involved here provides the main artificial illumination component in the space, rather than ancillary light output as might be provided by a display, or by or in association with a sound system, or the like. As such, the illumination from the fixtures, lamps or other elements controlled in accordance with a chaotic function is the main artificial illumination that supports the purpose of the space, for example, the lighting that alone or in combination with natural lighting provides light sufficient to allow occupants in the space to perform the normally expected task or tasks associated with the planned usage of the space. Often, such lighting is referred to as "general" lighting.

Human habitation often requires augmentation of natural ambient lighting with artificial lighting. For example, many office spaces, commercial spaces and/or manufacturing spaces require task lighting even when substantial amounts of natural ambient lighting are available. For many of these uses, the level of the light may be specified by one or more regulatory authorities. Hence, when natural ambient light is available, ambient and task lighting should be integrated such that they do not work against one another. For example, natural ambient lighting should not be distracting to the task(s) to be performed in the lighted space. An example is discussed later that utilizes ambient light sensing, that includes sensing of any natural ambient light or the like that may be available, to adjust the control of the artificial lighting device(s). Ambient light sensing detects at least some light that is present in the space even if the controlled artificial lighting were absent or turned OFF; although depending on the sensor/detector configuration, some of the controlled artificial lighting may also be detected. Later examples enhance control by adapting operation to an occupant, e.g. through use of a preference profile for the occupant and/or a learning algorithm. For ease of illustration and discussion, however, this initial example assumes only artificial lighting.

Hence, in our first example, the space 1 is an enclosed room or the like and is shown without windows or any other means of providing daylighting from an exterior of the building to the room space 1. In many actual installations, the space will include a window, skylight or other daylighting device configured to allow some amount of sunlight to enter the space. However, for its intended purpose or usage, the space requires at least some artificial lighting. Hence, the space 1 can be illuminated as/when desirable by at least one lighting device that produces artificial light during at least some times of occupancy.

The lighting device could be a table or floor lamp, etc.; although in our example, the space is illuminated by a number of light fixtures 3. Each light fixture 3 includes one or more controllable sources 4 of visible light, for illumination of the space 1. The example shows the fixtures 3 mounted in the ceiling and oriented so that the light emissions from sources 4 are directed generally downward into the space 1. Such a downlight configuration, for task lighting or other similar illumination applications, is exemplary only. The fixtures or other types of lighting devices in the example may be at any location and/or orientation relative to the space and the expected occupants 2 to support a desired general lighting application appropriate for the usage or purpose intended for the space 1. For example, the downlight fixtures 3 provide direct lighting from above. As other examples, indirect lighting may reflect light off of a ceiling or wall surface or the lighting may principally illuminate an object in the room to be viewed by the occupants 2. Each source 4 may be implemented with any suitable light generation device; although specific examples discussed below utilize LEDs alone or in combination with other sources, such as incandescent, fluorescent or organic LED (OLED) lamps and daylighting.

The sources 4 are controlled by one or more controllers. In an integrated system, for example, there may be one controller for all sources that artificially illuminate the space 1. In this first example, each light fixture 3 also includes a controller 5 coupled to the source or sources 4 in the fixture 3, to control operation thereof. The operational control causes the source(s) 4 to emit light in a manner that varies at least one characteristic of visible light emitted into the space over a period of time at least in part in accordance with a chaotic function. Some or all of the chaotic variation(s) may often not be consciously perceptible by an occupant of the space; however, sub-conscious perception of the chaotic variation(s) may still impact the occupant's perception of the environment in the space.

The lighting device, for example each of the light fixtures 3 in FIG. 1, uses power to run the controller 5 and drive the source(s) 4 to emit light. In the example, each light fixture draws electrical power from alternating current (AC) mains 6, although the light fixture 3 may be driven by a battery or other power source under normal conditions or in the event of a failure of AC mains power 6.

In the example, the light fixtures 3 are responsive to control input from a user interface device 7. The user interface device 7 can be a simple ON-OFF switch or a dimmer; or the user interface device 7 may be a more sophisticated digital control and data entry/output device. When the fixtures 3 are turned ON in response to the input from the user interface device 7, the controllers 5 generally set the output intensity to a general level and may maintain one or more color characteristics at set values. If the user interface device 7 merely provides ON-OFF settings, then the intensity and any other controlled characteristics would be maintained at around programmed nominal settings. If the interface device 7 provides dimming control for the user, then the controllers 5 would reduce the output intensity from the full ON setting to an intensity corresponding to the dimmer setting. The controllers may also set one or more color characteristics in a similar manner in response to user inputs via the device 7. However, each controller 5 in the example is also configured to vary one or more of the lighting characteristics from the nominal settings, including from any settings input via the user interface device 7, over a period of time, at least in part in accordance with a chaotic function.

Where there are a number of lighting devices that illuminate the space 1, such as light fixtures 3 in this example, the intent is for the total illumination in the space 1 to exhibit chaotic behavior in the intended manner. To that end, chaotic variations among fixtures 3 may be in-phase with each other (same timing), for example, if there is synchronism and/or common control for the fixtures 3. Alternatively, operations of one or more of the fixtures 3 may be phase delayed relative to other fixture(s) to produce similar variations but different/delayed timings; or the various fixtures 3 may be running independently and therefore producing independent chaotic components (out of phase and with different variations). Other installations may be arranged with one or more lighting devices implementing the chaotic function control whereas one or more lighting devices may not implement the chaotic function control.

The chaotic functional control or variation of the light characteristics may be implemented using a variety of control algorithms. It may be useful at this point in the discussion to consider chaotic functions in more detail, both in general terms and in terms of application thereof to control of a lighting device or system.

In science and mathematics, chaos is not a lack of order. To the contrary, chaos is an apparent lack of order in the outcomes of a complex dynamic system that actually may be deterministic. A chaotic system often is deterministic in that it follows one or more rules; however, system results are unpredictable and appear random or lacking in order because the results are not readily predictable, particularly in the long run. Hence, a chaotic system is one that operates in a dynamic manner and its dynamic operations are highly sensitive to initial conditions. The outcomes at a point in time are often determined by the parameters occurring at one or more preceding points in time, which serve as the inputs to the deterministic system in driving the current outcomes. Sensitivity to initial conditions means that small differences of initial conditions can yield significantly different results. In a system that depends on prior conditions, the prior conditions become the inputs for current or future determined outcomes; therefore such a chaotic system tends to be highly sensitive to the conditions leading up to current time. The sensitivity to initial conditions, say the current and prior conditions that serve as 'initial conditions' for prediction of future outputs, makes prediction of long-term outcomes difficult or impossible.

Chaotic behavior occurs in many natural systems. Weather, for example, is a naturally occurring chaotic system. It is relatively easy to observe present conditions and track past conditions, for use in predicting the weather. However, even with sophisticated computer modeling and increasingly comprehensive data accumulation, weather is not readily predictable beyond a few days or a week. Examples of the chaotically varying characteristics of the weather include conditions like air temperature, air pressure, humidity, precipitation, visibility, wind speed, and wind direction (in two or three dimensions).

In an outdoor environment, parameters of natural lighting produced by sunlight, shading and/or reflection of light in the environment and light transmission through the atmosphere also form a naturally occurring chaotic system. Examples of the chaotically varying characteristics of naturally occurring lighting include intensity of light flux, color temperature of the light and chromaticity difference or Delta_uv (distance of color characteristic point off of the Planckian locus, in uv color space).

The human nervous system also is a chaotic system. However, aspects of human perception are, after eons of evolution in Earth's natural environment, accustomed and even somewhat attuned to natural variation of characteristics of the environmental conditions, including chaotically varying characteristics such as those of the weather and of natural lighting. As a result, humans are actually sensitive to variations, including chaotic variations at levels and rates that may not be readily or consciously perceptible. However, sensing of such variations does impact the human nervous system in ways that may affect human mood and/or performance. Compared to natural conditions, controlled characteristics of indoor conditions have tended in the past to be relatively static over substantial periods of time each day.

The systems and procedures discussed below by way of examples incorporate chaotic variations into control functions of a lighting device or system in a manner intended to support or facilitate an objective purpose of a space that the device or system illuminates. Depending on the purpose(s) of the space, the environment in a controlled space can calm, the environment can excite, the environment can affect productivity favorably or unfavorably, and/or the environment can make occupants feel good, bad or indifferent. For many applications, promotion of the purpose of the space will involve a lighting effect that may be considered positive or pleasant in some manner. However, for some purposes and/or at some times, a negative or unpleasant impact may be appropriate, e.g. to encourage unwanted visitors (human or animal or insect, etc.) to leave a space or even to impair an intruder's perception while intruding into a secure space.

The chaotic variation of a light characteristic introduced by the technologies discussed herein may be similar to that found in nature; however, the lighting control need not particularly mimic natural day lighting. In many settings, the variation need not track that occurring in nature. Rather than implementing natural day lighting conditions in the illuminated space, for at least those purposes where aspects of daylight support the intended purpose, the controlled lighting system or device adds analogous components via chaotic function control, to liven up or put life (dynamic change) in one or more of the characteristics of the lighting condition in the space illuminated by the device or system.

Some examples of chaotic functions may be defined by three or more linked differential equations, often where each equation has one or more non-linear terms and the coefficients of the terms configure the system of equations for operation near or at a transition point from orderly to disorderly behavior. However, other formulae may be used. A somewhat simpler chaotic function maybe expressed by an equation like the following:

$$x_{n+1} = rx_n(1-x_n) \quad (1)$$

(Source: Wikipedia, "Chaos Theory," http://en.wikipedia.org/wiki/Chaos_theory)

Figure 2:
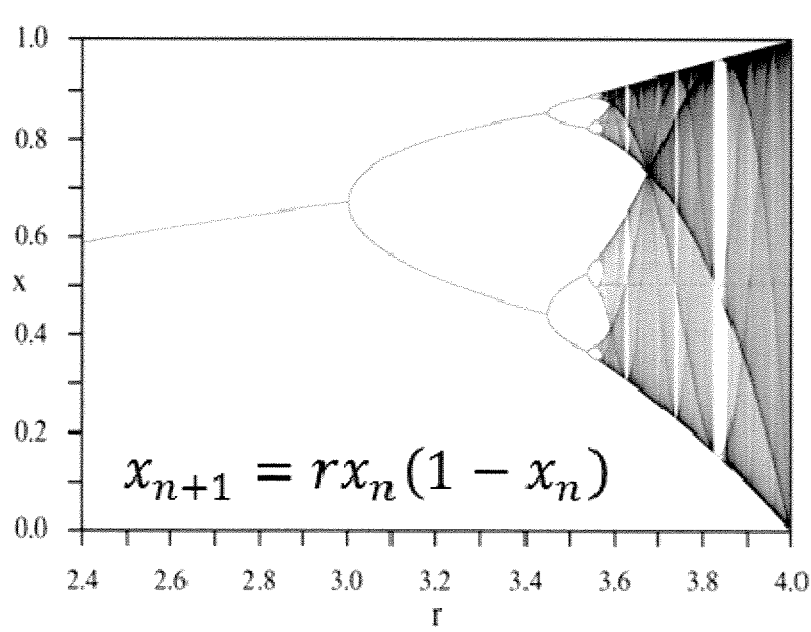
FIG. 2 is a graph showing a relationship of states of a variable to a range of coefficient values for an equation that may define a chaotic control function, for a simple example.

In equation 1 above, the variable x for the next time point n+1 is dependent on the value of x of the current time point n. The initial condition for $x_{n+1}$ is $x_n$. FIG. 2 is a graph (from the source Wikipedia article noted above) showing possible outcomes of x for different values of the coefficient r. The example uses a damping type of equation that creates a chaotic function.

Figure 3A:
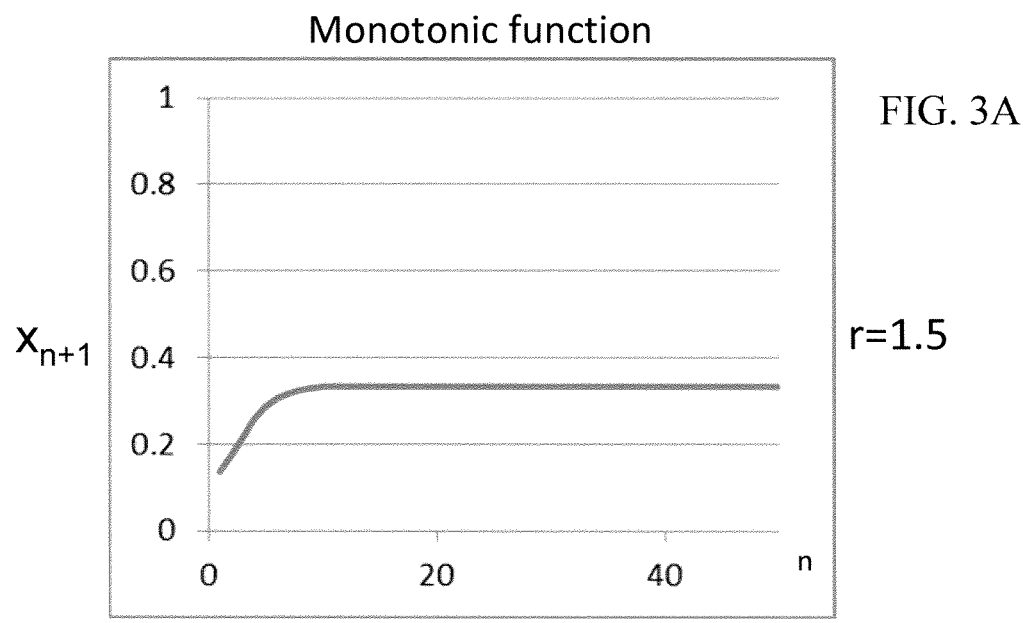
FIGS. 3A to 3E show the resulting functions, achieved using different values for the coefficient, for the equation represented in FIG. 2.

For values of r below approximately 3.0, x is a relatively monotonic function. FIG. 3A shows the function $x_{n+1}$, for a range to values n, in a case in which the coefficient r is 1.5. As shown, the function quickly reaches a value of approximately 2.7 and stays at that value. The outcome of the function is monotonic at that value for values of n above approximately 9 or 10. In this state produced by the low value of r, variation as a function of n is minimal and damps out quickly.

Figure 3B:
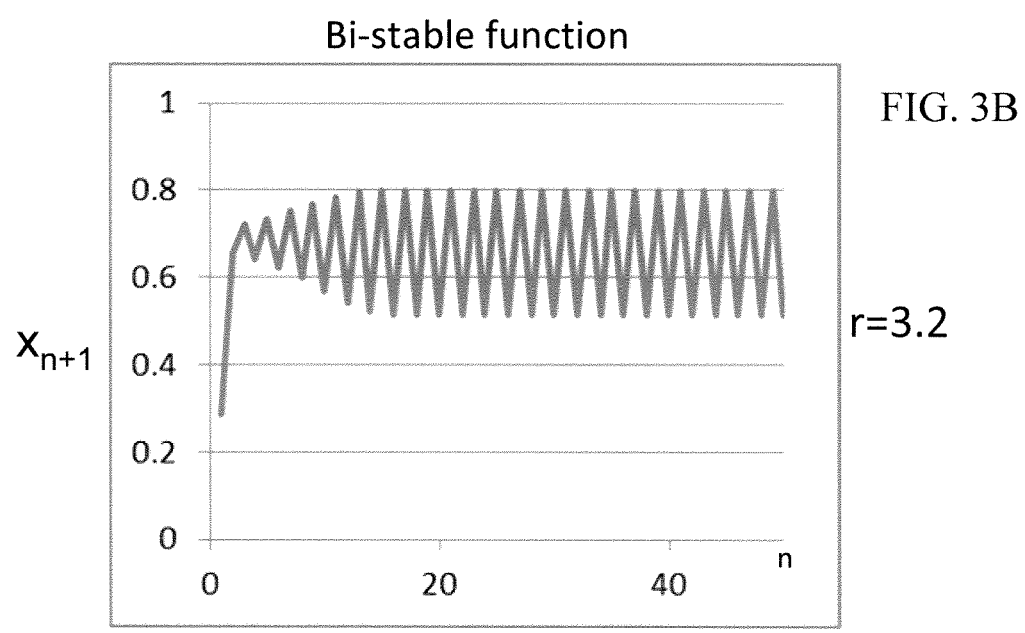

Returning to FIG. 2, in the range of r from approximately 3.0 to 3.4 for the value of the coefficient of r, there are essentially two possible outcomes for x. In this coefficient range, the function of x tends to be bi-stable. By way of an illustrative example of a bi-stable state of the function of equation (1), FIG. 3B depicts the function $x_{n+1}$, for a range to values n, in a case in which the coefficient r is 3.2.

Figure 3C:
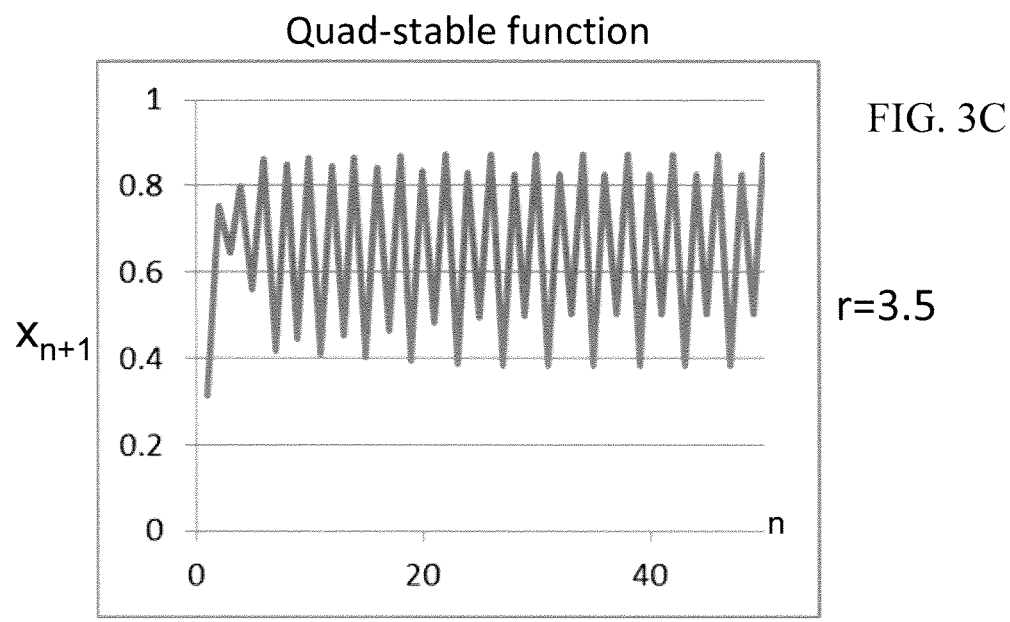

Returning to FIG. 2, in the range of r from approximately 3.4 to 3.6 for the value of the coefficient of r, there are essentially four possible outcomes for x. In this coefficient range, the function of x tends to be quad-stable, i.e. a function that exhibits essentially four regularly repeating outcomes. By way of an illustrative example of a quad-stable state of the function of equation (1), FIG. 3C depicts the function $x_{n+1}$, for a range to values n, in a case in which the coefficient r is 3.5.

Figure 3D:
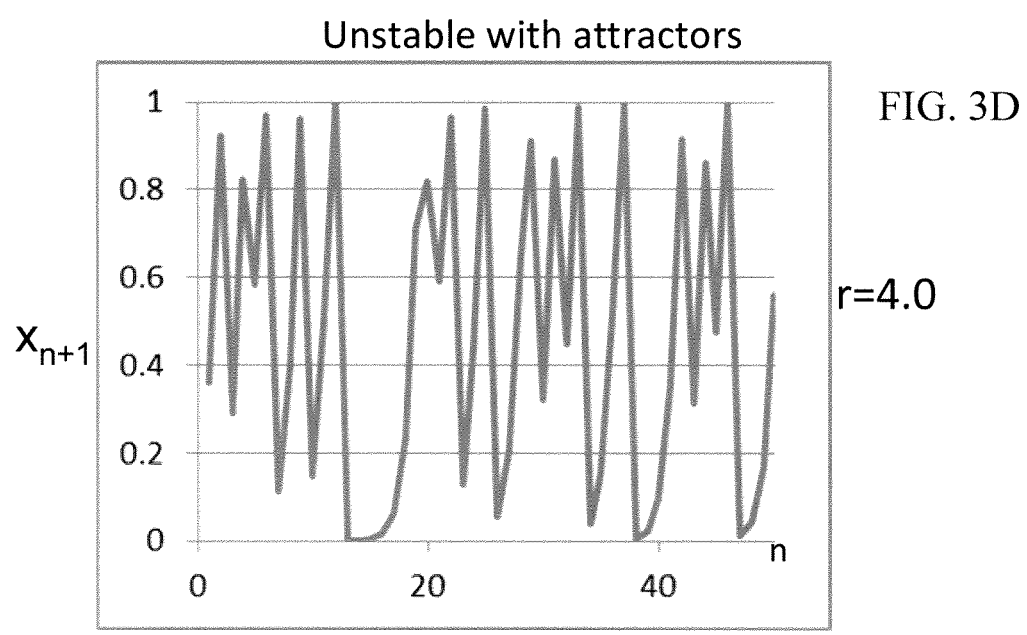
Figure 3E:
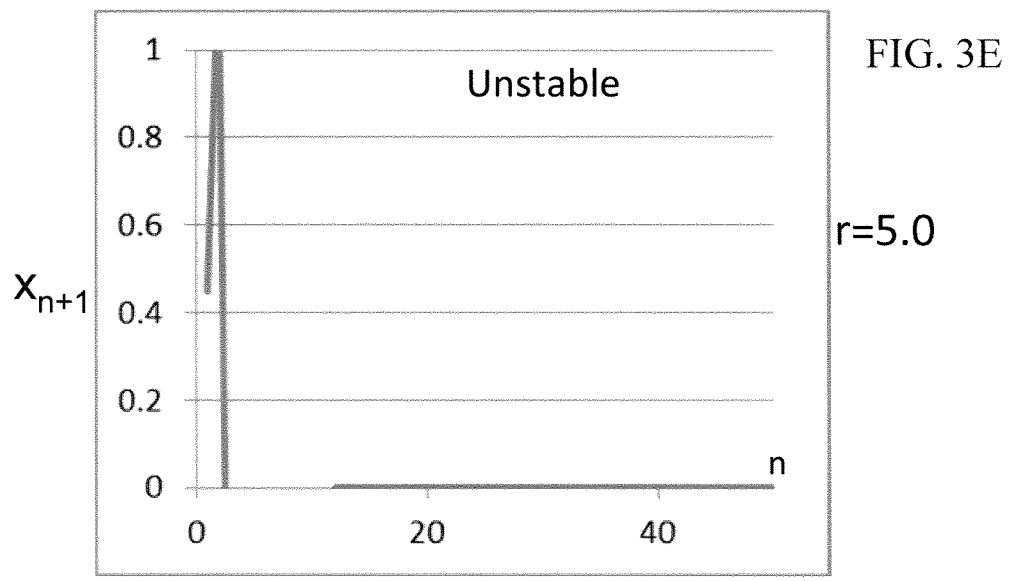

As shown in FIG. 2 the number and variances of the function x for values of the coefficient r increase significantly for higher values of r, say above 3.6 or 3.7. In the early part of this range, the function x is somewhat unstable but tends to be attracted to return in somewhat irregular manner to or near a number of recurring values, referred to as attractors. FIG. 3D illustrates an example of the function of equation (1) in which a coefficient value for r is 4.0, which produces outcomes for $x_{n+1}$ that vary in a somewhat unstable manner but with attractors. For a higher coefficient value, say 5.0 by way of an example, the function becomes completely unstable as shown by way of example in FIG. 3E.

For the lighting control theory under consideration here, devices or systems will most likely operate with a chaotic function configured in a state of a type that provides unstable with attractor type variations analogous to the example of FIG. 3D. However, for some purposes, quad-stable or bi-stable may be used. Fully unstable would probably not be used. Hence, for purposes of discussions of further examples of lighting control, we will assume use of a chaotic function in an unstable state with attractors. If the function (1) is used as the chaotic function, the coefficient r might be set to a value that produces outcomes like that of FIG. 3D. Attractors are results that the function tends to go back to from time to time, although not in an actual repeating pattern. In the 4.0 example of FIG. 3D, $x_{n+1}$ tends to go back to or close to the same minimum and maximum values in an irregular manner over time n (quasi-pattern); although the minima and maxima are not exactly the same, the curvatures to and from maxima and minima vary, and there is not any real exact periodicity.

The human brain also may be thought of as a chaotic system. The human brain tends to vary between states that are neither monostable nor unstable chaotic. Instead, the brain tends to vary in a state range from bi-stable, through quad-stable up to states that may be somewhat unstable with attractors.

Figure 4A:
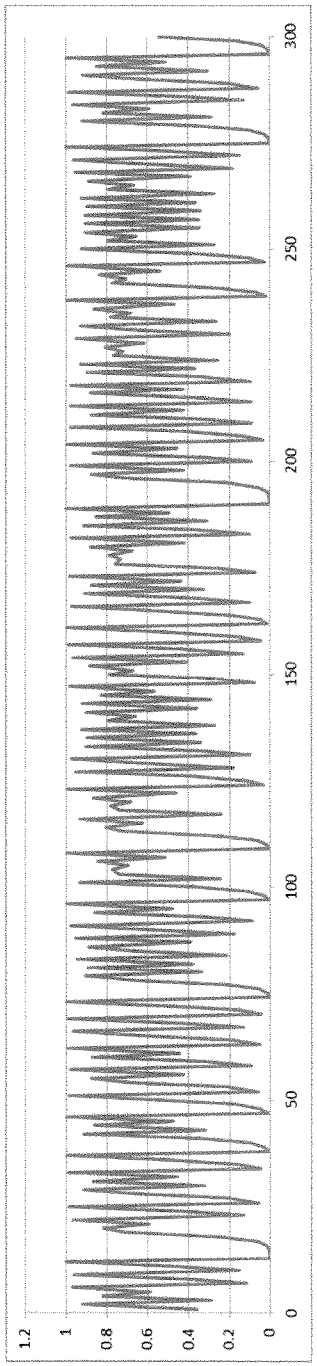
FIGS. 4A to 4C, respectively show a chaotic function in an unstable-with-attractors state, a portion of a sine wave and an example of a combination of the chaotic function and the sine wave portion.
Figure 4B:
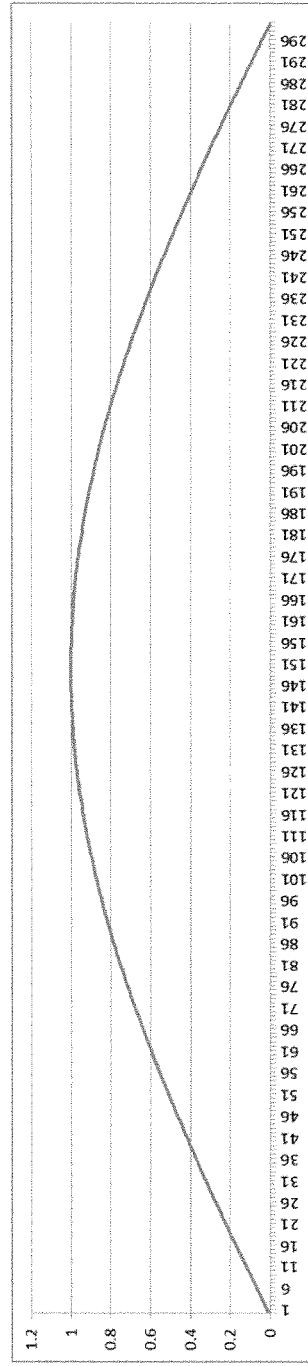
Figure 4C:
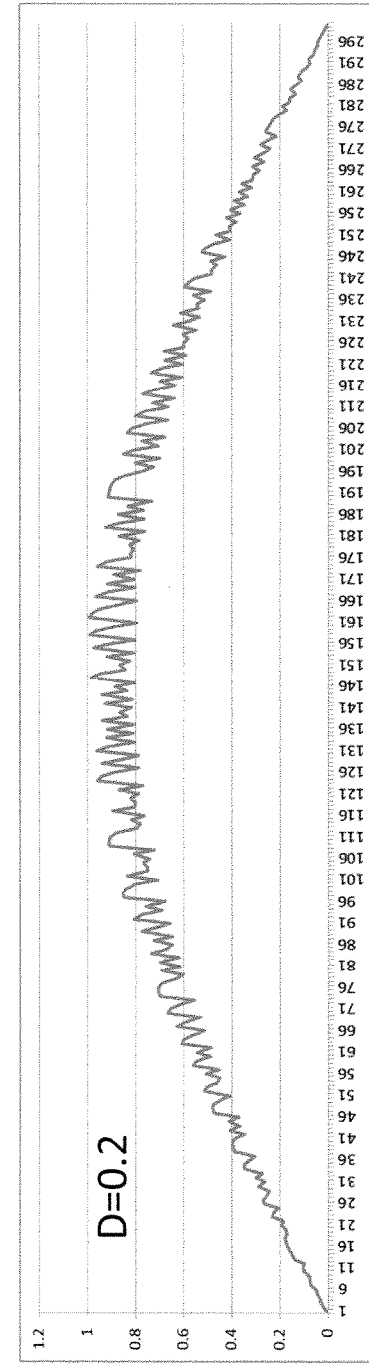

FIGS. 4A to 4C are function graphs useful in explaining a chaotic equation combined with a sine equation. FIG. 4A shows a chaotic function in an unstable-with-attractors state the same as or similar to that of FIG. 3D, over 300 units of time. The units of time may be seconds, minutes, hours, or factions or multiples of any such units, depending on the particular lighting characteristic controlled and the purpose or objective that is supported by the lighting control function. For example, different time scales may be applied for controlling intensity, color temperature, Delta_uv, etc., in the same or different lighting device or system. The parameter of the function shown on the vertical axis represents magnitude of the function normalized to a range from 0 to 1.

The controller 5 may be configured to apply the chaotic function directly to control the relevant source output characteristic. However, in many implementations, the controller 5 may be configured to control operation of the source(s) 4 of visible light so that the at least one characteristic of the visible light emitted from the source(s) 4 into the space 1 varies in accordance with a combination of a nominal function over the period of time and the chaotic function. The nominal function may be a fixed value or a variable value. In other examples, the nominal function is a variable function added to or otherwise superimposed on a set value.

FIG. 4B shows a portion, in this case a half-wave or 180 degree, of a sine wave function. The time scale for the sine wave is the same as that used for the chaotic function in FIG. 4A; and again, the magnitude is normalized to a range from 0 to 1. FIG. 4C shows a combination of the chaotic function with the sine wave. The chaotic function may be combined with the sine wave in a variety of ways. In the example, the outcome of the sine equation is multiplied by one minus the outcome of the chaotic equation times a dampening parameter D. The dampening parameter D limits the variation caused by the chaotic function. In the specific example D=0.2.

Figure 5A:
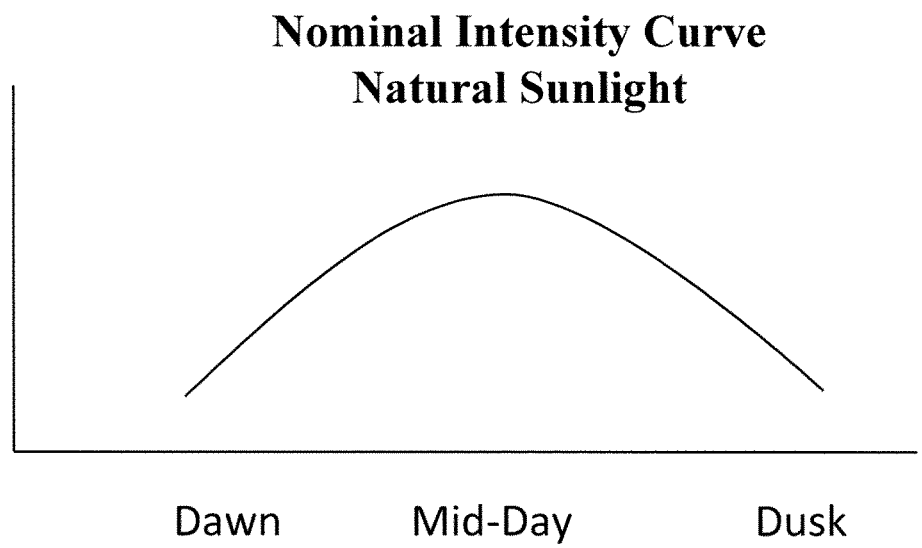
FIG. 5A illustrates a rough approximation of a general trend or nominal curve for natural sunlight, from dawn to dusk.
Figure 5B:
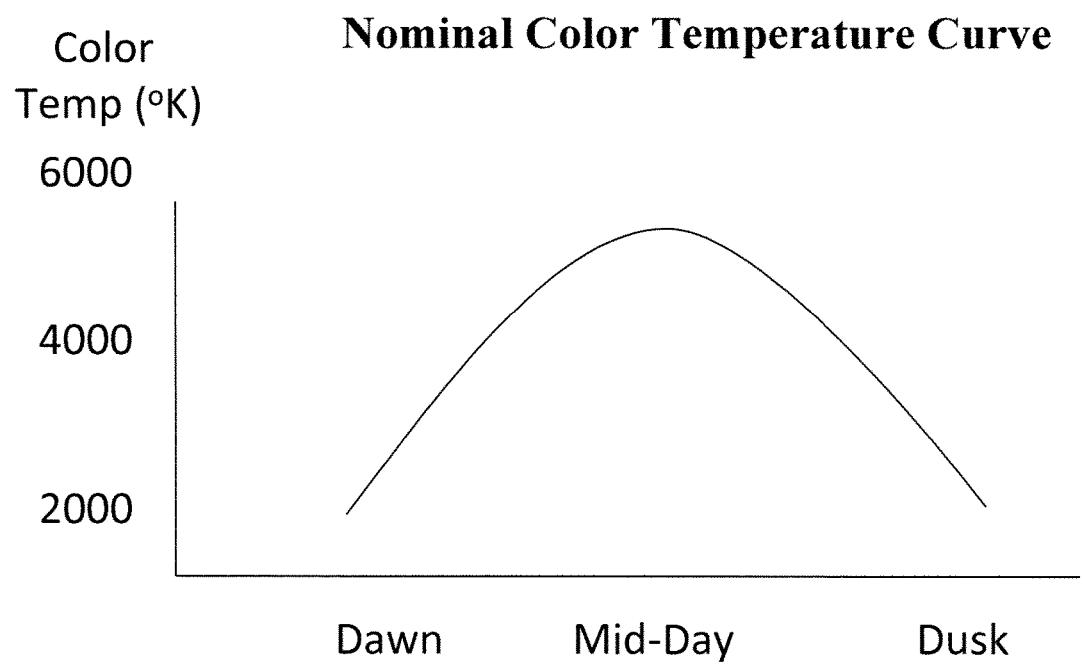
FIG. 5B shows an example of an approximate nominal curve for color temperature for natural sunlight, over the hours of daylight.

The sine function is used here as just an easy example of a variable nominal function or variable component that may be used in combination with a minimum or established setting value to form a nominal function. However, many functions in nature tend to vary in a manner that can be somewhat approximated by a sine wave. FIG. 5A, for example, depicts a rough approximation of the general trend (without specific values) over the daylight hours for a nominal or normalized intensity curve for natural sunlight. FIG. 5B shows an example of a nominal curve for color temperature in degrees Kelvin (K) over the hours of daylight. Color Temperature at night is ~10,000° K. During periods of overcast or in shady areas, color temps are ~7,500° K.

However, rather than using an approximation of the natural trend from zero to maximum and back to zero, for artificial light, some amount of artificial light will normally be provided at all times when the device or system is ON to provide light. Hence, rather than use the curve of FIG. 4A or FIG. 4C as the lighting control function, the lighting device or system will typically add the function to or otherwise superimpose the function on the current setting value for the relevant light parameter.

Using the function of FIG. 4C as the example, the function could be added onto the otherwise normal full ON intensity value or to a somewhat lower intensity value selected by the user via a dimmer type input provided by user interface device 7. In this manner, the intensity of the output light would vary above or about the set intensity value in accordance with the function illustrated in FIG. 4C. As a result, over the assigned period, the actual light intensity would be the selected intensity plus a variable amount determined by the function of FIG. 4C.

Of course, instead of or in addition to such control of intensity, a controller 5 may control one or more other characteristics of the visible light output from the source(s) 4, such as spectral content of light, polarization of light, color temperature of light, and chromaticity difference (Delta_uv) of light from the Planckian locus, in a similar manner. Using color temperature as another example, the function of FIG. 4A reduced by application of a coefficient, say corresponding to 10%, could be multiplied by a color temperature setting to combine the chaotic function with the nominal value function. Alternatively, to achieve a general trend more like that shown in FIG. 5B, the combined function of FIG. 4B reduced by application of a coefficient, say corresponding to 10%, could be multiplied by a color temperature setting to combine the chaotic function with the nominal value function.

Other techniques may be used to combine a selected function, that includes a chaotic function component, e.g. like the functions shown in FIGS. 4A and 4C, with a setting or other type of target value for the particular lighting condition to which the chaotic function control is applied.

Figure 6A:
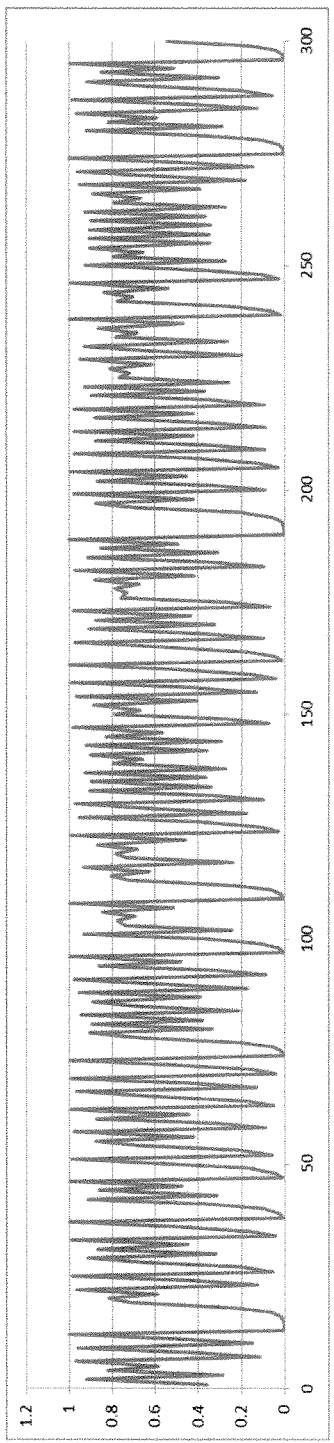
FIGS. 6A to 6C, respectively show the chaotic function in the unstable-with-attractors state, another chaotic function in a similar state but using a different timing rate and an example of a combination of the two chaotic functions.
Figure 6B:
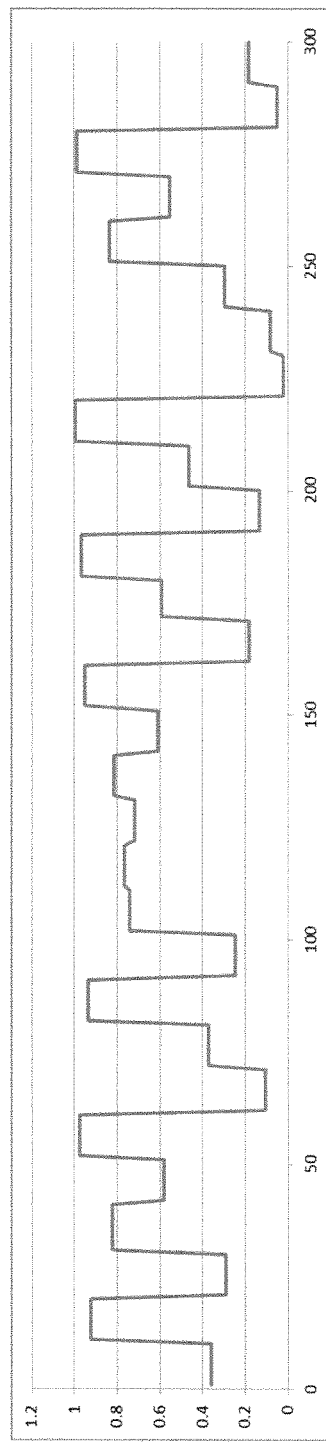

Of course, chaotic function control components can be applied to control lighting conditions in a variety of other ways. As another example, consider next FIGS. 6A to 6C and 7. FIG. 6A is another illustration of the chaotic function in the unstable-with-attractors state, similar to that shown in FIG. 4A. FIG. 6B shows another chaotic function in a similar state but using a different timing rate. The drawings show the two chaotic functions over the same period, 0 to 300 time units. However, the function shown in FIG. 6A varies at a higher rate than the lower rate variation of the function shown in FIG. 6B. Although the functions could vary in other ways too, in this example, both are implemented with or defined by the same equation, such as equation (1) above. To achieve the different rate functions, the functions use a different timing cycle or rate for n. For example, the function in FIG. 6A might be controlled using n in values of seconds; whereas the FIG. B implementation of the function might be expressed using n in terms of minutes or hours. Another approach to obtaining two somewhat different chaotic functions, even if using essentially the same formula or equation is to vary the coefficient r. Of course, another exemplary approach would be to use different equations.

Figure 6C:
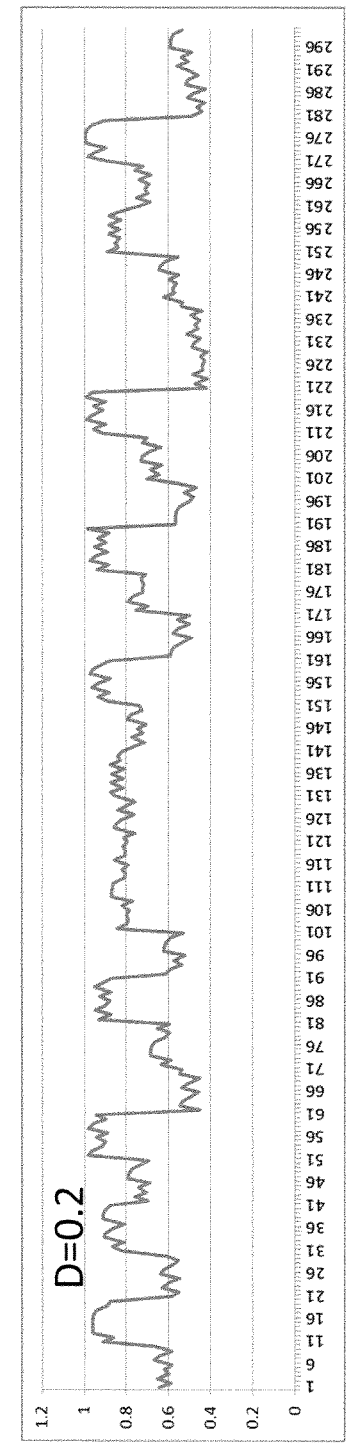

FIG. 6C shows a combination of the two chaotic functions. The chaotic functions may be combined in a variety of ways. In the example, assume that the low frequency chaotic function of FIG. 6B is Cf(Lo) and the high frequency chaotic function of FIG. 6A is Cf(Hi). With that nomenclature, the combined function C of FIG. 6C can be expressed as C=Cf(Lo)×(1−Cf(Hi)×D), where D is a damping coefficient. In the specific illustrated example, D in FIG. 6C is 0.2.

A function like that of FIG. 6C can in turn be used to control a characteristic of visible light emitted from any of the light sources 4 into the space 1. For example, the function of FIG. 6C could be added onto, adjusted with a coefficient and multiplied by or otherwise superimposed on the regular setting value for the controlled condition. If so combined with the normal full ON intensity value or to a somewhat lower value selected by the user via a dimmer type input provided by user interface device 7, the controlled intensity characteristic would vary above or about the set intensity value in accordance with the function of FIG. 6C. As a result, over the assigned period, the actual light intensity would be the selected intensity combined with a variable amount determined by the function of FIG. 4C. Of course, instead of or in addition to such control of intensity, a controller 5 may control one or more other characteristics of the visible light output from the source(s) 4 such as spectral content of light, polarization of light, color temperature of light, and chromaticity difference (Delta_uv) of light from the Planckian locus, in a similar manner based on a combination of a setting and a function like that of FIG. 6C.

Figure 7:
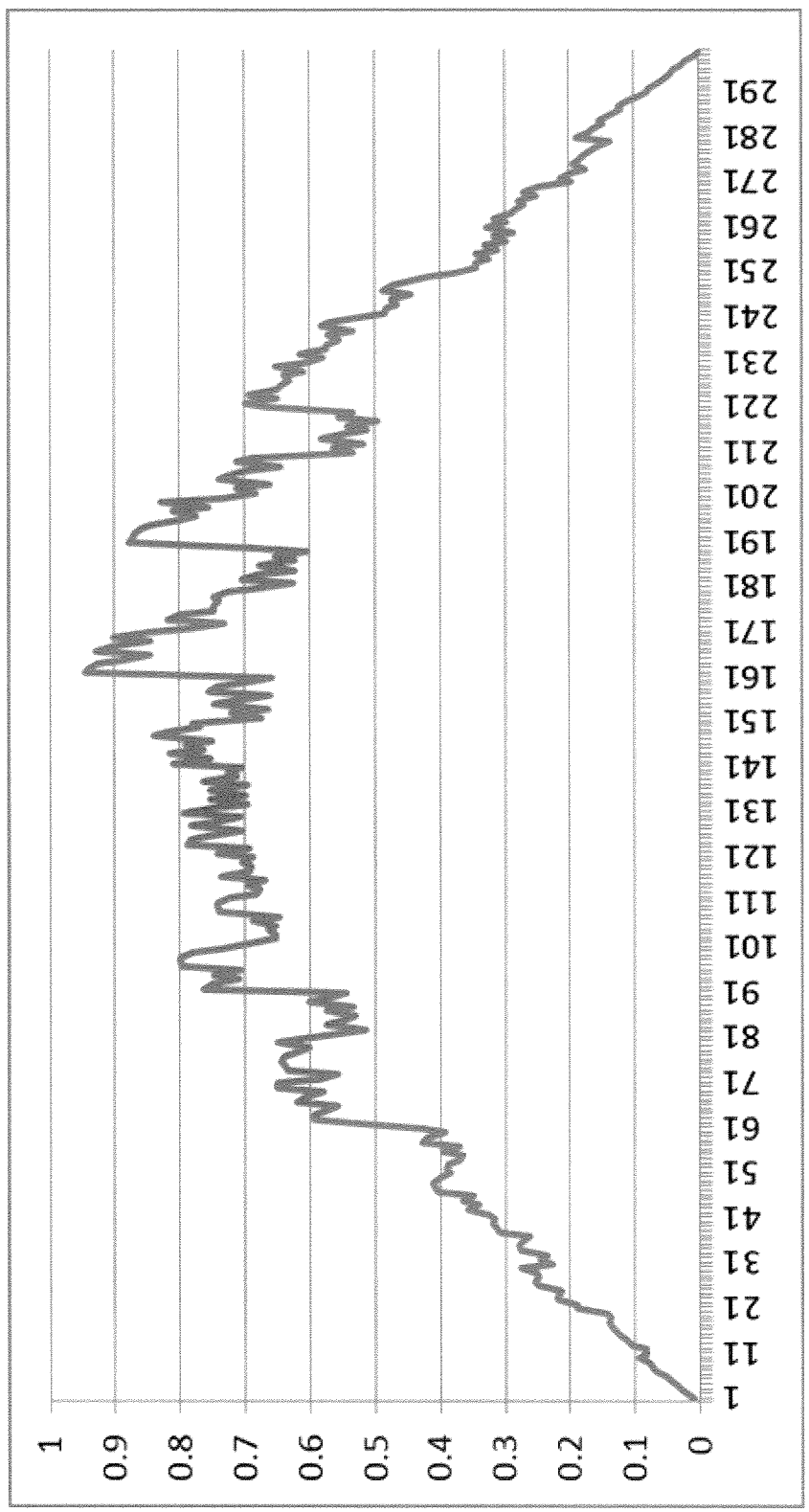
FIG. 7 depicts an example of the two-chaotic example of FIG. 6C combined together with a portion of a sine wave.

As an alternative approach, the two chaotic functions can be combined with a sine wave, to produce a function like that shown in FIG. 7. Again, the sine function is used here as just an easy example of a nominal function that may roughly approximate general trends of variations of naturally occurring lighting characteristics. The combination technique could combine the function of the FIG. 6C with a sine wave like that of FIG. 4B in a manner similar to that used with respect to the function of FIG. 4C. In the actual example of FIG. 7 however, each chaotic function from FIGS. 6A and 6B is separately combined with the sine wave and then the two results are averaged to produce the overall/combined function of FIG. 7.

Again using the nomenclature used in the discussion of FIG. 6C, the low frequency chaotic function Cf(Lo) of FIG. 6B is combined with the sine by multiplying the outcome of the sine equation by one minus Cf(Lo) times a dampening parameter D, to obtain a value v1. Similarly, the high frequency chaotic function Cf(Hi) of FIG. 6A is combined with the sine by multiplying the outcome of the sine equation by one minus Cf(Hi) times a dampening parameter D, to obtain a value v2. The damping parameters could be different; but for simplicity here, the damping parameters are the same value D, such as 0.2. The function of FIG. 7 is then obtained by averaging the two intermediate combinational functions, i.e. using (v1+v2)/2.

The function of FIG. 7 can be used to directly control one or more of the lighting characteristics, or the function of FIG. 7 can be combined with a setting for the characteristic(s) as in the earlier examples. Again, such a control function can be applied to light intensity and/or to one or more other characteristics of light, such as spectral content of light, polarization of light, color temperature of light, and chromaticity difference (Delta_uv) of light from the Planckian locus.

For artificial lighting applications, chaotic functional control will not exactly track natural lighting conditions. In some cases, the resulting variations may be quite different from those that occur in the natural lighting. However, to promote some purposes of the illuminated space 1, the variation captures or adds a degree of liveliness similar or analogous to variations in natural lighting. With such arrangements of the control algorithm implemented by controller 5, the chaotic function and/or the combination of a nominal function and the chaotic function for one or more of the controlled characteristics would approximate a natural variation of the relevant characteristic(s) of visible light. Hence, it may be useful to consider some examples of actual measured lighting conditions.

Figure 8A:
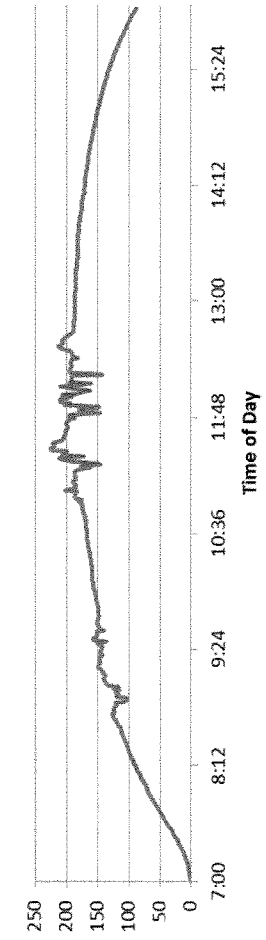
FIGS. 8A to 8C are graphs of light condition measurements, specifically flux, color temperature and chromaticity difference (Delta_uv), for a sunny day.
Figure 8B:
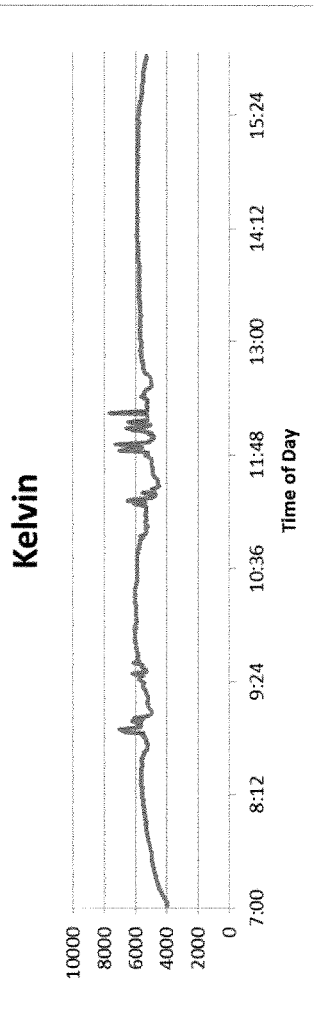
Figure 8C:
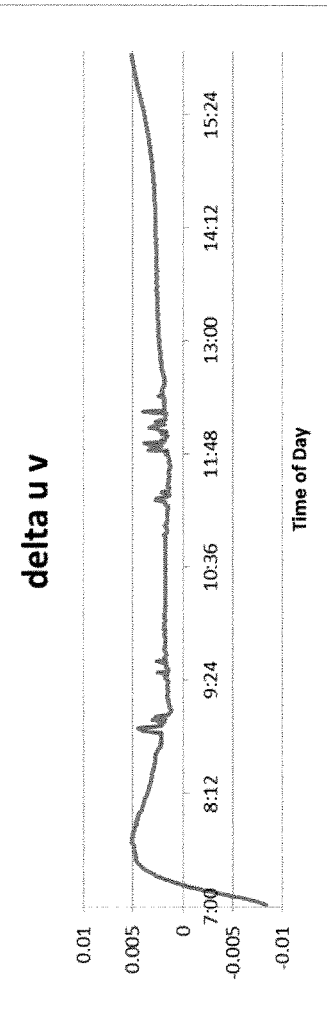
Figures 9A, 9B, 9C:
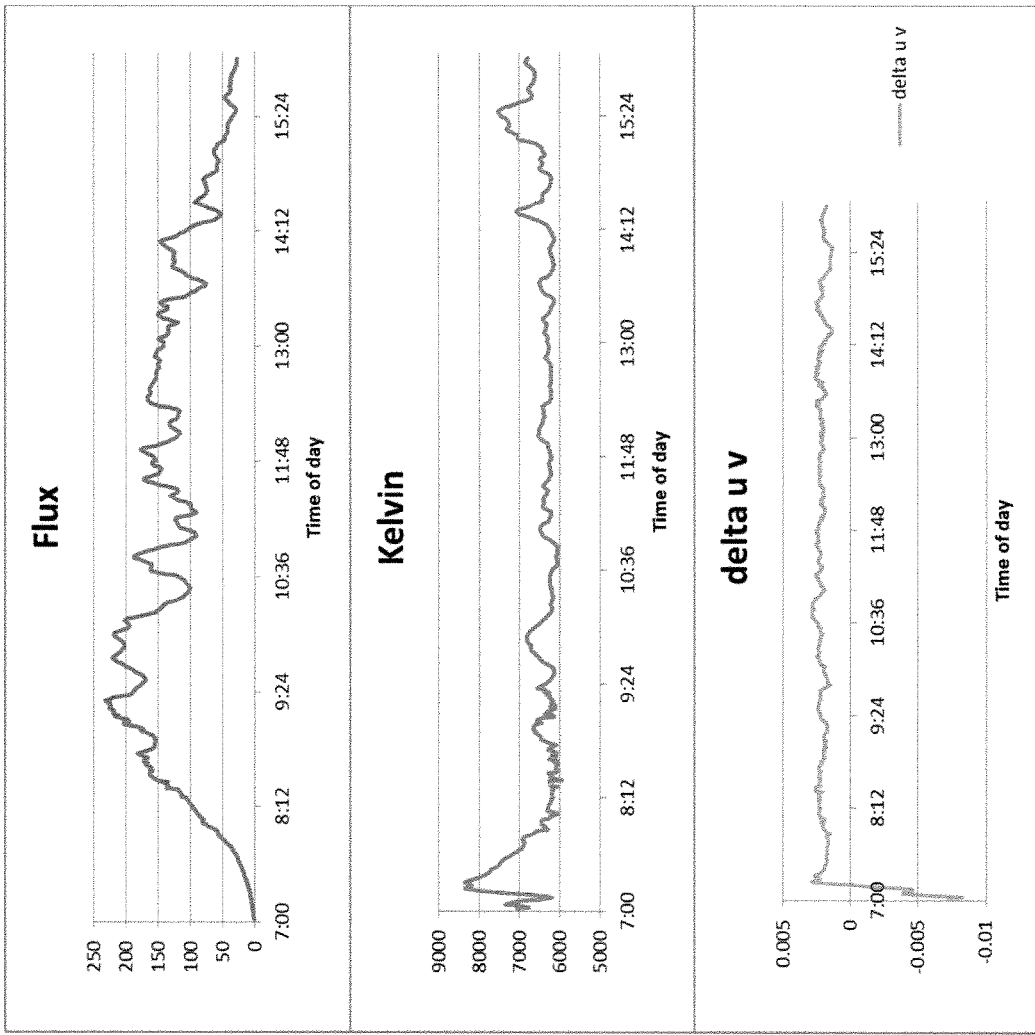
FIGS. 9A to 9C are graphs of light condition measurements, specifically flux, color temperature and chromaticity difference (Delta_uv), for a cloudy day.

FIGS. 8A to 8C respectively show measured intensity (light flux, for example, measured in foot-candles or fcd), color temperature (in degrees Kelvin (K)) and chromaticity difference (Delta_uv) for a sunny day. FIGS. 9A to 9C show similar measurements taken for a somewhat cloudy day.

The readings used to form the graphs in these three sets of drawings were measured using a Minolta™ luminance meter arranged to collect outside light through a window (aimed not to collect indoor artificial light). However, the window did have some filter effect, e.g. tinting and UV protection. Also, some light reflected in from outside objects. Hence, the measurements represent light entering a room through the window. Photopic flux—represents amount of light—as shown in FIGS. 8A and 9A and is a measure of light intensity. Color temperature (K) and chromaticity difference (Delta_uv) are two commonly used color characteristics of light. The illustrated measurements are intended to show relative readings that vary over time, rather than actual values.

FIGS. 8A to 8C show that flux, color temperature and Delta_uv have highest rates of change at about the same time. The different characteristics of light may be fairly monotonic over one or more substantial periods during the sunny day, but then each exhibits a period of more chaotic changes. Periods of chaotic change roughly correspond. In a control system, the equations for the three factors may be coordinated in time. If the control is intended to achieve a result similar to one or more of these measurement graphs, the control could vary the coefficient r for different times of day, between a value that produces monotonic results and a value that produces an unstable result with attractors. This approach tends to liven up or put life (dynamic change) into the controlled conditions in the space in a manner that an occupant might perceive as similar to a pleasant sunny day outdoors.

An emulation of a cloudy day may not feel as exciting as the emulation of the sunny day, but such a control approach could be useful in some settings or for some purposes. Hence, chaotic control functions could be used to achieve lighting variations in one or more characteristics of light somewhat similar to those shown by way of examples in FIGS. 9A to 9C.

It should be noted, however, that the concepts described here are not particularly intended to copy or mimic exact characteristics of lighting on any particular day, e.g. the sunny day. The strategies here could be used to copy specific daylight characteristics, but typically would not. Instead, the intent of discussing the actual day light measurements is to learn and teach about relevant chaos theory based on the natural day conditions, and then develop our techniques to add analogous components via chaotic function control to dynamic change into the controlled lighting conditions in the illuminated space. Where the lighting device or system will varying more than one characteristic of the light, the components added to vary one characteristic may be different and/or relate to parameters of a different type of day. For example, the light flux or intensity might vary in accordance with the function shown in FIG. 6C, whereas one or both of the color characteristics might look more like those from one of the days discussed above relative to FIG. 8B, 8C, 9B or 9C.

In some instances outlined above, the controlled value of a light characteristic would be defined by a setting value plus a variable function that is or includes a chaotic function, such as one of functions discussed above relative to drawings such as FIGS. 4A, 4C, 6A to 6C and 7. However, some or all of the variations may be limited, for example, to insure that the variations do not deviate from setting values in a manner that might reduce serviceability of the lighting in the space 1. For example, it may be undesirable for the intensity to fall below a minimum specified by a government regulatory agency or for a color characteristic to vary in a manner that might be disturbing or distracting. Hence, the controller may be configured to limit extent of the variation in accordance with the chaotic function to less than or equal to a predetermined maximum amount and/or to limit rate of the variation in accordance with the chaotic function to less than or equal to a predetermined maximum rate.

The chaotic control of light may be implemented in one or more lighting devices 4. In the example of FIG. 1, one or each light fixture 3 is a single independent light fixture including its own source(s) 4 of visible light and its own controller 5. Each such controller in turn is configured to implement chaotic control in a manner as outlined above. Devices like fixtures 3 illuminating the same space may control the same characteristic(s) of light in the same way(s), or such devices may control different characteristics of light in a relatively independent manner. However, where some coordination of variation is desirable, e.g. to have two or more characteristics have variations that are somewhat coordinated (like those shown in FIGS. 8A to 8C or 9A to 9C), the chaotic control functions of devices illuminating one space may be synchronized or otherwise coordinated to achieve the desired results.

The present control concepts also may be implemented in lighting system type configurations. Such a system would include a number of light fixtures or other types of lighting devices. In a system of fixtures, each light fixture includes one or more sources of visible light and one or more controllers. The controllers in the light fixtures are configured to control operations of the sources in the fixtures in a coordinated manner to vary at least one characteristic of total visible light emitted by the sources into the space over the period of time at least in part in accordance with the chaotic function. To appreciate this later type of implementation, it may be helpful to consider the simplified network example shown in FIG. 10. The illuminated space (or spaces) and the occupants are omitted from FIG. 10, for convenience.

Figure 10:
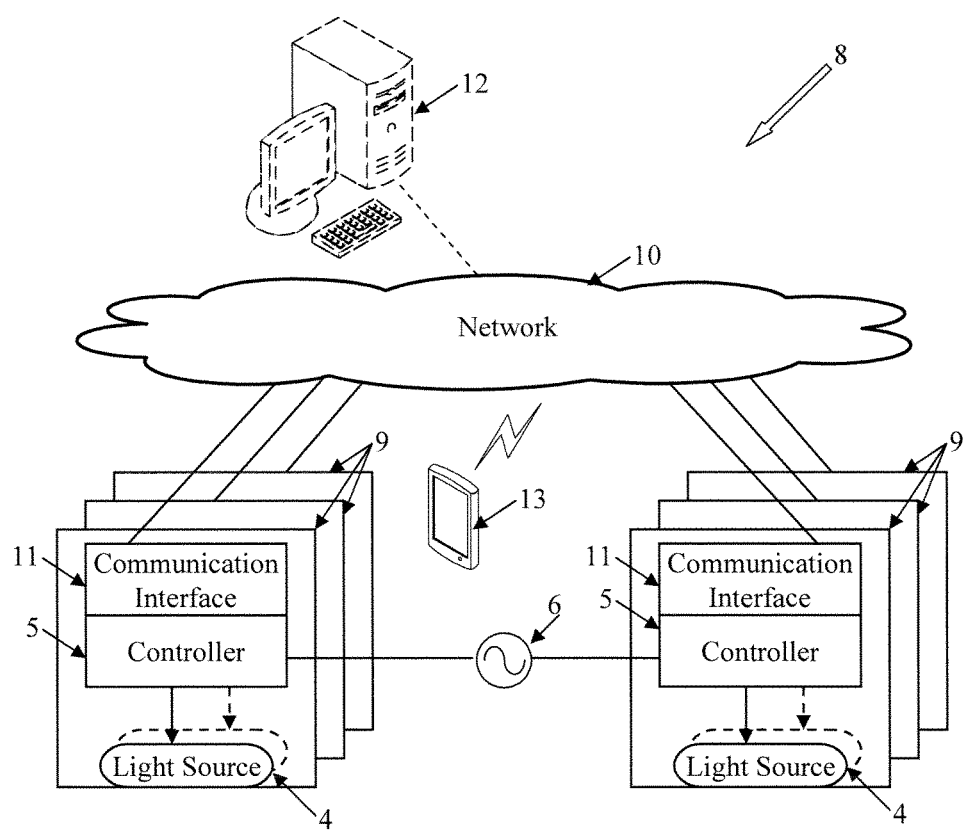
FIG. 10 is a functional block diagram of a system of light fixtures utilizing network communication.

Hence, FIG. 10 shows a system 8 of light fixtures 9 coupled for communication via a network 10. The fixtures 9 are similar to the fixtures 3 in that each of the fixtures 9 includes one or more light sources 4 and a controller 5 and draws power from a similar power source, represented again by connections to the AC mains 6. However, to enable communications via the network 10, each of the fixtures 9 also includes a communication interface 11. The communication interface 11 may be of any type suitable to provide the desired communication capabilities at the respective premises, e.g. bandwidth or data rate, for communication via the particular implementation of the network 10. The network 10 may be partially or entirely private, e.g. a local area network (LAN) or intranet; or the network 10 may be a wide area network such as the public Internet. The network 10 may utilize any appropriate wired, fiber or wireless technology or combination of two or more such technologies to provide communications capabilities for lighting and possibly for other data communications at the premises of the system installation and/or to devices or networks outside the premises. Based on the configuration of the network 10, the communication interface 11 may be an optical or electrical wired communication device, or the communication interface 11 may be an optical or radio frequency type wireless communication device. Data communication for the fixtures 9 could be one-way downstream toward the fixtures 9; however, in most cases, the network 10 and the communication interfaces 11 will support two-way data communications.

In such a network environment, control and coordination amongst the networked fixtures 9 may be implemented in a variety of ways. For example, the network may merely carry signals to enable the controllers 5 to synchronize their otherwise relatively independent chaotic control functions. However, in most networked implementations there will actually be a higher level control function, although that higher layer functionality can be implemented in several different ways/places in the system 8. For example, one of the controllers 5 may be designated as a 'master' controller with respect to the other 'slave' controllers 5. It may also be possible to implement the higher layer system control functionality on a distributed basis, in which some portion of processing resources of each of the controllers 5 is allocated to the higher layer system control functionality while other resources of the controllers perform their respective individual control functions in accordance with instructions derived collectively by the distributed higher layer control resources.

Another approach involves use of a separate additional control unit, shown in dotted line form at 12 in the drawing. Although the higher layer control functions of the system 8 may include a number of higher levels of control system computers, the simple example of FIG. 10 of the system 8 includes a computer that serves as a central or building control system. With regard to the controllers 5 in the light fixtures 9, the computer 12 may be programmed to operate as a server, although it may also include user interface elements such as a display and keyboard. In such an implementation, relative to the central control 'server,' the controllers 5 would be programmed or otherwise configured as client devices.

The central control computer 12 would receive data from the controllers 5 of the light fixtures 9 via the network 10. The data, for example, may represent operational states of the fixtures and/or include information about sensed conditions (if sensors are provided in the fixtures). The central control computer 12 would process the received data and, in accordance with its own programming, provide instructions and any necessary data to the controllers 5 of the light fixtures 9 via the network 10 to cause the system 8 as a whole to operate in a desired manner. Of particular note, the operations controlled in this manner would include various chaotic control functions of the type discussed above.

As noted, the computer 12 may include user interface elements. These elements for example allow responsible personnel to review data about system operations and to change operational parameters. The computer 12 may also download programming to the controllers 5 via the network 10. For high level control purposes, the exemplary system 8 also may include one or more user terminal or client computers, for personnel of the entity operating the lighting devices 9, represented generally by the tablet computer 13 shown in the drawing. Any type of terminal, capable of communicating via the particular network 10 may be used. The terminal would allow personnel at other locations to access the central control computer 12, to perform data review and control input functions similar to those available via the keyboard and display of the computer 12.

The networked fixtures 9 could all illuminate one space; or in a networked system 8, various groups of fixtures 9 could illuminate different spaces within or about a controlled building, campus or the like.

Although not shown, the system 8 also may include individual user interface elements coupled to the controllers 5 or to the network 10 for local user inputs similar to those provided by the interface 6 in the earlier example. For example, in a multi-room venue, there might be an ON-OFF switch and/or dimmer in each room to set the general intensity level. However, the controllers 5 of the fixtures 9 in each room would respond to the central control computer 12 and would implement chaotic control functions with respect to one or more characteristics of the artificial light emitted into each respective space.

The examples discussed so far have included relatively high-level illustrations and discussions of light fixtures 3 and 9 as examples of suitable lighting devices. The lighting devices, whether configured as fixtures, as lamps or as other types of lighting devices, may take a variety of forms or configurations. A lighting device of the type under consideration here, for example, may have one or more sources of any one or more suitable types. Also, the controller may be implemented by a micro-control unit (MCU), a microprocessor, a field programmable gate array, dedicated logic circuitry, etc. If a sensor is included, the sensor could provide feedback as to an operational state or parameter of the lighting device, or the sensor could measure an external condition such as intensity and/or color characteristic(s) of ambient light in the space to be illuminated. Ambient light sensing would detect light from any uncontrolled source that may illuminate the space, such as natural light or a lamp not incorporated into the controlled system. However, ambient light sensing may also detect at least some of the controlled artificial illumination, depending on the location, orientation and/or configuration of the sensor(s) used to detect ambient light in the space.

More specific examples of lighting devices discussed below utilize solid state type light sources. Although LEDs are discussed mainly as the examples of solid state light sources, other solid state devices such as OLEDs may be used instead of or in combination with LEDs.

Most applications of artificial lighting involve white light, that is to say, light that a person would typically perceive as white. In an application of chaotic function control intended to control only intensity of the light, a single intensity controllable white light source would be sufficient. In a solid state lighting device, for example, a single controllable channel of one or more LEDs producing white light could be controlled in intensity at least in part based on the chaotic function.

Many white LEDs today, however, do not produce a particularly good spectral quality of light. For example, many white LEDs tend to emit light that a person perceives as rather blue in color. Combination of white LEDs with other color LEDs improves the spectral characteristic of the white light output of the lighting device. Two or more sets of white LEDs emitting white light of different color temperatures used in combination produce white of a color temperature based on the combined characteristic of the different types of LEDs, which may be better than any one of the types produces alone.

Alternatively, white LEDs can be combined with LEDs emitting somewhat more monochromatic light of one or more colors chosen to essentially correct the color characteristic of the white LEDs. For example, a combination of bluish white light LEDs with green LEDs and/or with red, amber or orange LEDs can produce combined white light of a much more pleasing color characteristic than the bluish white LEDs alone.

The somewhat more monochromatic colors of light emitted by some types of colored LEDs may produce light of a narrow bandwidth around the characteristic color wavelength. To a person, such a color appears relatively pure or highly color saturated. Compared to white sources such as white LEDs, however, somewhat more monochromatic colors of light emitted by some types of colored LEDs may produce light of an intermediate bandwidth around the characteristic color wavelength. The bandwidth of light from this later type of colored LED would typically not be as broad as that of a white light source but would not be as narrow as the bandwidth of the saturated color type LED. To a person, such a color appears pastel.

In a simple design, white LEDs may be combined in a single string or control channel with the alternative type of white LEDS and/or with the somewhat more monochromatic LEDs. In such an arrangement, one control channel would vary the intensity of light output from all of the LEDs that together produce the white light, at least in part in accordance with a chaotic function.

For a white lighting device intended to control a color characteristic instead of or in addition to intensity, including the chaotic control function, the device would include two or more control channels for different LEDs producing light of different color characteristics. The different channels could provide RGB type control of red (R), green (G) and blue (B) LEDs. Other combinations of three or more relatively monochromatic colors may be used.

However, most implementations for general white lighting applications will include at least one channel for white light production, for example, to provide desired white light of suitable intensity in an efficient and cost effective manner. A simple two channel arrangement might use white LEDs of two different types respectively in the two channels. Another two channel approach might use white LEDs (of the same or different types) in both channels, but where one or both channels have additional somewhat more monochromatic LEDs to cause each channel to produce white light but two different color characteristics. Another two-channel approach would use white LEDs in one channel (alone or with corrective color LEDs in the same channel) together with somewhat more monochromatic LEDs in the other channel. In these arrangements, individual control of the intensity of light produced each of the two channels can vary the overall intensity of the light output from the white lighting device as well as one or more color characteristics of the combined light output. As discussed above, such control would include chaotic components, with respect to intensity and/or with respect to the one or more color characteristics of the combined light output.

Figure 11:
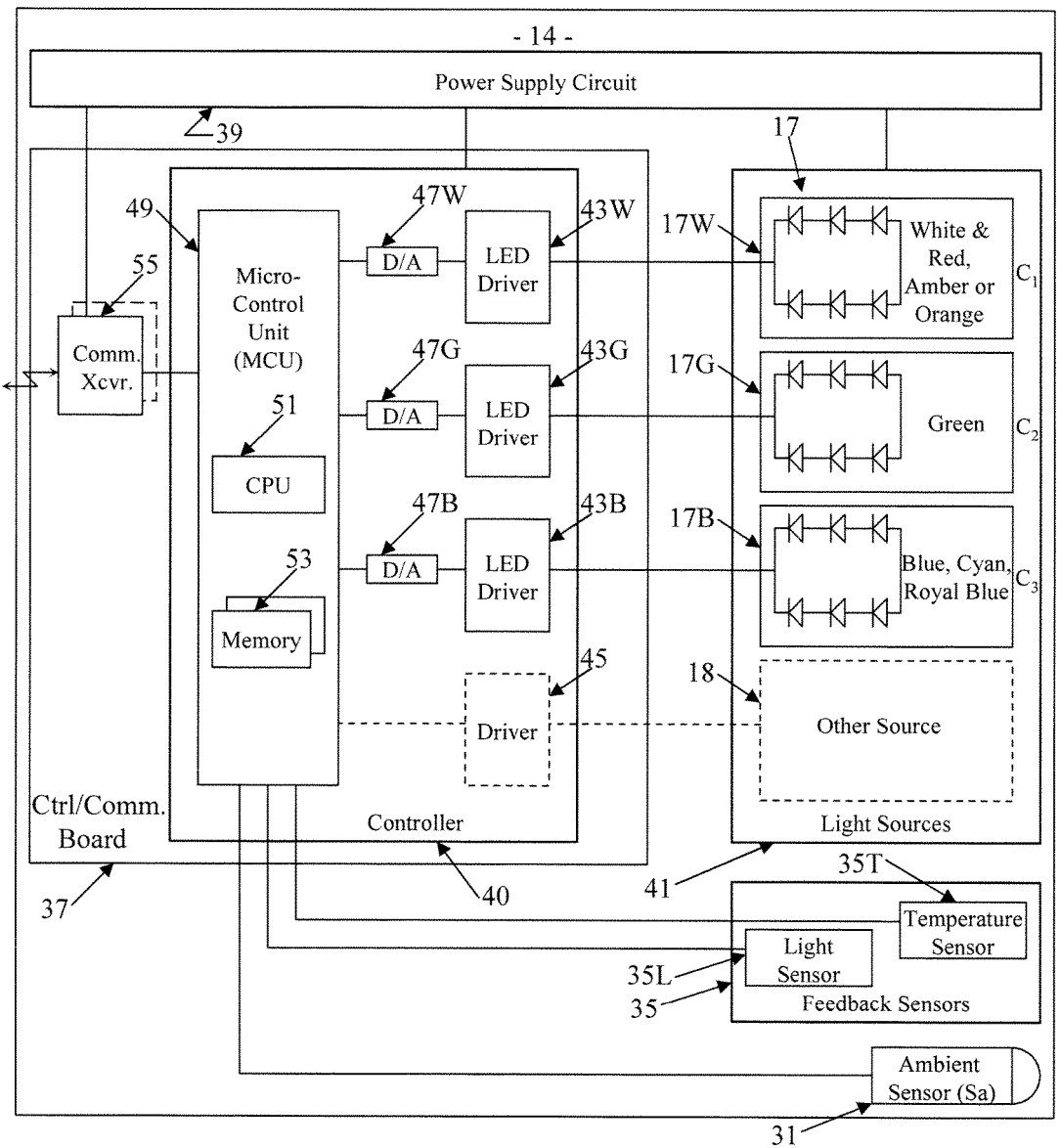
FIG. 11 is a somewhat more detailed block diagram of an example of a light fixture that may be used in the system of FIG. 1 or the system of FIG. 10.

At this point in our discussion, it may be helpful to consider a specific example of a lighting device, again in the form of an exemplary fixture. FIG. 11 is a functional block diagram of a light fixture 14 that utilizes at least a number of solid state sources 17 and may utilize an additional source or sources 18 of another type, such as a more conventional lamp like an incandescent lamp, a halogen lamp or a fluorescent lamp. The other source and its associated driver are shown in dotted line form since they may be omitted, for example, if the solid state sources 17 provide sufficient intensity for the particular lighting application.

In the example of FIG. 11, the fixture 14 includes a set of light sources 41. The present example utilizes solid state sources 17. Although other solid state devices may be used, such as organic light emitting diodes (LEDs), the example includes light emitting diodes (LEDs) as the solid state sources. The fixture 14 may utilize LEDs of two, three or more types, in two, three or more control channels. For example, as noted earlier, some fixtures may use RGB LEDs in three respective control channels. Several of the examples outlined earlier, e.g. with two strings of white or a string for white and a string for another non-white color may be with only two control channels. The example here provides at least three control channels, for three sets of solid state sources; and at least one of the sets of solid state sources in is configured to produce white light.

In the example, the first control channel $C_1$ includes solid state sources for white (W) light emission. Although there could be a single white LED, in the example, the first control channel $C_1$ includes a set of LEDs 17W that together produce white light. The set of LEDs 17W could be LEDs of one white type or two or more types of white LEDs. However, in the example, the set of LEDs 17W includes some white LEDs and a number of somewhat more monochromatic LEDs of one or more types, so that the string of LEDs 17W produces white light of a desirable color temperature and color characteristic(s). For example, together with the actual white LEDs, the set of LEDs 17W may include some number of red LEDs, some number of orange LEDs, some number of amber LEDs, any combination of two or all of these colors of LEDs, or combinations of one to or more of these colors of LEDs with yet further color LEDs. The non-white color LEDs in the set 17W may be configured to produce pastel light of the respective color(s) or light of relatively pure saturated color(s).

As noted, the example here uses three sets of LEDs in three control channels $C_1$ to $C_3$. Although additional sources of additional colors of light may be provided, the example includes two no-white color sources in the form of LED sources of green (G) and relatively blue (B) light. Hence, the array 17 of LEDs includes a green set of LEDs 17G and a blue set of LEDs 17B. Of course, other color LED sets could be used in place of 17G and/or 17B. The additional colors controlled through channels $C_2$ and $C_3$ enable tuning of the color characteristic(s) of the combined white light output of the lighting device 14 as well as chaotic control of the color characteristic(s).

Control of the intensities of the LED outputs from channels $C_1$ to $C_3$ provides control of the intensity of the combined white light output of the lighting device 14 as well as chaotic control of the light output intensity. Although there may be one LED of each color, in the examples, to provide desired intensity and variability, each of the sets of LEDs 17G and 17B include a number of LEDs. Each set may include a single type of LED of the respective color, or one or both sets may include one or more LEDs of each of a plurality of colors. For example, the set of LEDs 17B may include some number of blue LEDs, some number of cyan LEDs, some number of royal blue LEDs, any combination of two or all of these colors of LEDs, or combinations of one to or more of these colors of LEDs with yet further color LEDs generally in the blue light portion of the visible spectrum. The various color LEDs in the sets 17G and 17B may be configured to produce pastel light of the respective color(s) or light of relatively pure saturated color(s). Similar sets of LEDs but of different colors may be used as sources of additional colors of light in the chaotic control of color characteristic(s) of the combined light output of the fixture 14.

An additional source 18 of white light may be included to provide sufficient intensity for a particular general lighting application. If provided, the source 18 may be an additional set of LEDs similar to 17W of the same or different overall white light characteristics, or the source 18 may include one or more conventional devices of other types, as outlined above. Some other types of sources 18, however, such as incandescent or halogen lamps, typically are only readily controllable with respect to intensity, although the color characteristic(s) of the light produced by such a source may vary at relatively low intensity levels, at relatively high intensity levels and/or from source device to source device.

The electrical components shown in the example of FIG. 11 also include a source controller 40. The controller includes drivers corresponding to the particular set of light sources 41. Hence, in the example, the controller 40 includes white, green and blue LED driver circuits 43W, 43G and 43B, respectively. If the fixture includes another source 18, then the controller 40 also includes an appropriate driver 45.

The source controller 40 also includes a micro-control unit (MCU) 49. In the example, the MCU 49 controls the various LED driver circuits 43W, 43G, 43B via respective digital-to-analog (D/A) converters 47W, 47G, 47B. The intensity of the emitted light of a given LED is proportional to the level of current supplied by the respective driver circuit. The current output of each driver circuit is controlled by the higher level logic of the system. The D/A converter 47W controls the driver circuit 43W to provide a drive current to the LEDs 17W for the white first control channel $C_1$ as specified by the MCU 49. Similarly, and the D/A converter 47G controls the driver circuit 43G to provide a drive current to the green LEDs 17G as separately specified by the MCU 49 of the second control channel $C_2$; and the D/A converter 47B controls the driver circuit 43B to provide a drive current to the LEDs 17B for the third control channel $C_3$ as separately specified by the MCU 49; and in such an arrangement, the white light LED output may considered as another control channel $C_3$. If provided as outlined earlier, e.g. for white light or for additional colors or for additional sources of the same or similar light types, other sets of LEDs, forming additional channels, could be controlled/operated in a similar manner.

In operation, one of the D/A converters 47 receives a command for a particular level, from the MCU 49. In response, the converter 47 generates a corresponding analog control signal, which causes the associated LED driver circuit 43 to generate a corresponding power level to drive the particular string of LEDs 17. The LEDs of the string in turn output light of a corresponding intensity. The D/A converter 47 will continue to output the particular MCU specified driver setting level, until the MCU 49 issues a new command to the particular D/A converter 47. Thus, the particular set of LEDs 17 will continue to receive analog current and thus will continue to output light at the set analog level until the MCU 47 changes the applicable setting.

The example of FIG. 11 thus implements a form of analog current control for the LEDs 17, albeit to establish contributions to overall intensity of the combined fixture output light as well as to provide variations of color characteristic(s) and/or intensity in accordance with a chaotic function as discussed above relative to FIGS. 1-10. Of course, other control strategies may be applied to the LED channels, such as pulse width modulation, albeit to achieve similar outputs including chaotic function related variations in characteristic(s) of the fixture output light.

As noted, the MCU 49 controls the other light source 18, if included, via an appropriate source driver 45. For most conventional white light sources, the driver 45 simply turns ON/OFF the source 18 and may set an intensity level for the source output, in response to a command from the MCU 49. The control routine implemented via the programming of the MCU 49 would account for the inclusion of light from source 18 at any given intensity setting, as part of its overall control of the fixture output including chaotic functional variations. The MCU 49 may control the source 18 via the driver 45 as part of the variations. In other configurations, the MCU 49 may leave the driver 45 in a state so that source 18 provides a fairly steady output over time and implement the variations like those discussed earlier via control of the LEDs 17 via the converters 47R-G and the drivers 43R-G.

The MCU 49 in the example of the light fixture 14 is a microchip device that incorporates a processor serving as the programmable central processing unit (CPU) 51 of the MCU and thus of the light fixture 14. The MCU 49 also includes one or more memories 53 accessible to the CPU 51. The memory or memories 53 store executable programming for the CPU 51 as well as data for processing by or resulting from processing of the CPU 51. The CPU implements the program to process data in the desired manner and thereby generate desired control outputs, for example, to control the other elements of the fixture 14 to implement the general lighting application with chaotic function control as discussed herein.

The driver circuits, the A/D converters and the MCU receive power from a power supply 39, which is connected to an appropriate power source (not separately shown in this drawing). The power supply 39 provides AC to DC conversion if necessary, and converts the voltage and current from the source to the levels needed by the various electronic elements on the control and communication (Ctrl./Comm.) board 37. For most lighting applications of the type under consideration here, the power source will be an AC line current source; however, some applications may utilize DC power from a battery or the like. Also, the light fixture 14 may have or connect to a back-up battery or other back-up power source to supply power for some period of time in the event of an interruption of power from the AC mains.

The electrical system associated with the fixture 14, included on the Ctrl/Comm. board 37 also includes one or more communication interfaces 55. If the fixture is used in a network like that of FIG. 10, one communication interfaces 55 would be compatible with and provide data communications via the particular type of network. The same or a different communication interface may be used to provide communication with any local user interface device (like the device 6 in FIG. 1) that may be provided in the space to be illuminated by the fixture 14.

The communication interface 55 may be an optical or electrical wired communication device, or the communication interface 55 may be an optical or radio frequency type wireless communication device. The interface 55 may be a one-way device or a two-way device. For purposes of our discussion, the communications interface 55 allows the MCU 49 to communicate with various input and control elements that may be provided in or around the illuminated space and/or via a network with other fixtures and/or computers or terminals in a networked system implementation.

As noted earlier, a lighting device as discussed herein may include one or more sensors. In the fixture 14 of FIG. 11, the device includes one or more ambient light sensors (Sa) 31. The sensor Sa 31 provides intensity and/or color characteristic information regarding ambient lighting, as a condition input to the control logic, implemented in this example by the MCU 49. The sensor Sa 31 detects light from any uncontrolled source that may illuminate the space, such as natural light or a lamp not incorporated into the controlled system. However, ambient light sensor Sa 31 may also detect at least some of the controlled artificial illumination from the sources 17, 18, depending on the location, orientation and/or configuration of the ambient light sensor(s) Sa 31 relative to the illuminated space.

The programming of the CPU 51 configures the MCU 49 to control one or more characteristics of the visible combined light output of the fixture 14 based on the sensed ambient lighting, potentially including one or more aspects of the chaotic function-based variation. For example, when sensing high intensity day light in the space with chaotic variations, the MCU 49 may reduce the intensity of the light output of the fixture 14, reduce the magnitude of variation and/or adjust the timing of the variations of the artificial lighting produced by the chaotic control functionality. Instead of such inverse-phase control of the characteristics of the artificial component of the lighting in the space, sensor responsive adjustment may produce in-phase changes. For example, when the sensor(s) Sa 31 indicate an increase in intensity of daylight in the space, the MCU 49 may increase the intensity of the light output of the fixture 14, increase the magnitude of variation and/or change the timing of the variations of the artificial lighting produced by the chaotic control.

The electrical components of the light fixture 14 may also include one or more feedback sensors 35, to provide system performance measurements as feedback signals to the control logic, implemented in this example by the MCU 49. A variety of different feedback sensors may be used, alone or in combination, for different applications.

A temperature sensor 35T, for example, would provide feedback regarding operating temperature of system elements, such as one or more of the LEDs 17. If provided, the temperature sensor 35T may be a simple thermo-electric transducer with an associated analog to digital converter, or a variety of other temperature detectors may be used. The temperature sensor 35T is positioned on or inside of the fixture 14, typically at a point that is near the LEDs 17 or other source(s) 18 that produce most of or are most sensitive to, the system heat. The temperature sensor 35T provides a signal representing the measured temperature to the MCU 49. The system logic, here implemented by the MCU 49, can adjust intensity of one or more of the sets of LEDs 17 in response to the sensed temperature, for example, to allow the MCU 49 to adjust driver current(s) appropriately so as to achieve programmed LED outputs even though temperatures of the LEDs may vary with time of continuous system operation.

As another example, the fixture 14 may include one or more light responsive feedback sensors 35L. The light feedback sensor 35L differs from the ambient light sensor 31 in that sensor 35L is positioned or oriented to mainly detect light produced by the sources 17 and/or 18 of the fixture 14 and little or no light from external sources; whereas at least a substantial amount of light sensed by the ambient light sensor may be from one or more external sources, at least during particular times of day. A sensor 35L, for example, may be positioned to sense light within an optical integrating cavity that mixes the outputs from the LEDs 17 and the source(s) 18 to form the combined light output of the fixture 14. A light sensor 35 may sense intensity and/or a color characteristic of the light produced in or by the system 14 or 11B. Intensity feedback, for example, may be used to adjust drive current to the LEDs 17. Color characteristic feedback may be used to adjust the drive currents to combinations of LEDs 17 to adjust the characteristic of the combined light output of the fixture 14. Feedback from the light sensor 35L may also be used to adjust timing of light emissions, for example, to help ensure synchronization of chaotic variations by a number of similar fixtures illuminating the same space.

A fixture 14 may be implemented using a variety of optical and electrical housing elements. For example, it was mentioned briefly earlier that the fixture may utilize an optical integrating cavity to combine light from the various sources 17 and/or 18 to form the light output of the fixture 14. Other types of optical mixers may be used instead of the optical integrating cavity. Various reflectors or deflectors may be added to direct the output light in a manner appropriate for a particular illumination application. The fixture housing may facilitate a flush ceiling or wall mount, may allow the fixture to hang from a wall or be mounted on but extending out from a wall, etc. As noted in earlier discussions, however, even the fixture configuration is shown and described by way of example, since the concepts of chaotic functional control of lighting can be implemented in other types of lighting devices.

In a lighting device that utilizes a programmable device in the controller, such as a microprocessor or an MCU like 49, the relevant control functionality is defined by the executable instructions that program the CPU of the programmable device. The chaotic function control can be programmed into such a device as part of the initial construction or installation of a lighting device. Alternatively, the chaotic function control may be retrofitted into an existing fixture, device or system, for example, by updating the control program for the relevant controller(s). Generally, the discussion above has focused on techniques and equipment for implementing the chaotic function control of lighting. However, where a programmable controller is used, the chaotic function control may also be embodied in the control program for the device.

As lighting devices incorporate more intelligence, people are beginning to add more functionality, such as more sophisticated user interactivity. The world is becoming interconnected. The trend in technologies that control lighting is toward an "Internet of things" in which more and more machines are interconnected to communicate with each other and interact with the users via the Internet. However, there are many diverse ways to access the Internet, for example, with a computer via wired or fiber network (even with a WiFi local link) or with a mobile device (e.g. smartphone or tablet) via any of the various available public and private wireless networks.

For lighting, the lighting devices and controllers and possibly some central control element (e.g. a server) may communicate with each other via a network. The user in turn communicates with such a system via the Internet using one of these common access techniques instead of or in addition to interaction via system elements (e.g., a control panel, sensor, etc.) in the illuminated space. So, the user often now is coming in from another network that may be separate from the networking used for communications of the lighting system elements. The user also has their own device, albeit of their choosing, but separate and in addition to the elements of the lighting system. Such user access may be part of the problem. For example, use of other access technologies adds to the complexity of the system; and the integration of the lighting network with other user devices, may entail use of separate user device programming in addition to special programming in the lighting system, and/or may increase overall costs. In some cases, the additional devices and/or their software may not be adequately adapted to the lighting system and its operations.

To improve the user experience and provide a more effective or more efficient user interface, including lighting equipment with chaotic control, the various further examples of a lighting system discussed below and shown in the further drawings offer an interactive user interface implemented with the input and/or output components and associated processing functionality in one or more of the lighting devices. Stated another way, the lighting devices may themselves implement some or all of the interactive user interface to the lighting system, and the user interacts with the lighting system via the lighting devices.

Furthermore, the various examples of a lighting system discussed below and shown in the drawings offer responsive lighting conditions based on user activity and user conditions in addition to the chaotic control function discussed above. That is, not only does the lighting system respond to an interactive user interface and vary control based on a chaotic function, but the lighting system also responds to other conditions both sensed from within a space occupied by the user as well as acquired from outside of the space, thus learning from these other conditions. Over time, some of these learned inputs may be used to adjust future lighting or other controlled conditions alternatively or in addition to the chaotic function discussed above.

Figure 12:
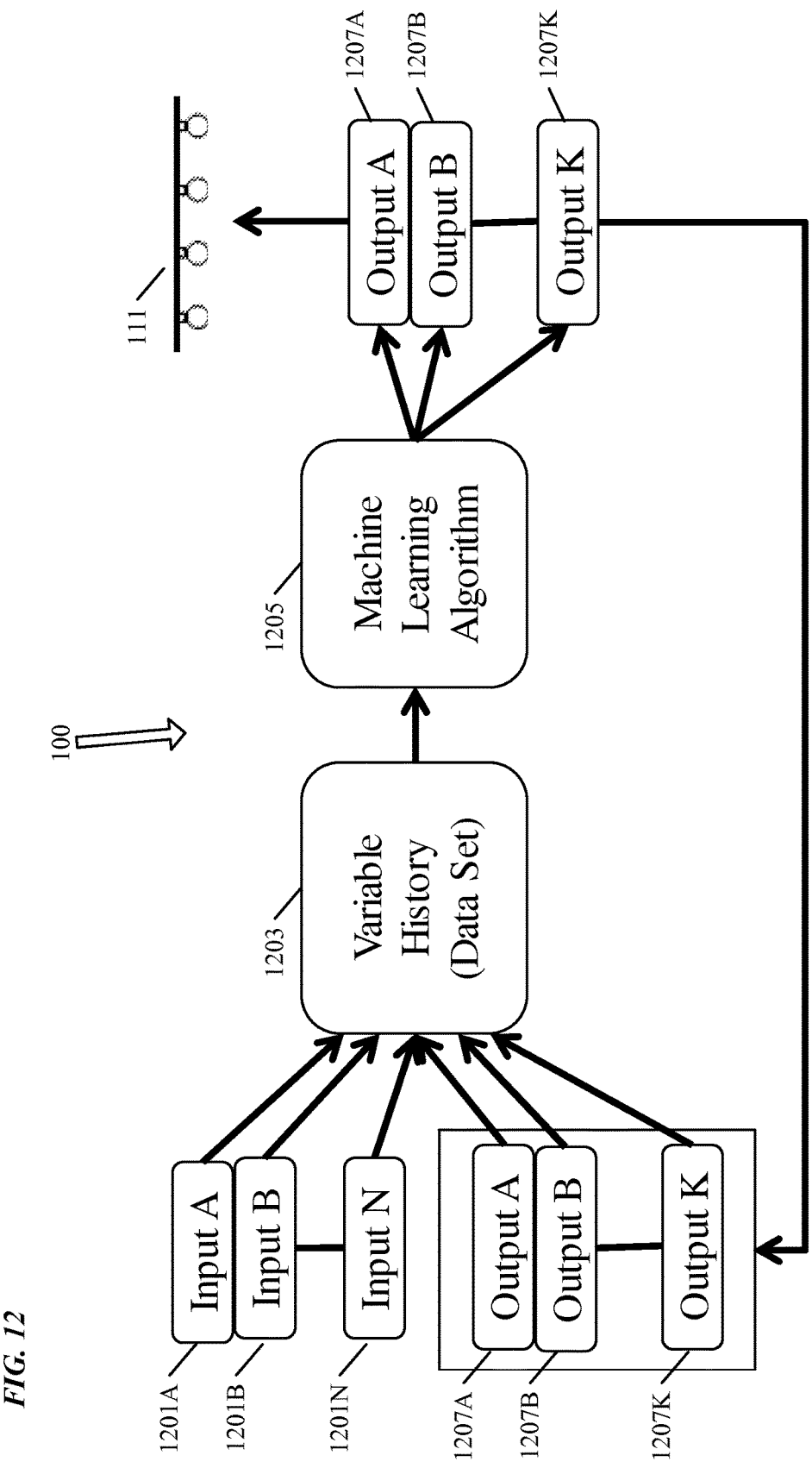
FIG. 12 is a simple example of a learning system with lighting control based on a range of inputs, including a range of previous outputs, historical data and a machine learning algorithm.

FIG. 12 illustrates a simple example of a learning system 100 that may be used to control a lighting function of an adjustable lighting device 111, such as one or more fixtures, lamps or other types of luminaires described in greater detail below. The learning system 100 receives various inputs 1201A, 1201B . . . 1201N, including previously generated outputs 1207A, 1207B . . . 1207K and generates the current outputs 1207A, 1207B . . . 1207K. These various inputs include, for example, user selectable options (i.e., direct user input), sensed conditions (e.g., indirect user input based on user activity, other non-user activity, or other conditions such as time of day, temperature, weather conditions, etc.) and other criteria (e.g., a chaotic function, parameters of a chaotic function, a nominal function, parameters of a nominal function). Inputs may also include information obtained via external network communications, such as user inputs via a remote device or status or the like about a user occupant obtained from an on-line service. The outputs correspond to, for example, a variety of light output parameters, such as ON/OFF, intensity (when ON) and various color-related characteristics, as well as other criteria, such as a chaotic function and/or parameter(s) of the chaotic function as described in greater detail above, which may change or vary the output of lighting device 111 in response to a control signal or command from the system 100.

The learning system 100 includes a variable history 1203, commonly referred to as a data set. The variable history (data set) 1203 includes not only the currently received various inputs 1201A, 1201B, 1201N and outputs 1207A, 1207B . . . 1207K, but also all previously received inputs and outputs. For personalized control, the data set becomes part of or is linked to a profile of a particular user who may occupy the space from time to time.

This variable history (data set) 1203 is provided to a machine learning algorithm 1205 which in turn generates the outputs 1207A, 1207B . . . 1207K. The machine learning algorithm 1205 is, for example, a neural network that "learns" how to manipulate the various inputs, including previously generated outputs, in order to generate current outputs. As part of this "learning" process, the neural network calculates weights to be associated with the various inputs, including the previously generated outputs. The weights are then utilized by the neural network to manipulate the inputs, including the previously generated outputs, and generate the current outputs. Although FIG. 12 illustrates a simple example of the learning system 100, such learning system 100 may be more or less complex, including any number of inputs and outputs with a variable history (data set) 1203 that may be filtered or otherwise controlled and any number of different learning algorithms 1205. Hardware for receiving the inputs, storing the data set and running the learning algorithm to control the lighting device will be discussed later.

Figure 13:
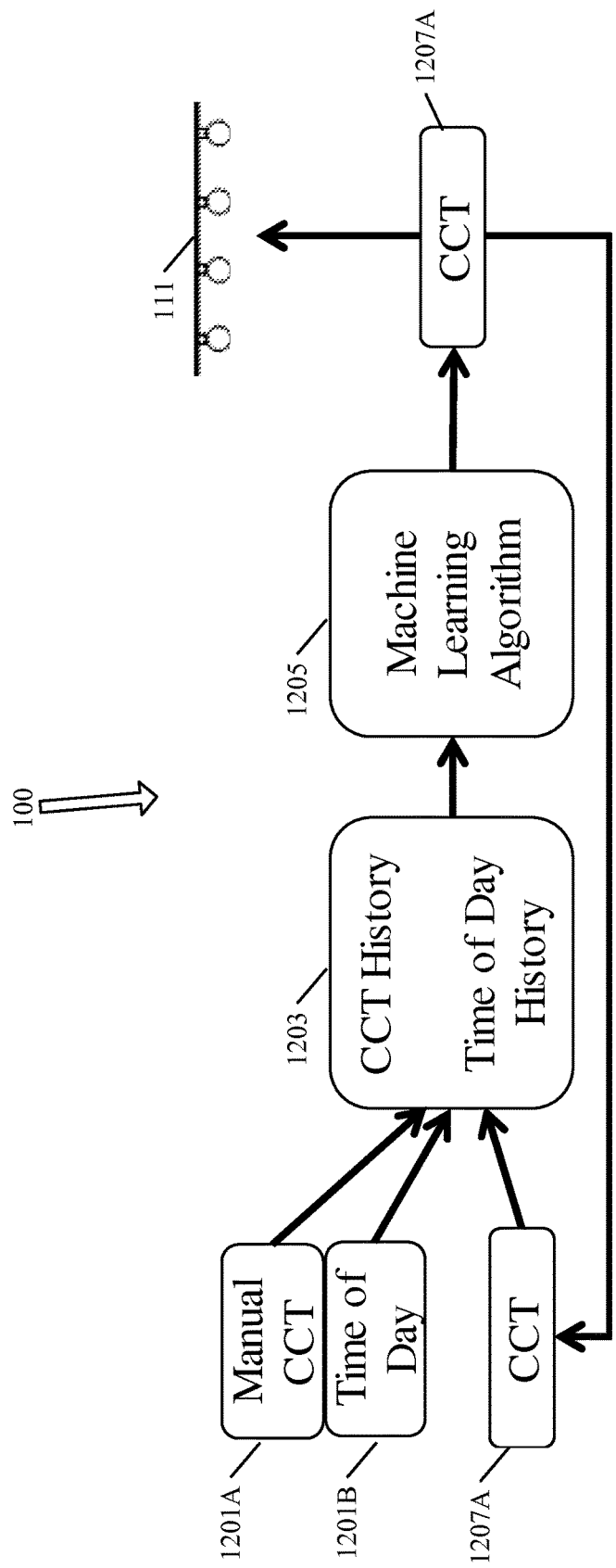
FIG. 13 is another example of the learning system of FIG. 1 with three inputs, including a previous output, historical data and a machine learning algorithm where the output controls a lighting function.

For simplicity, FIG. 13 is an example of the learning system 100 of FIG. 12 with three inputs (two inputs and a previous output) that generates one output. Although a variety of light output parameters may be controlled, the example of lighting device 111 in the discussions below is controlled to adjust the correlated color temperature (CCT) of the light output. In this example, input 1201A is a manual user adjustment of the CCT of adjustable lighting device 111. The color temperature of a lamp or other light source is the temperature of an ideal black body radiator that radiates light of comparable hue to that of the lamp or other light source. Color temperature is conventionally stated in Kelvin (K). CCT is the color temperature of a black body radiator which to human color perception most closely matches the light from the lamp or other light source. Thus, in this example, the user is attempting to change the CCT of adjustable lighting device 111. Input 1201B is the time of day corresponding to the manual user adjustment. The output 1207A is the CCT that will be applied to adjustable lighting device 111.

In the example of FIG. 13, the data set 1203 includes all previous manual user adjustments of CCT as well as the time of day corresponding to each manual user adjustment. The machine learning algorithm 1205 takes the data set 1203 and generates a current CCT value 1207A to be applied to adjustable lighting device 111. In this way, the learning system 100 "learns" from current and previous manual CCT adjustments by the user such that the learning system 100, for example, anticipates future CCT adjustments. Stated another way, learning system 100 may automatically adjust the CCT of adjustable lighting device 111 based on a current time of day in light of previous similar CCT adjustments made by the user. As such, the CCT of adjustable lighting device 111 is, for example, adjusted to meet a user's needs and desires without requiring any user intervention to effect the change.

Although FIG. 13 depicts one input as a direct lighting parameter (e.g., CCT) as well as the resulting output being the lighting parameter, this need not always be the case. Alternatively, or in addition, such input and/or output may only indirectly relate to one or more lighting parameters. For example (not shown), one input is a chaotic function, as discussed above, that serves to vary the lighting parameter (e.g., CCT) over a period of time within the space. In this example, the output is the chaotic function that has been changed such that the lighting parameter is varied differently than before the change. Such change invokes, for example, a change to one or more of the parameters of the chaotic function. Using equation 1 as our example of a chaotic function, the change may modify the value of r or the rate of iteration of the value n. Alternatively, or in addition, such change is, for example, a replacement of the chaotic function with a different chaotic function. In this way, the learning system 100 adjusts lighting device 111 through both direct and indirect adjustment of one or more lighting parameters.

Figure 14:
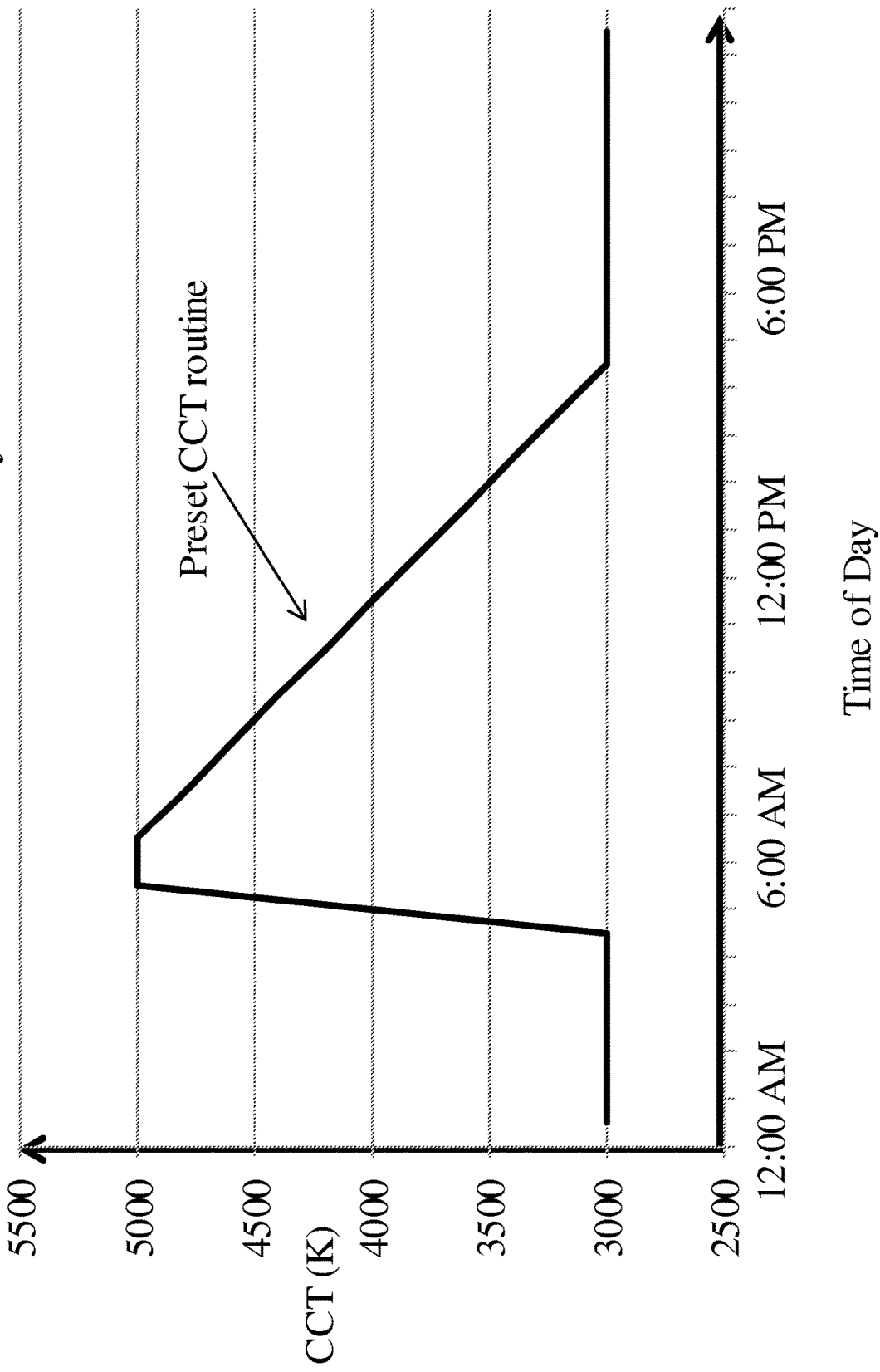
FIG. 14 is a graph depicting an example of a preset lighting control function.

FIG. 14 illustrates a graph of a preset lighting control function, in this example, related to the CCT of a light source (e.g., adjustable lighting device 111) whenever ON during a 24-hour cycle. In this graph, the y axis represents the CCT level, in K, and the x axis represents the time of day, in hourly increments. The preset lighting control function, for example, adjusts the CCT or color temperature of a lighting device, such as adjustable lighting device 111. In a further example, the preset lighting control function adjusts the CCT based on a chaotic function, such as described above. As depicted in the graph, the preset lighting control function sets the CCT to 5,000 K, a cool white, at approximately 5:00 AM. Then, throughout the day, the preset lighting control function adjusts the CCT until it reaches 3,000 K, a warm white, at approximately 4:30 PM. The preset lighting control function maintains the CCT at 3,000 K until approximately 5:00 AM the next morning, when the cycle repeats itself. In this way, the preset lighting control function, for example, replicates variations in color characteristics of daylight throughout the daytime working hours of each day and a steady selected CCT (e.g., 3,000 K) at other times.

Figure 15:
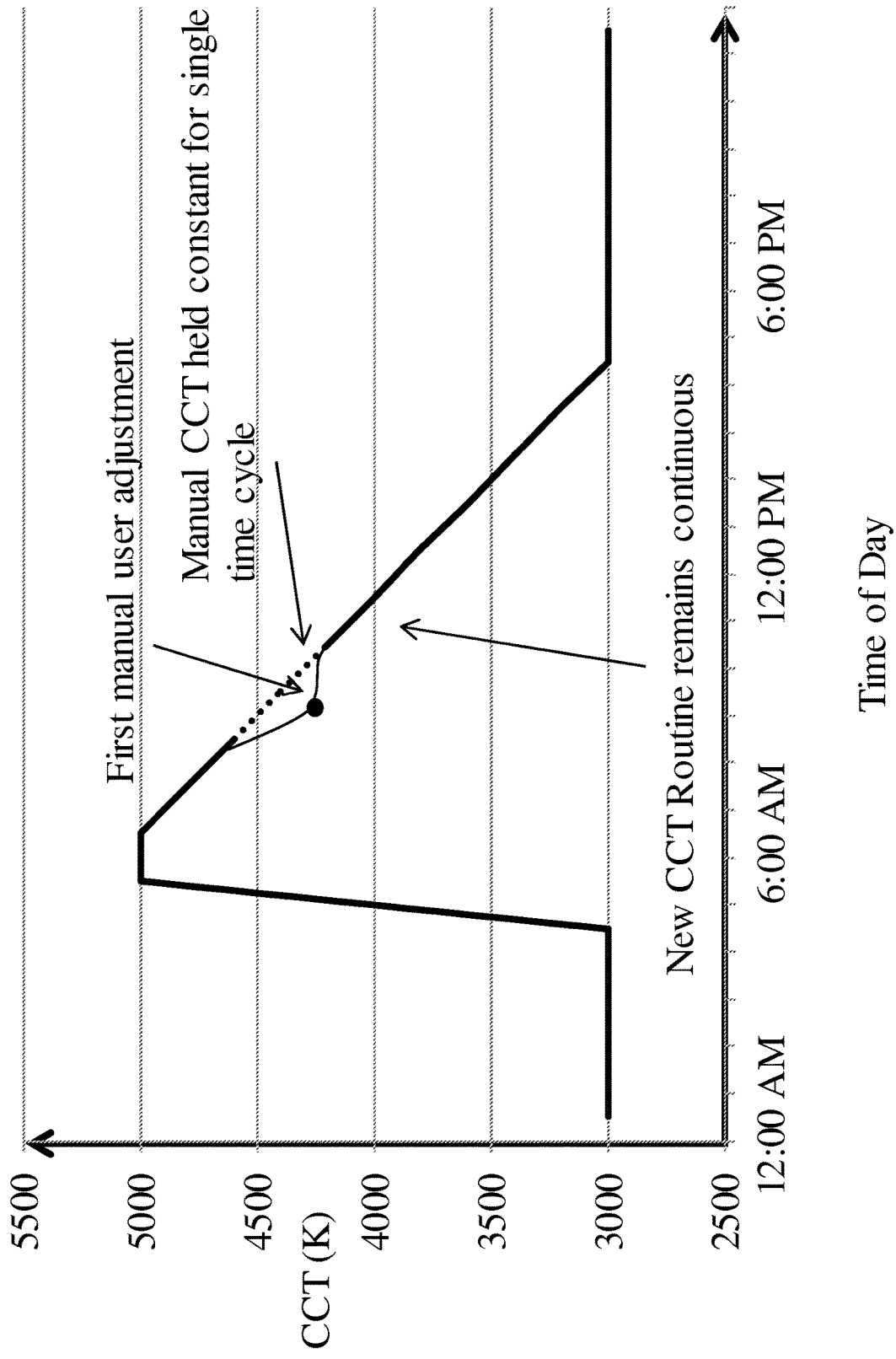
FIG. 15 is a graph depicting an example of the preset lighting control function of FIG. 14 with a manual user adjustment to the lighting control function.

FIG. 15 illustrates a graph of the preset lighting control function, depicted in FIG. 14, as well as a manual user adjustment. At approximately 9 AM, in this example, a user adjusts the CCT of the lighting device 111. Such user adjustment, however, only remains effective for a single time cycle (e.g., one hour in the example). At approximately 10 AM, in this example, the preset lighting control function returns to adjusting the CCT in accordance with the preset schedule. Although not explicitly shown in FIG. 15, such user adjustment, for example, becomes input 1201A of the learning system 100 in FIG. 13; and the time of day at which the user adjustment was made, for example, becomes input 1201B. In addition, the current CCT of lighting device 111 just prior to the user adjustment, for example, becomes output 1207A as the additional input in FIG. 13. These three input values (i.e., user adjustment, time of day, and current CCT) become part of the data set 1203 and flow into the machine learning algorithm 1205, which influences the actual CCT value of lighting device 111 in response to the user adjustment.

Although FIG. 15 depicts the learning system 100 influencing the CCT value of lighting device 111 in response to the manual user adjustment as a single occurrence, such single occurrence is stored as part of the data set 1203 of learning system 100. As a result, at approximately 9 AM on subsequent days, the learning system 100 will, for example, influence the actual CCT value of lighting device 111 in accordance with the previous manual user adjustment. Thus, the data set 1203 begins to define a modified lighting control function in contrast to the original (or 'default') preset lighting control function.

Figure 16:
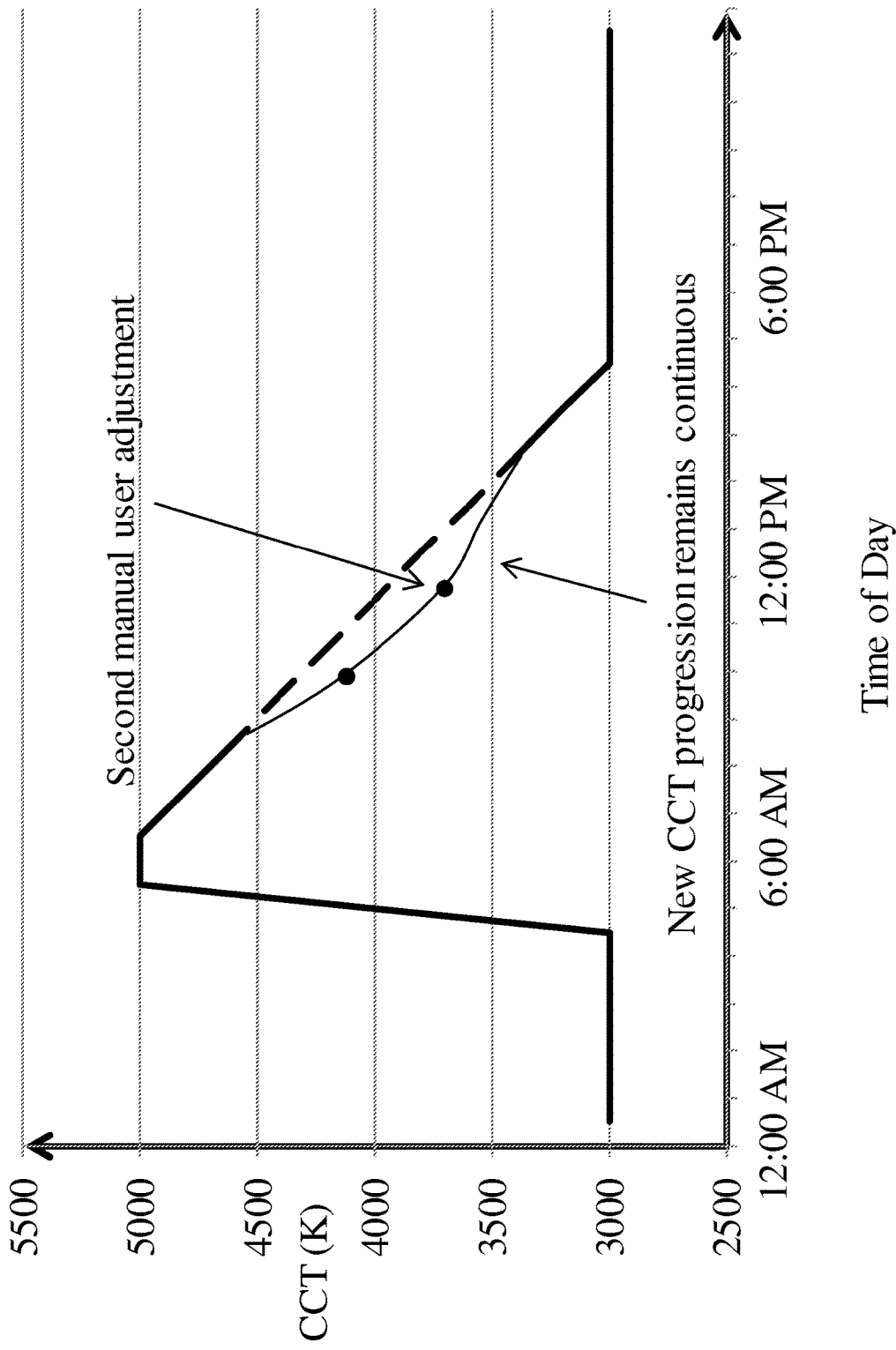
FIG. 16 is a graph depicting an example of the preset lighting control function of FIG. 14 with two manual user adjustments to the lighting control function.

FIG. 16 illustrates a graph of the preset lighting control function and the modified lighting control function based on the first user adjustment of FIG. 15 as well as a second manual user adjustment. Although such second manual user adjustment may be made on the same day as the first user adjustment, for clarity, it is assumed that FIG. 15 represents a previous day and FIG. 16 represents a subsequent day such that the second manual user adjustment is made on a later day than the first user adjustment. Thus, at approximately 9 AM, the learning system 100, based on data set 1203 including the first manual user adjustment of FIG. 15, influences the adjustment of the CCT of lighting device 111. Furthermore, at approximately 11 AM, in this example, the user again adjusts the CCT of lighting device 111. This second user adjustment also only remains effective for a single time cycle (e.g., one hour) and then the preset lighting control function returns to adjusting the CCT. As with FIG. 15, although not explicitly shown, this second user adjustment, the time of day of the adjustment, and the current CCT prior to the adjustment are all fed into the learning system 100 of FIG. 13. In this way, the second set of inputs also become part of the data set 1203 and flow into the machine learning algorithm 1205, which further influences the actual CCT value of lighting device 111 in response to the user adjustment. In addition, as described above, this additional occurrence of a manual user adjustment stored in the data set 1203 further defines the modified lighting control function.

Figure 17:
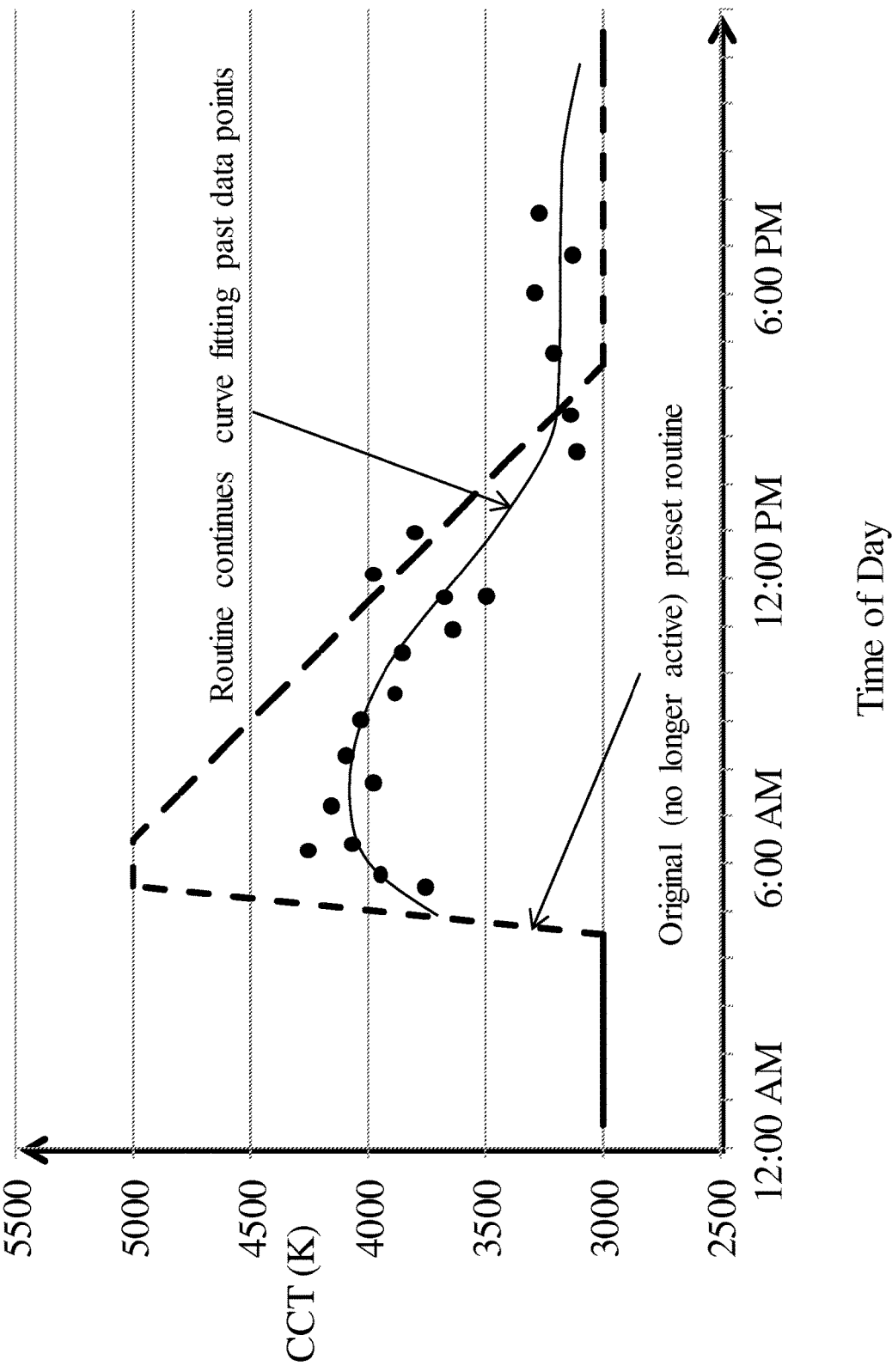
FIG. 17 is a graph depicting an example of a learned lighting control function based on various manual user adjustments to the preset lighting control function.

Over time (e.g., several days to a few weeks), various user adjustments will be made at various times throughout each day. Each additional occurrence of a manual user adjustment not only influences the lighting device 111 adjustment at that time, but also further defines the modified lighting control function. FIG. 17 illustrates a graph of the preset lighting control function and the modified lighting control function based on these various user adjustments. As described above in relation to FIGS. 15-16, these various user adjustments are additional inputs to and add to the data set 1203 of the learning system 100 of FIG. 13. Based on the expanded data set 1203 and "learning" by the machine learning algorithm 1205, a "learned" modified lighting control function, depicted by a solid light curved line in FIG. 17, that more closely matches the various user adjustments replaces the preset lighting control function, depicted by a dashed line in FIG. 17. In this way, adjustable lighting device 111 is, for example, operated in accordance with the modified lighting control function that learns from user interaction and adjusts operations based on user activity.

Although not explicitly depicted, a chaotic function such as described above in relation to FIGS. 1-10 may also be applied to the outputs (e.g., CCT) of the learning algorithm 1205, thus further influencing lighting characteristics. Alternatively, or in addition, such chaotic function may itself be an output and thus learning algorithm 1205 indirectly influences lighting characteristics by directly influencing the chaotic function. Furthermore, such chaotic function influenced characteristic values also become part of the expanded data set 1203 and further influence subsequent operation of the machine learning algorithm 1205 resulting in enhanced learning by the system.

In some situations, each occurrence of a manual user adjustment may be distinct and not overlap with any other occurrence (i.e., a 9 AM adjustment, a 10 AM adjustment and a 2 PM adjustment). In these situations, the modified lighting control function is simply the collection of all manual user adjustments. In other situations, however, user adjustments may occur in such a way that multiple occurrences overlap (e.g., a 9 AM Monday adjustment that is different from a 9 AM Wednesday adjustment). First, it should be noted that the day of the week would represent an additional input that could be stored in data set 1203 and further influence both the current output as well as the modified lighting control function. As discussed above, learning system 100 may be designed with any number of inputs (as well as any number of outputs) in order to capture the necessary complexity of the task. As described in greater detail below, such inputs may include not only direct user input, but also indirect user interaction as well as other conditions sensed from within a space and/or acquired elsewhere (e.g., occupancy, amount of daylight (or other light) within the space, temperature, current electricity cost, etc.). In addition, learning system 100 may be designed with any one or some combination of machine learning algorithm (s) 1205. It is this machine learning algorithm 1205 that defines how such overlapping occurrences will be combined to influence any given output and the modified lighting control function. In one simple example based on the system 100 of FIG. 13, learning algorithm 1205 performs a "best fit" to form a function and/or curve based on the user inputs (e.g., sum all overlapping adjustments and divide by the number of overlapping adjustments to determine an average adjustment).

The learning techniques like those outlined above may be implemented in or control a single lighting device or in a system controlling a few or a substantial number of lighting devices. Even a single standalone device, however, may be network connected if the device is intended to use remote data sources as one or more of the inputs. For discussion purposes, however, we will next consider a system of devices that provides lighting services throughout a premises.

Figure 18A:
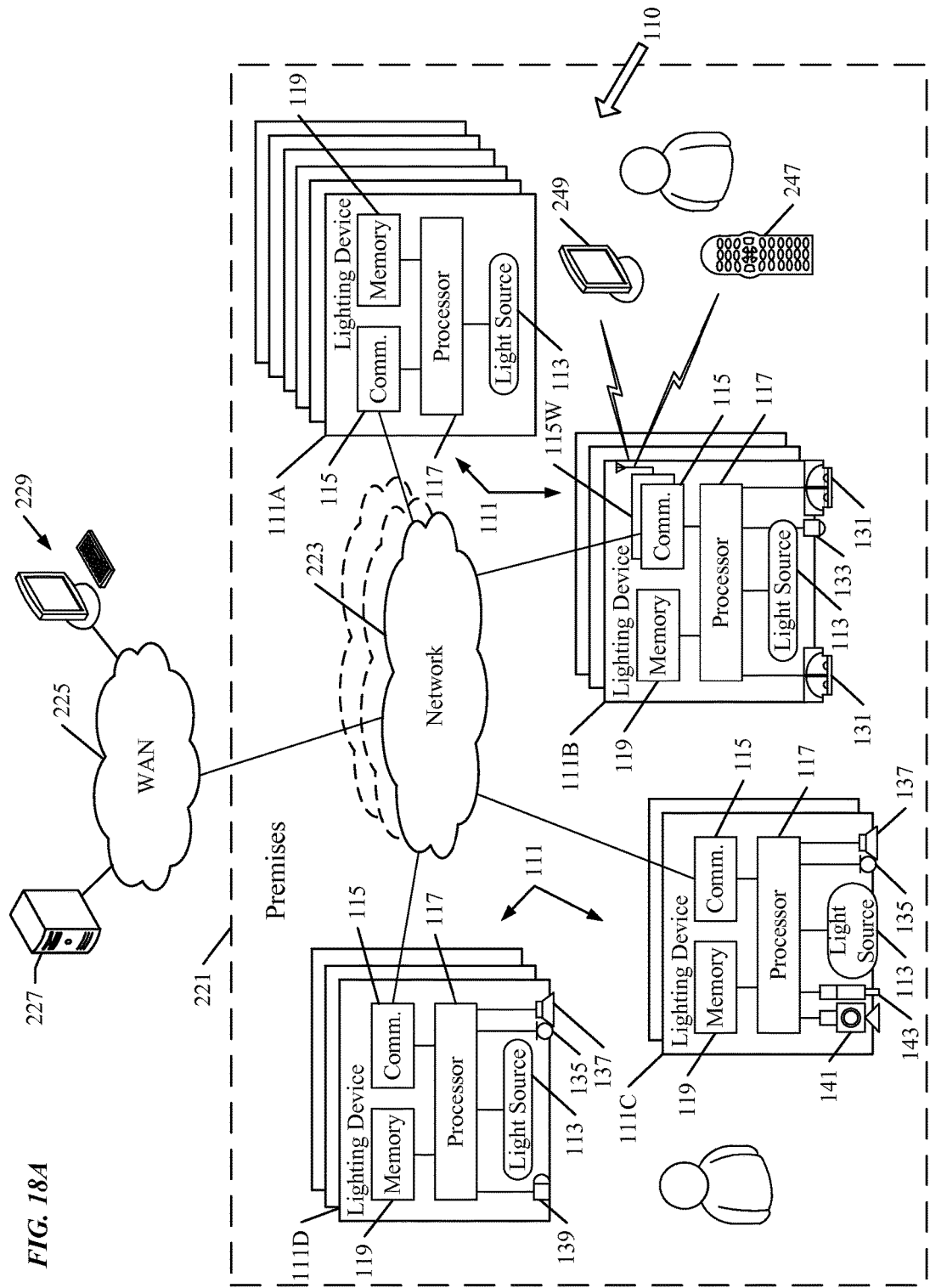
FIG. 18A is a functional block diagram of a simple example of a system having intelligent lighting devices, at least some of which include components and are configured to implement an interactive user interface.

FIG. 18A illustrates an example of a system 110, that may utilize the learning system 100 to control a number of lighting devices 111 at a premises 221, in block diagram form. The illustrated example of the system 110 includes a number of adjustable lighting devices 111, such as fixtures or lamps or other types of luminaires. Control of such lighting devices 111 is, for example, based on identifying one or more occupants of a room or other space within premises 221 and operating the lighting devices 111 in accordance with a corresponding profile of each identified occupant. As described above and further below, such corresponding profile may be learned via learning system 100. Several different configurations of the lighting devices 111 are shown by way of examples. The represented differences amongst the examples of devices 111 will be discussed more fully later.

The term "lighting device" as used herein is intended to encompass essentially any type of device that processes power to generate light, for example, for illumination of a space intended for use of or occupancy or observation, typically by a living organism that can take advantage of or be affected in some desired manner by the light emitted from the device. However, a lighting device 111 may provide light for use by automated equipment, such as sensors/monitors, robots, etc. that may occupy or observe the illuminated space, instead of or in addition to light provided for an organism. A lighting device 111, for example, may take the form of a lamp, light fixture or other luminaire that incorporates a source, where the source by itself contains no intelligence or communication capability (e.g. LEDs or the like, or lamp ("regular light bulbs") of any suitable type). Alternatively, a fixture or luminaire may be relatively dumb but include a source device (e.g. a "light bulb") that incorporates the intelligence and communication capabilities discussed herein. In most examples, the lighting device(s) 111 illuminate a service area to a level useful for a human in or passing through the space, e.g. regular illumination of a room or corridor in a building or of an outdoor space such as a street, sidewalk, parking lot or performance venue. However, it is also possible that one or more lighting devices 111 in or on a particular premises 221 served by a system 110 have other lighting purposes, such as signage for an entrance or to indicate an exit. Of course, the lighting devices 111 may be configured for still other purposes, e.g. to benefit human or non-human organisms or to repel or even impair certain organisms or individuals.

Each respective adjustable lighting device 111 includes a light source 113, a communication interface 115 and a processor 117 coupled to control the light source 113. The light sources may be virtually any type of light source suitable to providing illumination that may be electronically controlled. The light may be of the same general type in all of the lighting devices, e.g. all formed by some number of light emitting diodes (LEDs); although in many installations, some number of the lighting devices 11 may have different types of light sources 113.

The processor 117 also is coupled to communicate via the interface 115 and the network link with one or more others of the lighting devices 111 and is configured to control operations of at least the respective lighting device 111. The processor may be implemented via hardwired logic circuitry, but in the examples, the processor 117 is a programmable processor such as a central processing unit (CPU) of a microcontroller or a microprocessor. Hence, in the example of FIG. 18A, each lighting device 111 also includes a memory 119, storing programming for execution by the processor 117 and data that is available to be processed or has been processed by the processor 117. The machine learning algorithm 1205 and data set 1203 of FIG. 13, as well as a learned profile of each identified occupant, are examples of such programming and data stored in memory 119 for execution and processing by processor 117. The processors and memories in the lighting devices may be substantially the same throughout the devices 111 throughout the premises, or different devices 111 may have different processors 117 and/or different amounts of memory 119, depending on differences in intended or expected processing needs.

In the example, each lighting device has the processor, memory, programming and data set to implement the learning and related control functions under consideration here. These elements, programming, data and functions, however, may be arranged in a system in other ways. For example, in each area of a premises, one lighting device may be configured as a 'leader', to perform learning and high level control, and provide instructions to some number of other 'follower' lighting devices serving the particular area. Another approach might distribute some of the processing on a shared bases across some number of the lighting devices.

Returning to the specific examples, the intelligence (e.g. processor 117 and memory 119) and the communications interface(s) 115 are shown as integrated with the other elements of the lighting device or attached to the fixture or other element that incorporates the light source. However, for some installations, the light source may be attached in such a way that there is some separation between the fixture or other element that incorporates the electronic components that provide the intelligence and communication capabilities. For example, the communication component(s) and possibly the processor and memory (the 'brain') may be elements of a separate device or component coupled and/or collocated with the light source 113.

In our example, the system 110 is installed at a premises 221. The system 10 also includes a data communication network 223 that interconnects the links to/from the communication interfaces 115 of the lighting devices 111, so as to provide data communications amongst the intelligent lighting devices 111. Such a data communication network 223 also is configured to provide data communications for at least some of the lighting devices 111 via a data network 225 outside the premises, shown by way of example as a wide area network (WAN), so as to allow devices 111 or other elements/equipment at the premises 221 to communicate with outside devices such as the server/host computer 227 and the user terminal device 229. The wide area network 225 outside the premises, may be an intranet or the Internet, for example.

The premises 221 may be any location or locations serviced for lighting and other purposes by a networked intelligent lighting system of the type described herein. The lighting devices 111 are located to provide lighting service in various areas in or about the premises 221. Most of the examples discussed below focus on building installations, for convenience, although the system may be readily adapted to outdoor lighting. Hence, the example of system 110 provides lighting and possibly other services in a number of service areas in or associated with a building, such as various rooms, hallways, corridors or storage areas of a building and an outdoor area associated with a building. Any building forming or at the premises 221, for example, may be an individual or multi-resident dwelling or may provide space for one or more enterprises and/or any combination of residential and enterprise facilities.

The lighting devices 111, as well as any other equipment of the system or that uses the network 223 in the service areas of the premises 221, connect together with and through the network links and any other media forming the communication network 223. For lighting operations, the lighting devices 111 (and other system elements if any) for a given service area are coupled together for network communication with each other through data communication media to form a portion of a physical data communication network. Similar elements in other service areas of the premises are coupled together for network communication with each other through data communication media to form one or more other portions of the physical data communication network at the premises 221. Local communication over the network, for example, enables some number of lighting devices serving a room or other area to coordinate user identifications, input processing, learning and light source control, e.g. to provide coordinated illumination of the particular space.

The communication interface 115 in each lighting device 111 in a particular service area will be of a physical type and configured to operate in a manner that is compatible with the physical media and electrical protocol(s) implemented for the particular service area and/or throughout the premises 223. Although the communication interfaces 115 are shown communicating to/from the network cloud via lines, such as wired links or optical fibers; some or all of the interfaces 115 may use wireless communications media such as optical or radio frequency wireless communication. Also, although the examples in FIG. 18A show most of the lighting devices 111 having one communication interface, some or all of the lighting devices 111 may have two or more communications interfaces to enable data communications over different media with the network(s) and/or with other devices in the vicinity.

The various portions of the network in the service areas in turn are coupled together to form a data communication network at the premises, for example to form a premises-wide local area network (LAN) or the like. The overall premises network, generally represented by the cloud 223 in the drawing, encompasses the data links to/from individual devices 111 and any networking interconnections within respective areas of the premises where the devices 111 are installed as well as the LAN or other premises-wide interconnection and associated switching or routing. In many installations, there may be one overall data communication network 223 at the premises 221. However, for larger premises and/or premises that may actually encompass somewhat separate physical locations, the premises-wide network may actually be built of somewhat separate but interconnected physical networks represented by the dotted line clouds. The LAN or other data network forming the backbone of system network 223 at the premises 221 may be a data network installed for other data communications purposes of the occupants; or the LAN or other implementation of the network 223, may be a data network of a different type installed substantially for lighting system use and for use by only those other devices at the premises that are granted access by the lighting system elements (e.g. by the lighting devices 111). Communications amongst devices serving different areas of the premises, for example, may enable communication of some relevant input data, enable device(s) in one area to obtain a user profile from a device in another area, and/or support a distributed implementation of some or all of the relevant processing.

Hence, there typically will be data communication links within a room or other service area as well as data communication links from the lighting devices 111 in the various rooms or other service areas out to wider network(s) forming the data communication network 223 or the like at the premises 221. Devices 111 within a service area can communicate with each other, with devices 11 in different rooms or other areas, and in at least some cases, with equipment such as 227 and 229 outside the premises 221. For example, server 227 implements an on-line service and device(s) 111 and/or system 110 communicate with server 227 to determine a status of an identified occupant for the on-line service.

Various network links within a service area, amongst devices in different areas and/or to wider portions of the network 223 may utilize any convenient data communication media, such as power lines wiring, separate wiring such as coax or Ethernet cable, optical fiber, free-space optical, or radio frequency wireless (e.g. Bluetooth or WiFi); and a particular premises 221 may have an overall data network 223 that utilizes combinations of available networking technologies. Some or all of the network communication media may be used by or made available for communications of other gear, equipment or systems within the premises 221. For example, if combinations of WiFi and wired or fiber Ethernet are used for the lighting system communications, the WiFi and Ethernet may also support communications for various computer and/or user terminal devices that the occupant(s) may want to use in the premises. The data communications media may be installed at the time as part of installation of the lighting system 110 at the premises 221 or may already be present from an earlier data communication installation. Depending on the size of the network 223 and the number of devices and other equipment expected to use the network 223 over the service life of the network 223, the network 223 may also include one or more packet switches, routers, gateways, etc.

In addition to a communication interface 115 for enabling a lighting device to communicate via the network 223, some of the devices 111 may include an additional communication interface, shown as a wireless interface 115W in the lighting device 111B. The additional interface allows other elements or equipment, such as a host computer or server like 227, to access the communication capabilities of the system 110, for example, as an alternative user interface access or for access through the system 110 to the WAN 225.

A host computer or server like 227 can be any suitable network-connected computer, tablet, mobile device or the like programmed to implement desired network-side functionalities. Such a device may have any appropriate data communication interface to link to the WAN 225. Alternatively or in addition, a host computer or server similar to 227 may be operated at the premises 21 and utilize the same networking media that implements data network 223 directly and/or via an additional communication interface such as wireless interface 115W in lighting device 111B.

The user terminal equipment such as that shown at 229 may be implemented with any suitable processing device that can communicate and offer a suitable user interface. The terminal 229, for example, is shown as a desktop computer with a wired link into the WAN 225. However, other terminal types, such as laptop computers, notebook computers, netbook computers, and smartphones may serve as the user terminal computers. Also, although shown as communicating via a wired link from the WAN 225, such a user terminal device may also or alternatively use wireless or optical media; and such a device may be operated at the premises 221 and utilize the same networking media that implements data network 223 directly and/or via an additional communication interface such as wireless interface 115W in lighting device 111B.

For various reasons, the communications capabilities provided at the premises 221 may also support communications of the lighting system elements with user terminal devices, control panels, standalone sensors and/or computers (not shown) within the premises 221. The user terminal devices and/or computers within the premises may use communications interfaces and communications protocols of any type(s) compatible with the on-premises networking technology of the system 110. Such communication with a user terminal, for example, may allow a person in one part of the premises 221 to communicate with a lighting device 111 in another area of the premises 221, to obtain data therefrom and/or to control lighting or other system operations in the other area.

The external elements, represented generally by the server/host computer 227 and the user terminal device 229, which may communicate with the intelligent elements of the system 110 at the premises 221, may be used by various entities and/or for various purposes in relation to operation of the lighting system 110 and/or to provide information or other services to users within the premises 221, e.g. via the interactive user interface portal offered by the lighting devices 111.

Returning now to the lighting devices 111, in the example of the system 110, at least one of the lighting devices 111 includes a user input sensor configured to detect user activity related to user inputs without requiring physical contact of the user; and at least one of the lighting devices 111 includes an output component configured to provide information output to the user. The drawings show several different examples of these input/output elements.

By contrast, some of the lighting devices 111 may not have user interface related elements. In the example of system 110 in FIG. 18A, each of the lighting devices 111A includes a light source 113, a communication interface 115 linked to the network 223 and a processor 117 coupled to control the light source 113 and to communicate via the interface 115 and the link to network 223. Such devices 111A may include lighting related sensors (not shown), such as occupancy sensors or ambient light color or level sensors; but the intelligent lighting devices 111A do not include any user interface components, for user input or for output to a user (other than control of the respective light source 113). The processors of devices 111A are configured (e.g. programmed in our example) to control lighting operations, for example, to control the light sources 113 of such devices 111A in response to commands received via the network 223 and the interfaces 115. The processors of devices 111A are also configured, for example, with the machine learning algorithm 1205 of FIG. 13 such that the processors of devices 111A learn from the controlled lighting operations.

Figure 18B:
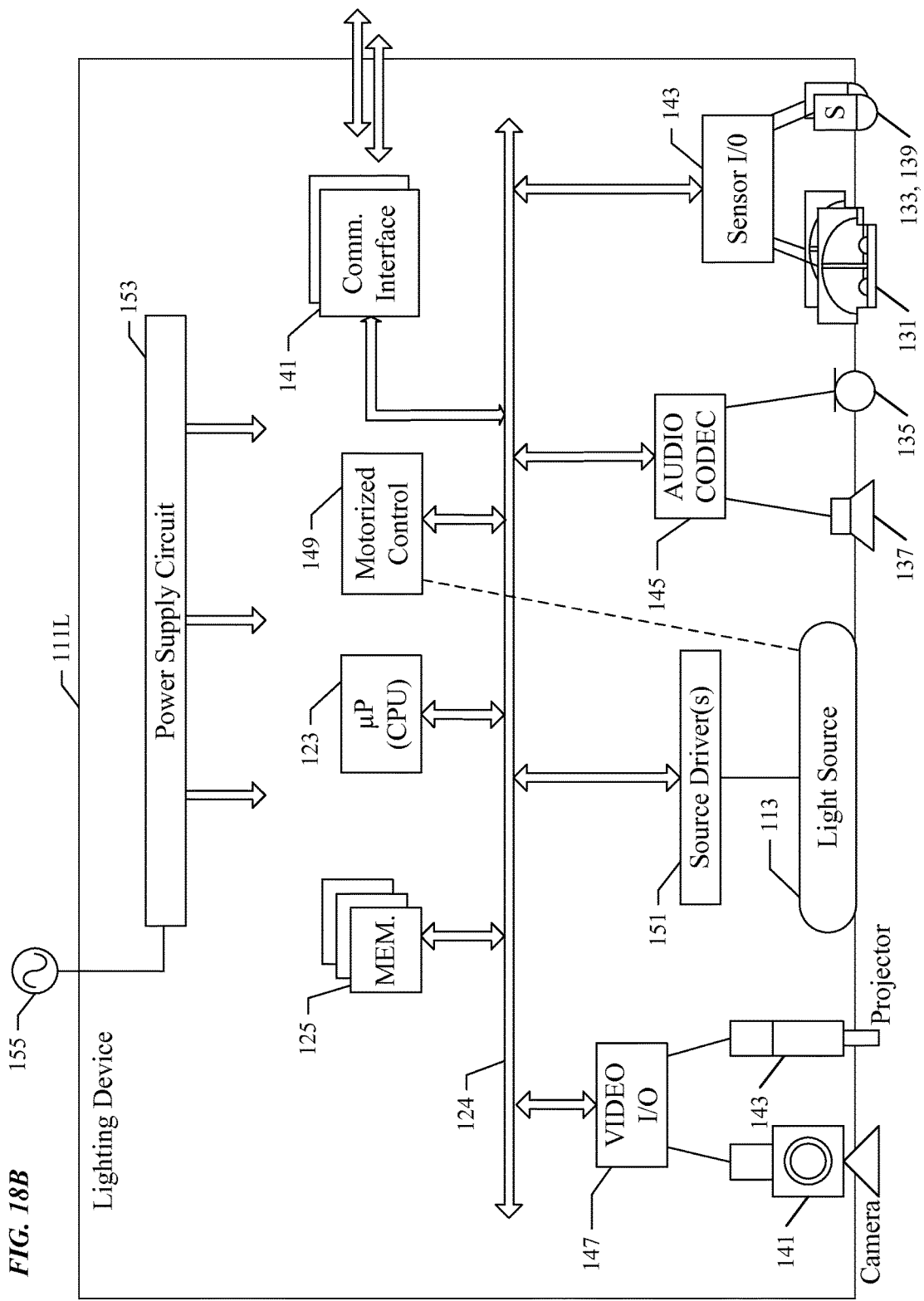
FIG. 18B is a functional block diagram of an example of an intelligent lighting device that may be used in the system of FIG. 18A.

For purposes of discussion, the drawing (FIG. 18A) shows three examples of lighting devices 111B, 111C and 111D that have one or more user interface components. Although three examples are shown, it is envisaged that still other types of interface components and/or arrangements thereof in various lighting devices may be used in any particular implementation of a system like the system 110 of FIG. 18A; and the later more detailed example of FIG. 18B shows a device that incorporates a combination of several different user input and output components. Furthermore, although the examples depict user interface components integrated within lighting device 111, such interface components may alternatively and/or additionally be implemented as standalone elements of or within other devices of system 110 and communications via the network(s), as discussed further below. Any one lighting device that includes components to support the interactive user interface functionality of the system 110 may include an input sensor type user interface component, an output type user interface component, or a combination of one or more input sensor type user interface components with one or more output type user interface components.

Although the various sensors are referred to generally as user input sensors and may include any combination of user interface components, such user input and/or user interface need not necessarily require direct user activity or direct interactivity with the light device 111. As described in greater detail below, the user activity referred to herein may be user interaction directly with the lighting device 111 intended to control a lighting function (e.g., the user deliberately intends to turn the light off or otherwise change a light or other control setting and gestures to the device to effect such change), the user activity may be interaction directly with other aspects of the space and indirectly with the lighting device 111 for control purposes (e.g., the user interacts with a terminal device within the space and the lighting device 111, based on task recognition and learned user preferences, adjusts operations accordingly), and/or the user activity may somewhat unintentionally interact with, and thus indirectly control, the lighting device 111 and/or system 110 (e.g., the user intentionally drinks a cup of tea when the user typically drinks a cup of coffee, unintentionally indicating a different mood of the user to the lighting device 111, which adjusts operations accordingly). An agitated conversation may be deliberate in a general sense, but not intended as a specific command to the system 110 to change a control setting; yet the system 110 may detect the agitated conversation as an indication of mood and respond by adjusting lighting and/or other environmental conditions in the occupied space.

With reference to FIG. 18A, each of some number of intelligent lighting device 111B at the premises 221 includes one or more sensors 131 (two in the illustrated example). The lighting devices 111B can be in one or more rooms or other service areas at the premises 221. In the intelligent lighting devices 111B, each of the sensors 131 is configured for detection of intensity of received light and to support associated signal processing to determine direction of incident light. A particular example of a sensor 131 that can be used as an input device for determining direction and intensity of incident light received by the sensor 131 is a quadrant hemispherical light detector or "QHD" (see e.g. U.S. Pat. Nos. 5,877,490 and 5,914,487). The sensors 131 may detect light in some or all of the visible portion of the spectrum or in other wavelength bands, such as infrared (IR) or ultraviolet (UV). By using two or more such sensors 131 in the same or a different lighting device 111B illuminating the same service area, it is possible to detect position of an illuminated point or object in three-dimensional space relative to known positions of the sensors 131. By detecting position of one or more points over time, it becomes possible to track motion within the area illuminated by the device(s) 111B and monitor for user input by the sensors 131, for example, as a gestural user input or when a user transitions from location for one typical type of task to location for another type of task (e.g., transitioning from reviewing documents on a desk to interacting with a computer on the desk). Detection of rapid motion (e.g., pacing or hand gestures) may provide another technique to detect agitation of the occupant. Although two sensors 131 are shown on one lighting device 111B; there may be more sensors 131 in a lighting device 111B, or there may be a single sensor 131 in each device 111B amongst some number of the lighting devices 111B illuminating a particular service area of the premises 221.

In the example, at least one of the devices 111B also includes a lighting related sensor 133. Although shown in device 111B for purposes of discussion and illustration, such a sensor may be provided in any of the other lighting devices 111, in addition or as an alternative to deployment of the sensor 133 in a lighting device 111B. Examples of such lighting related sensor 133 include occupancy sensors, device output (level or color characteristic) sensors and ambient light (level or color characteristic) sensors. The sensor 133 may provide a condition input for general lighting control, e.g. to turn on-off devices 111 and/or adjust light source outputs. However, the sensor input information from sensor 133 also or alternatively may be used as another form of user input, for example, to refine detection and tracking operations responsive to signals from the sensors 131.

In an example of a user input related function, the signals from the sensors 131 in lighting devices 111B illuminating a particular room within premises 221 are processed to detect gestures of one or more persons/users within the room. The lighting output from sources 113 of the devices 111 illuminating the area may be controlled responsive to the detection of one or more predetermined user input gestures based on user profile(s) and/or a learned control function. Alternatively, or in addition to gestural input, the signals from the sensors 31 are processed to detect a task or other activity of one or more persons/users within the room. The lighting output from sources 113 of the devices 111 illuminating the area may be controlled responsive to the detection of one or more predetermined or learned user input activities or task(s) based on the user's profile and/or learned control function. Although not shown, one or more of the lighting devices 111B may also include a user output component, for example to provide an audio or video output of information to the person or persons in the room.

Such gesture or user activity input together with lighting control and other information output implement a form of interactive user interface. This interface related operation includes selectively controlling a lighting operation of at least some number of the lighting devices as a function of a processed user input. The interface related operation may also include either control of a non-lighting-related function as a function of a processed user input, or an operation to obtain and provide information as a response to a user input as an output via the output component.

In the example of system 110, each of the intelligent lighting devices 111C and/or one or more of the lighting devices 111D in one or more rooms or other service areas of the premises 221 support audio input and audio output, for an audio based user interface functionality. These input components may be provided in different lighting devices 111 than those deploying the output elements. Also, audio user interface components may be provided in different lighting devices 111 than those deploying the video user interface components. For convenience, the audio input and output components and the video input and output components are shown together in each of the intelligent lighting devices 111C, one or more of which may be deployed with other lighting devices in some number of the services areas within premises 221.

Hence, in the example of FIG. 18A, each intelligent lighting device 111C and/or one or more of the lighting devices 111D includes an audio user input sensor such as a microphone 135. Any type of microphone configured to detect audio user input activity, for example, for speech recognition of verbal commands or the like, may be used; and some other types of sensors may be used if they provide adequate response to audio input. Although the audio output may be provided in different devices 11; in the example, each of the intelligent lighting devices 111C or 111D also includes an audio output component such as one or more speakers 137 configured to provide information output to the user. Where the speaker is provided in the same or a different device 111, there may be a single speaker 137 in each such device 111 or there may be some number of speakers in each respective lighting device 111.

The audio input together with lighting control and audio information output implement a form of interactive user interface. Again, the user interface related operation includes selectively controlling a lighting operation of at least some number of the lighting devices 111 as a function of a processed user input. The interface related operation may also include either control of a non-lighting-related function as a function of a processed user input, or an operation to obtain and provide information as a response to a user input as an output via the output component.

Although shown for illustration purposes in the intelligent lighting device 111C, image-based input and/or output components may be provided together or individually in any others of the lighting devices 111 that may be appropriate for a particular installation. Although referred to at times as "video," the image-based input and/or output may utilize still image input or output or may use any appropriate form of motion video input or output. Hence, in the example of system 110, each of several of the intelligent lighting devices 111D in one or more rooms of the premises 221 also supports image input and output for a visual user interface functionality. Although related audio input and audio output could be implemented in other lighting devices, in the example, the devices 111C also have the microphone 135 and the speaker 137 for the audio based user interface functionality outlined above.

For the visual user interface functionality, an intelligent lighting device 111C includes at least one camera 141. The camera 141 could be a still image pickup device controlled to capture some number of images per second, or the camera 41 could be a video camera. By using a number of cameras 141 to capture images of a given service area, it is possible to process the image data to detect and track user movement in the area, for example, to identify user input gestures or when a user transitions from one task to another task (e.g., transitioning from reviewing documents on a desk to interacting with a computer on the desk) in addition to or as an alternative to processing of inputs via sensors 31. The multiple cameras 141 could be in a single lighting device 111C or could be provided individually in two or more of the lighting devices that illuminate a particular room or other service area. The image capture may also support identification of particular individuals, e.g. via processing of images for face recognition, and associated customization of gesture recognition and/or user responsive system operations.

The visual output component in the lighting device 111C is a projector 143, such as a pico projector, in this example. The visual output component may take other forms, such as an integral display as part of or in addition to the light source. Returning to the example of FIG. 18A, the projector 143 can present information in a visual format, for example, as a projection on a table or a desk top or a wall or the floor. Although shown in the same device 111C as the camera 141, the projector 143 may be in a different intelligent lighting device 111. Also, the projector may be provided in a device 111 in an area that does not utilize a camera 141 for the user input sensor. For example, the projector 143 may be in a device or in a service area with another device 111 that utilizes a microphone (135) or the like as an audio sensor for spoken user input in an area that may also use sensors such as 131 in one or more devices 111B to detect gestural inputs or other user activity or task(s).

The combination of image-based input together with lighting control and image-based and/or audio information output implement a form of interactive user interface. Again, the user interface related operation includes selectively controlling a lighting operation of at least some number of the lighting devices 11 as a function of a processed user input based on the user's profile and/or learned control function. The interface related operation may also include either control of a non-lighting-related function as a function of a processed user input, or an operation to obtain and provide information as a response to a user input as an output via the output component.

In the example, one or more of the processors 117 in the lighting devices 111 are configured to process user inputs detected by the user input sensor(s), such as the visual sensors 131, 133, 141, microphone(s) 135 and/or light sensors 133. Of course, other non-contact sensing technologies may be used (e.g. ultrasound) instead of or in combination with the input sensors discussed above. The processing of sensed user inputs, including for learning and profile based control, may relate to and control operations of the lighting devices 111 in one or more areas of the premises 221. For example, the processing may detect spoken commands and/or relevant gestural inputs or other direct and indirect inputs from a user and, based on the learning algorithm and/or user profile, control lighting devices 111 in an area in which the user currently is located. For example, the resulting output control signals may serve to turn lights ON/OFF, to raise or lower lighting intensity, to change a color characteristic of any tunable lighting devices 111 and/or various combinations of such changes. As other examples, state changes responsive to the resulting outputs may include changes of any one or any combination of: light distribution shape, spectral content (without changing color), aperture and/or fixture shape/size, fixture aim, color and/or luminance uniformity across fixture output, etc. Changes in light output(s) in response to detected user inputs may also produce a repeating pattern or other sequence of changes in any one or more of the examples or still other lighting related parameters, e.g., so as to convey information or direct attention or to provide a desired variable lighting effect (such as a variable color 'light show' or mood lighting). Changes in the lighting in the occupied area of premises 221 in response to such sensed user inputs would provide the user with a visual cue as part of the interactive user interface functionality. The user inputs also may be processed to control lighting devices 11 serving other areas of the premises 221.

In addition to lighting control functions, such as mentioned here by way of example, one or more processors 117 in the intelligent lighting devices 111 may be configured to process direct and/or indirect user inputs so as to enable the system 110 to obtain and present requested information to a user at the premises 221 and/or obtain requested or otherwise relevant information about the user for use and/or processing by system 110, some element within system 10, and/or some other element or device at the premises 221. By way of an example of such additional operations, the system 110 may also enable use of the lighting devices 111 to form an interactive user interface portal, for access to other resources at the premises 221 (e.g., on users computers in other rooms at the premises) and/or access to outside network resources such as on server 227 or a remote terminal 229 (e.g. via the WAN 225). Alternatively, or in addition, such obtained information may also be processed as user inputs by one or more processors 117 in the intelligent lighting devices 111 to control a lighting function. For example, as described in greater detail below, one or more processors 117 may access an on-line service to which a user is subscribed, such as might be hosted on server 227 (e.g., Facebook™, Twitter™, etc.), and determine an on-line status corresponding to the subscribed user. In this example, such on-line status may be processed as an additional user input to enhance the interactive user interface functionality.

In the example, one or more of the memories 119 store the user inputs detected by the user input sensor(s) as data set 1203 of the learning system 100 and one or more of the processors 117 in the intelligent lighting devices 111 are configured to implement the machine learning algorithm 1205 of the learning system 100. In this way, the intelligent lighting devices 111 learn, for example, from the various user inputs detected by the user input sensor(s) and the one or more processors 117 may incorporate such learning into the operations of the system 110 to implement a lighting control function.

Although shown for illustration purposes in the intelligent lighting device 111D, any one or more of the lighting devices 111 may include a sensor 139 for detecting operation of the lighting source 113 within the respective device 111. Such a sensor 139 may sense a temperature of the source 113 or of other component(s) of the device 111D, or a sensor 139 may sense an optical output of the source 113 (e.g. level or color characteristic). The sensor 139 essentially provides feedback as to the state of the source 113 or other component(s) of the device 111D, which may be used as part of the general control of the lighting device(s) 111. By way of an example, where the performance of the source may have an effect on sensing of user inputs, e.g. when a device 111B or 111C in a particular service area optically detects gestures or other visual user inputs, source related feedback from sensor 139 may be used to adjust output of the source 113 in one or more of the devices illuminating the area in a manner intended to assist in the detection of the visual user input (e.g. to ensure adequate illumination for gesture detection).

In a system such as system 110 of FIG. 18A, the lighting devices 111 incorporate the elements and provide processing to support an interactive user interface, for example, that need not require the user to touch or otherwise physically contact an element of the system. The user also need not have or operate a separate device, such as a smartphone or other portable terminal device. The lighting devices themselves implement the interactive user interface to the lighting system, and the user interacts with the lighting system, either intentionally or unintentionally, via the lighting devices 111. Furthermore, such interactive user interface is not based solely on intentional user interaction directly with the lighting system. As described above and in greater detail below, the various sensors 131, 133, 135, and 141 may capture, as user inputs, other user activity, either intentional or unintentional and involving either direct interaction with the lighting system for control of the lighting system or indirect interaction through other objects and/or occupants within the space illuminated by the lighting system. In addition, the lighting system may acquire user inputs from external sources, such as the user's status for an on-line service (e.g., Facebook™, Twitter™, etc.), and, based on these user inputs from external sources, modify the operation of the lighting system. The lighting system, for example, also learns from these current user inputs as well as a collection of prior user inputs to modify the operation of the lighting system via implementation of learning system 100 of FIG. 13, as described in greater detail below.

The user interface through the lighting device is given by way of example. The system 110, however, may also include or support communications for other elements or devices at the premises 221, some of which may even offer alternative user interface capabilities instead of or in addition to the interactive user interface supported by the lighting devices 111. For example, the intelligence (e.g. processor 117 and memory 119) and the communications interface(s) 115 may be implemented in other elements or devices (i.e. control panel) of system 110. Additionally, standalone sensors of the lighting system that are interconnected to the data communication network of the system may perform sensing functions analogous to those of sensors 131, 133, 135, 137, 139, 141 and/or 143 in the system 110. See, for example, U.S. application Ser. No. 13/903,330, Filed May 28, 2013 entitled "LIGHTING NETWORK WITH AUTONOMOUS COMMISSIONING", and U.S. application Ser. No. 13/964,564, Filed Aug. 12, 2013 entitled "LIGHTING ELEMENT-CENTRIC NETWORK OF NETWORKS", both of which are entirely incorporated by reference.

The system 110 of FIG. 18A may also support wireless communication to other types of equipment or devices at the premises 221, to allow such other equipment or devices to use the network 223 and/or to communicate with the lighting devices 111. By way of example, present drawing FIG. 18A therefore shows one of the lighting devices including a wireless communication interface 115W, for such a purpose. Although shown in 111B, such an interface 115W may instead or in addition be provided in any of the other lighting devices 111 in the system 110. Of note for purposes of the present discussion of user interface techniques, the wireless link offered by the wireless communication interface 115W allows the system 110 to communicate with other user interface elements at the premises 221 that are not included within lighting devices 111 but which may be used in addition or as a supplement to the lighting device-centric user interface that is otherwise the focus of the present discussion. Although there may be any of a wide range of such other types of user interface elements at any given premises 221, the drawing shows two examples, a remote control 247 as an additional input device and a television or monitor 249 as an additional output device. The wireless link(s) to devices like 247 and 249 may be optical, sonic (e.g. speech), ultrasonic or radio frequency, by way of a few examples.

Any of the various system elements may be implemented using a PC like approach based on any known or available microprocessor architecture, such as a Reduced instruction set computing (RISC) using an ARM architecture, as commonly used today in mobile devices and other portable electronic devices, or a microprocessor architecture more commonly used in computers such as an instruction set architecture (ISA), like those used in Intel microprocessors and the like. The microprocessor based approaches are discussed by way of examples, with respect to FIG. 18B; however, other processor implementations may be used, such as based on a Peripheral Interface Controller (PIC) or other microcontroller architecture. Alternative intelligent architectures for the intelligence of the devices, however, will still include appropriate communication interfaces and couplings for light sources and may include other standardized ports for connections of sensors, user input/output devices, etc.

Turning now to the example of FIG. 18B, the drawing depicts an implementation of an intelligent lighting device 111L using a microprocessor centric architecture. The device 111L is illustrated as an example of one of the devices 111 as may be used in an overall lighting system like system 110 of FIG. 18A. A similar arrangement of lighting device 111L, however, may be deployed as an independent/standalone luminaire without reliance on other devices or elements of a premises-wide system 110.

At a high level, the fixture or other type of lighting device includes a light source, a power supply circuit coupled to a power source, a processor, one or more memories and a communication interface; and the device will often include one or more sensors. The user interface components may be separate from the lighting device. The example 111L incorporates elements for a non-contact user interface portal. To act as a portal, the lighting device will also have one or more standard interface ports for attachment of elements for providing the desired type of user interface. Each port may be for a hardwired connection to any compatible accessory or may provide a wireless link (e.g. WiFi, Zigbee or Bluetooth) for the accessory.

As an example of an implementation of the processors 117, discussed above relative to FIG. 18A, the more detailed example of the lighting device 111L includes a microprocessor (µP) 123, which serves as the programmable central processing unit (CPU) of the lighting device 111L. The µP 123, for example, may be a type of device similar to microprocessors used in servers, in personal computers or in tablet computers, or in smartphones, or in other general purpose computerized devices. Although the drawing shows a single µP 123, for convenience, the lighting device 111L may use a multi-processor architecture. The µP 123 in the example is of a type configured to communicate data at relatively high speeds via one or more standardized interface buses, represented generally by the bus/arrow 124.

The lighting device 111L includes one or more storage devices, which are accessible by the µP 123 via the bus 124. Although the lighting device 111L could include a hard disk drive or other type of disk drive type storage device, in the example, the device 11L includes one or more memories 125. Typical examples of memories 125 include read only memory (ROM), random access memory (RAM), flash memory and the like. In this example, the memory or memories 125 store executable programming for the µP 123, such as programming implementing the machine learning algorithm 1205 of learning system 100, as well as data, such as data set 1203 of learning system 100, for processing by or resulting from processing of the µP 123.

As in earlier examples, the intelligent lighting device 111L includes a light source 113. The source 113 may take the form of an existing fixture or other luminaire coupled to the other device components, or the source 113 may be an incorporated source, e.g. as might be used in a new design or installation. The source 113 may be any type of source that is suitable to the illumination application (e.g. task lighting, broad area lighting, object or personnel illumination, information luminance, etc.) desired for the space or area in which the particular device 111L is or will be operated which offers desired light output control capabilities (e.g. dimming, color control etc.). Although the source 113 in the device 111L may be any suitable type of light source, many such devices will utilize the most modern and efficient sources available, such as solid state light sources, e.g. LED type light sources. To support color control, the device may include some number of LEDs of each of two or more different color characteristics operated via independently controllable driver channels.

Power is supplied to the light source 113 by an appropriate driver 151. The source driver 151 may be a simple switch controlled by the processor of the device 111L, for example, if the source 113 is an incandescent bulb or the like that can be driven directly from the AC current. Power for the lighting device 111L is provided by a power supply circuit 153 which supplies appropriate voltage(s)/current(s) to the source driver 151 to power the light source 113 as well as to the components of the device 111L. In the example, the power supply circuit 153 receives electricity from alternating current (AC) mains 155, although the lighting device may be driven by a battery or other power source for a particular application. Although not shown, the device 111L may have or connect to a back-up battery or other back-up power source to supply power for some period of time in the event of an interruption of power from the AC mains 155.

The source driver circuit 151 receives a control signal as an input from the processor 123 of the device 111L, to at least turn the source 113 ON/OFF. Depending on the particular type of source 113 and associated driver 151, the processor input may control other characteristics of the source operation, such as dimming of the light output, pulsing of the light output to/from different intensity levels, color characteristics of the light output, etc. If the source and/or driver circuit have the capability, the driver circuit 151 may also provide some information back as to the operation of the light source 113, e.g. to advise the processor 123 of the actual current operating state of the source 113.

The lighting device 111L also includes one or more communication interfaces 142. The communication interfaces at least include an interface configured to provide two way data communication for the µP (and thus for the device 111L) via the network 223. In the example of FIG. 18B, each communication interface 142 is of a type having a bus interface to enable the interface 142 to communicate internally with the µP 123 via the bus 124. The interface 142 that provides the communication link to the data communications network 223 enables the µP 123 to send and receive digital data communications through the particular network 223. As outlined earlier, the network 223 may be wired (e.g. metallic or optical fiber), wireless (e.g. radio frequency or free space optical), sonic or ultrasonic, or a combination of such network technologies; and the interface 142 to that network 223 in a particular installation of the device 111L will correspond to the most advantageous network available (based on considerations such as cost and bandwidth) at the location of the installation. Some devices 111L may include multiple interfaces to the network 223; and or some devices 111L may include interfaces (analogous to the interface 115W discussed earlier) for communication with other equipment in the vicinity.

The lighting device 111L in this example further includes a motorized control 149. Such motorized control 149 allows the lighting device 111L and/or elements within the lighting device 111L (i.e., light source 113, microphone 135, camera 141, sensors 131, 133, 139, etc.) to be moved and/or adjusted. In one example, the motorized control 149, in response to user input, moves the lighting source 113 back and forth in a swaying fashion, as if to "wave". The control 149 may adjust source 113 orientation to spotlight and follow a user as the user moves about a room, as another example. In still another example, the motorized control 149 moves camera 141 so as to track the movement of an occupant through the space.

A device like 111A in the FIG. 18A example may have just the components of device 111L discussed to this point in our more detailed example. However, for implementations of devices like 111B to 111C in the FIG. 18A example, the device 111L may have one or more user input sensors configured to detect user activity related to user inputs and/or one or more output components configured to provide information output to the user. Although the input and output elements and/or such elements of different types, for convenience, the device 111L shown in FIG. 18B includes both input and output components as well as examples of several types of such components.

In the example, the intelligent lighting device 111L includes a number of optical sensors, including one of more of the sensors 131 configured for detection of intensity of received light and to support associated signal processing to determine direction of incident light. The intelligent lighting device 111L in this example also includes another type light sensor, such as a sensor 133 or 139. Although only one circuit 143 is shown for convenience, the device 111L will include appropriate input/output interfaces to operate and receive signals from the applicable sensors 131, 133 and 139 included in the particular implementation of the device 111L.

A sensor such as 131, 133 or 139 typically includes one or more physical condition detectors, which form the actual device that is responsive to the particular condition to be sensed. The detector(s) may receive a drive signal; and in response to the sensed condition, the detector(s) produces one or more signals having a characteristic (e.g. voltage magnitude, current or frequency) that is directly related to a characteristic level of the sensed condition. A sensor such as 131, 133 or 139 also includes a detector interface circuit that provides any drive signal that may be needed by the particular device type of physical condition detector. The detector interface circuit also processes the output signal from the detector to produce a corresponding output, in a standardized format.

The sensor I/O circuit 143 in turn provides the input and output interface to couple the particular sensor(s) 131, 133 or 139 with the other components of the intelligent lighting device 111L. On the side logically facing the bus and processor, the sensor I/O circuitry 143 in the illustrated architecture provides a bus interface that enables the μP 123 to communicate with the respective I/O interface circuit 143 via the bus 124. A port for coupling the circuit 143 to the bus 124 may be in accordance with a standard, such as USB. Although not shown, the sensor I/O circuit 143 may fit a standard interface port on the board forming the 'brain' and communication portion of the device 111L; and/or the sensor I/O circuit 143 may provide physical and electrical connections as well as a protocol for the interface with the applicable sensor such as 131, 133 or 139 in accordance with a standard, to allow use of sensors by different manufacturers.

The description of the sensors and I/O circuitry are given by way of example, and actual implementations may use somewhat different arrangements. For example, the detector interface circuit referred to above as part of the sensor may be incorporated in the applicable sensor I/O circuit 143. Each of the circuit(s) 143 may be configured to provide the electrical interface for one, two or more of the respective sensors via the associated coupling(s).

In the example, the intelligent lighting device 111L includes a microphone 135, configured to detect audio user input activity, as well as an audio output component such as one or more speakers 137 configured to provide information output to the user. Although other interfaces may be used, the example utilizes a bus connect audio interface circuit that is or includes an audio coder/decoder (CODEC), as shown at 145. The CODEC 145 converts an audio responsive analog signal from the microphone 135 to a digital format and supplies the digital audio to the μP 123 for processing and/or a memory 125 for storage, via the bus 124. The CODEC 145 also receives digitized audio via the bus 124 and converts the digitized audio to an analog signal which the CODEC 145 outputs to drive the speaker 137. Although not shown, one or more amplifiers may be included to amplify the analog signal from the microphone 135 or the analog signal from the CODEC 145 that drives the speaker 137.

In the example, the intelligent lighting device 111L also includes a camera 141, configured to detect visible user input activity, as well as an image (still or video) output component such as a projector 143, configured to provide information output to the user in a visual format. The lighting device will also include appropriate input signal processing circuitry and video driver circuitry, for example, as shown in the form of a video input/output (I/O) circuit 147. The interface(s) to either one or both of the camera 141 and the projector 143 could be analog or digital, depending on the particular type of camera and projector. The video I/O circuit 147 may also provide conversion(s) between image data format(s) used on the bus 124 and by the μP 123 and the data or signal formats used by the camera 141 and the projector 143.

The actual user interface elements, e.g. speaker and/or microphone or camera and/or projector, may be in the lighting device 111L or may be outside the device 111L with some other link to the fixture. If outside the lighting device 111L, the link may be a hard media (wire or fiber) or a wireless media.

The device 111L as discussed above and shown in the drawing includes user interface related components for audio and optical (including image) sensing of user input activities. That intelligent lighting device also includes interface related components for audio and visual output to the user. These capabilities of the device 111L and the system 110 support an interactive user interface through the lighting device(s), for example, to control lighting operations, to control other non-lighting operations at the premises and/or to provide a portal for information access (where the information obtained and provided to the user may come from other equipment at the premises or from network communications with off-premises systems). In addition, the interactive user interface is enhanced via implementation of the learning system 100 of FIG. 13, as described in greater detail below.

For example, the device 111L and/or the system 110 can provide a voice recognition/command type interface via the lighting device and network to obtain information, to access other applications/functions, etc. For example, a user can ask for the system to check his/her calendar and/or the calendar of someone else and can ask the system to schedule a meeting. Furthermore, based on lighting operations during prior meetings and user activity during the scheduled meeting, device 111L and/or the system 110, influenced by learning system 100, may adjust and/or otherwise control lighting operations during the scheduled meeting.

In an initial implementation, the speech is detected and digitized in the lighting device 111L and is processed to determine that the lighting device 111L has received a command or a speech inquiry. For an inquiry, the lighting device 111L sends a parsed representation of the speech through the lighting system 110 (and possibly an external network 225) to a server or the like with full speech recognition capability. The server identifies the words in the speech and initiates the appropriate action, for example, to turn OFF or otherwise control light source 113. The server sends the information back to the lighting device 111L (or possibly to another device) with the appropriate output capability, for presentation to the user as an audible or visual output. Any necessary conversion of the information to speech may be done either at the server or in the lighting device, depending on the processing capacity of the lighting device. As the processing capacity of lighting devices increases, some or all of the functions of the server in this example may be shifted into the lighting devices.

The lighting device 111L and the system 110 may provide similar services in response to gestural inputs, detected via sensors 131, one or more cameras 141 or a combination of sensors and cameras. Also, systems that include both audio and optical input components can respond to combinations of speech and gestural inputs. Systems that include both audio and video output components can present information to the user(s) in various desirable combinations of audio and image or video outputs.

With an approach like that outlined above, the lighting system may support a broad range of applications or functions often performed via other user terminal devices. For example, the user may be able to post to social media, access social media, send messages via mobile message (e.g. text) or instant messaging or email. The system with the interface portal enables the lighting system/service provider or some other operator of the system 110 to offer other services, such as information access and personal communication. The lighting device 111 and/or system 110 may detect when the user enters the area and provide notices to appropriate 'friends' or the like. In addition, as described in greater detail below, the lighting system may also capture this information provided via the interface portal (i.e., social media status update and/or message content), utilize the captured information to learn about the user (e.g., current mood, plans, deadlines, etc.) and modify the operation of the lighting system to reflect the user's current condition and/or situation.

Figure 19:
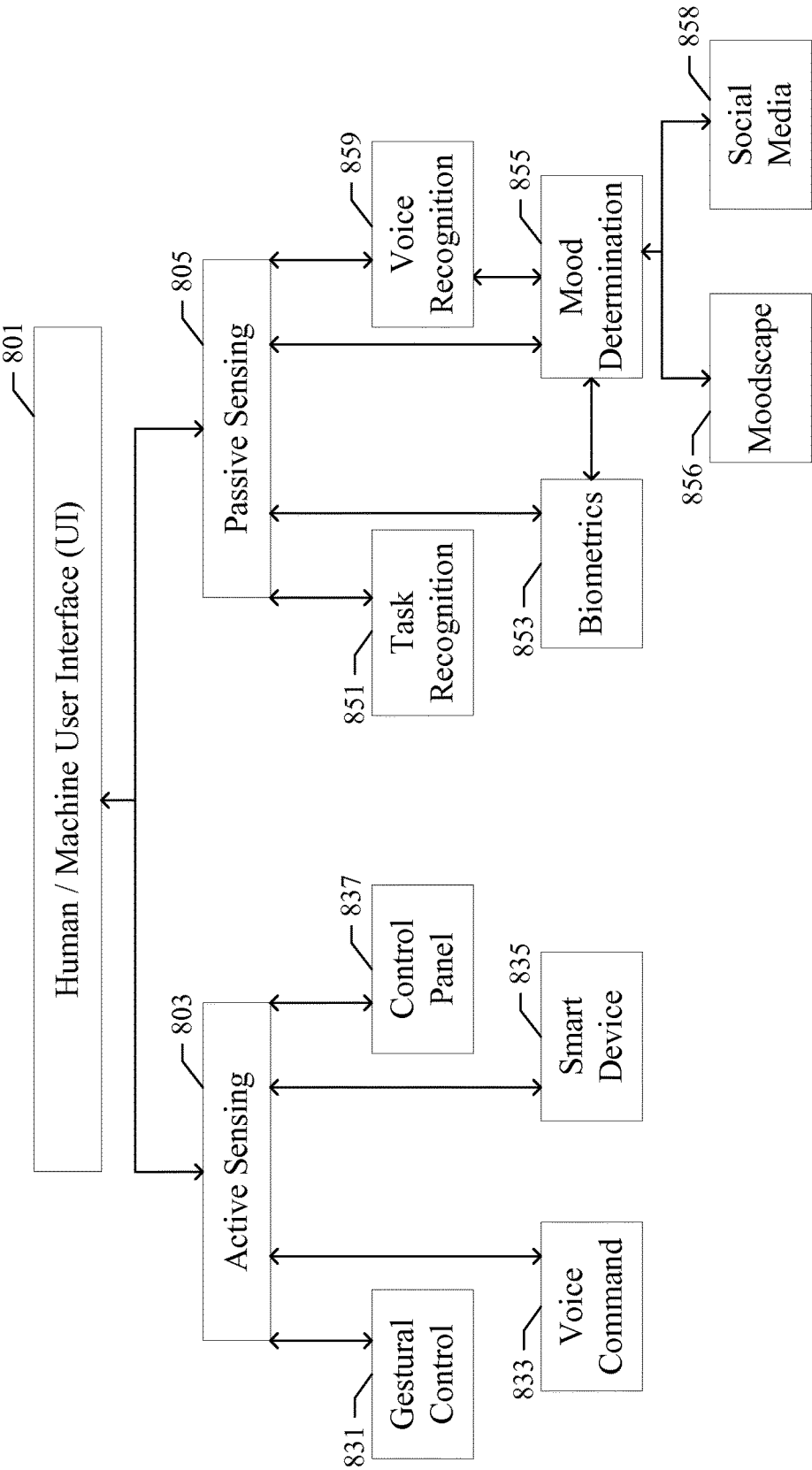
FIG. 19 is a functional block diagram of an example human/machine user interface that may be implemented by the system of FIG. 18A.

The interactive user interface implemented by lighting devices 111 and/or lighting system 110 in conjunction with learning system 100 may generally be referred to as a human/machine user interface. FIG. 19 illustrates a functional block diagram of an example of such human/machine user interface. In the example of FIG. 19, human/machine user interface 801 includes active sensing 803 and passive sensing 805. Active sensing 803 includes, for example, sensing intentional direct user activity such as gestural control 831, voice command 833, control via a smart device 835, and/or control via a control panel 837. Examples of such active sensing 803 were described in greater detail above in relation to FIG. 18A. Passive sensing 805 includes, for example, intentional and/or unintentional indirect user activity and/or user status(es) such as task recognition 851, biometrics 853, mood determination 855 and/or voice recognition 859. Stated another way, active sensing 803 involves lighting device(s) 111 and/or lighting system 110 responding directly to sensed user input (e.g., a voice command to turn a lighting device 111 off) while passive sensing 805 involves lighting device(s) 111 and/or lighting system 110 utilizing intentional and/or unintentional, direct and/or indirect sensed user input as part of a determination related to the user (e.g., voice recognition sensing frustration in a user's voice during a conversation between two occupants of a space). Although some reference to passive sensing 805 was included in the discussion of FIG. 18A, greater detail will be provided here and further below.

Task recognition 851 involves, for example, determining a task being performed by a user. In one example, image sensor 141 of lighting device 111C senses that a user is positioned in front of a user terminal. Based on this sensed input, task recognition 851 would determine that the user is performing a task involving the user terminal. As a result, lighting device 111C may be adjusted to provide a better suited lighting operation for the user while performing this task. Although the sensed input is related to the user and the user is, in this example, intentionally interacting with the user terminal, such intentional user activity is not directed to interaction with lighting device 111C and/or lighting system 110. Thus, task recognition 851 is passively sensing the user's activity, and lighting device 111C and/or lighting system 110 may be adjusted based on this passive sensing. As a further example, when the user transitions to reviewing papers on the desk, sensor 131 might identify the movement triggering image sensor 141 to capture an image of this new activity. Task recognition 851 then utilizes these inputs to identify this new task and further adjust lighting device 111C and/or lighting system 110 to provide a better suited lighting operation for this new task.

Biometrics 853 involves, for example, utilizing physical characteristics in the process of identifying a particular individual. In the example of FIG. 18A, an occupancy sensor such as sensor 133 of lighting device 111B identifies that an occupant has entered a room or space serviced by lighting device 111B. Based on the occupancy sensed by sensor 133, biometrics 853 utilizes, for example, image sensor 141 and microphone 135 of lighting device 111C to determine specific characteristics of the occupant that uniquely identify the occupant (i.e., User A as opposed to User B). This may involve pattern recognition to identify user features, e.g. face recognition or relative user dimensions in comparison to one or more objects in a room, etc. Based on the identification provided by biometrics 853, lighting device(s) 111 and/or lighting system 110 may be adjusted to better suit the preferences of the identified occupant, typically by controlling one or more operations based on a user profile and/or learned preferences via learning system 100.

Voice recognition 859, for example, utilizes acoustics to help identify a particular individual. In this way, voice recognition 859 is similar to and may use or be used by and/or in conjunction with biometrics 853. In addition, voice recognition 859 involves, for example, utilizing acoustical characteristics in the process of identifying the mood and/or actions of one or more occupants within a space. In one example, microphone 135 of lighting device 111C captures the voices of two occupants within a room or space serviced by lighting device 111C. Voice recognition 859, utilizing the captured voices, determines that at least one occupant is agitated and/or that a heated discussion is on-going (e.g., one or both voices are louder than normal). In response, lighting device 111C and/or lighting system 110 may be adjusted to influence and/or mitigate the actions of the occupants, for example, by lowering the intensity and/or changing color of the illumination of the room or other space occupied by the agitated parties.

Mood determination 855 involves, for example, determining the current mood of an individual. As depicted in FIG. 19 by the bi-directional arrows, mood determination 855, for example, utilizes biometrics 853 and/or voice recognition 859 as part of the determination process. Mood determination 855 may also utilize the current moodscape 856 (i.e., lighting and/or other conditions in the space that may impact mood) as well as status updates provided via social media 858. In one example, a lighting device 111 and/or the lighting system 110 identifies an occupant, as previously described, and, based on the identification, utilizes the information portal discussed above to retrieve on-line status updates for the occupant via social media 858. The on-line status updates indicate the occupant is happy and/or generally in a good mood. At the same time, based on conditions sensed by various sensors, the lighting device 111 and/or lighting system 110 determines the current moodscape 856 includes a bright, sunny morning. In addition, voice recognition 859, in this example, determines that the occupant is whistling. In light of this feedback from social media 858, moodscape 856 and voice recognition 859, mood determination 855, for example, determines the occupant is currently experiencing a good mood and lighting device 111 and/or lighting system 110 are adjusted to reinforce this good mood. Intensity or color etc. of the illumination may change and/or the system may change one or more other environmental control(s), e.g. set point temperature and/or blower speed of a heating, ventilation, and air conditioning (HVAC) component.

Figure 20:
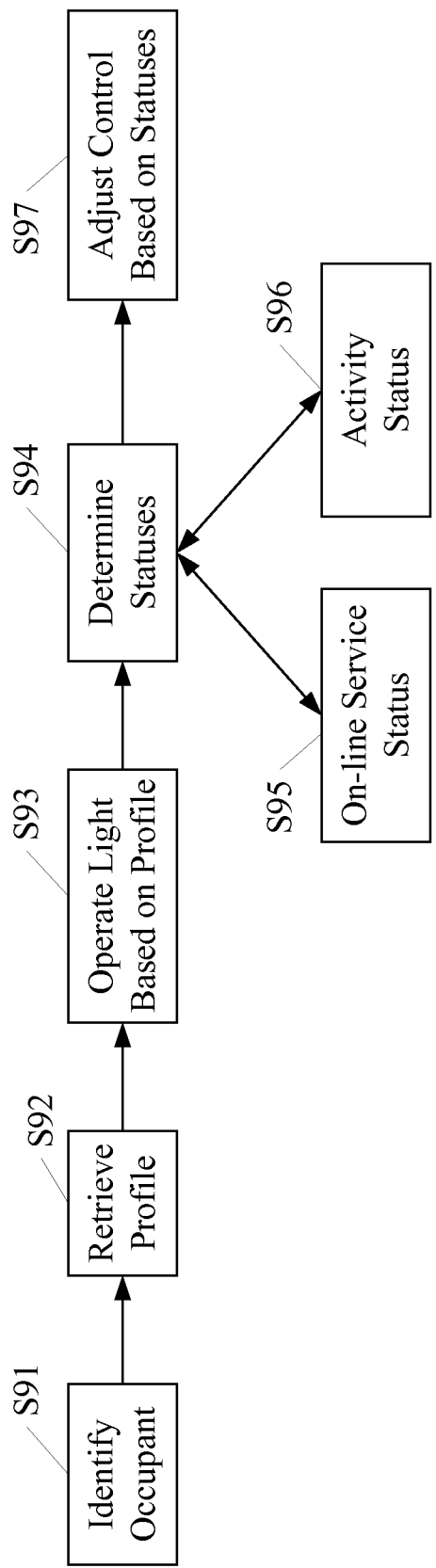
FIG. 20 is a flow chart of an example process to implement lighting with the system of FIG. 18A using the learning system of FIG. 12.

The human/machine user interface 801 utilizes active sensing 803 and passive sensing 805 to implement an enhanced interactive user interface for lighting devices 111 and/or lighting system 110. In addition, incorporation of the learning system 100 further enhances the interactive user interface by allowing the lighting devices 111 and/or lighting system 110 to learn from and adjust operations based upon individual occupants with a room or space. FIG. 20 illustrates an example of a process by which a lighting device 111 and/or a system 110 operate and/or are adjusted based on learning via learning system 100.

In step S91, a lighting device 111 and/or system 110 identifies an occupant of a room or other type of space serviced by one or more lighting devices 111. As described above, such occupant identification is, for example, based on biometrics 853 and/or voice recognition 859 as part of passive sensing 805 of the human/machine user interface 801. Alternatively, or in addition to, such identification may be based on active sensing 803. For example, lighting device 111 and/or system 110 identifies the occupant based on an identifier of the occupant (e.g., pattern on a badge, a smart badge (e.g., RFID), an identifier emitted by a mobile device, etc.) sensed by and/or otherwise obtained by one or more of the various sensors or user input elements.

In step S92, the lighting device 111 and/or system 110 retrieves a profile corresponding to the identified occupant. The profile includes a lighting control function established for the identified occupant. The profile is initially established, for example, as a preset and/or default lighting control function, either by the identified occupant, a manufacturer, an administrator of the lighting system 110 and/or some other individual or entity. Alternatively, or in addition to, the profile is developed or updated over time by learning via the learning system 100, as discussed in greater detail below. The lighting control function defines at least one of a plurality of parameters of visible light to be output by a light source 113 (e.g., level, CCT, etc.). Furthermore, the preset and/or default lighting control function defines a set of standardized responses (i.e., corresponding change to at least one of the plurality of parameters and/or other control of lighting device 111) based upon sensed activity. In step S93, the lighting device 111 and/or lighting system 110 operate the light source 113 in accordance with the lighting control function included in the retrieved profile.

Additionally and/or alternatively, such retrieved profile of step S92 includes an environmental control function corresponding to an environmental condition of the room or other type of space, and corresponding elements of system 110 are operated in step S93 to control the environmental condition in accordance with the environmental control function. For example, if the environmental condition is room temperature, the environmental control function operates one or more HVAC components in setting and maintaining the desired room temperature. As another example, the environmental condition may be the position and/or transparency of electromechanical window blinds or shades and the environmental control function operates the blinds or shades throughout the day.

In step S94, the lighting device 111 and/or lighting system 110 determines at least one status corresponding to the identified occupant of the space. For example, in step S95, lighting device 111 and/or lighting system 110 utilize the information portal to determine a status for the identified occupant with an on-line service. As discussed above, for example, mood determination 855 of passive sensing 805 within the human/machine user interface 801 utilizes social media 858 to determine the status for the identified occupant with the on-line social media service. Alternatively, or in addition to step S95, lighting device 111 and/or lighting system 110, for example, determines an activity for the identified occupant in step S96. As discussed above, the human/machine user interface 801 utilizes, for example, task recognition 851 to determine such identified occupant activity (e.g., interacting with user terminal, reviewing papers, talking on the phone, moving within the space, etc.).

As a result of determining the on-line service and/or activity statuses in step S94, the lighting device 111 and/or lighting system 110 adjusts the lighting control function to control the operation of the light source 113 in step S97. In one example, lighting device 111 and/or lighting system 110 determines that the identified occupant recently posted a status to an on-line service indicating the identified occupant is upset and/or otherwise frustrated. As a result, lighting device 111 and/or lighting system 110 adjusts the control of light source 113 to help reduce and/or alleviate the identified occupant's frustration based on a standardized response defined by the occupant's profile. In another example, lighting device 111 and/or lighting system 110 determines that the identified occupant is conducting a heated telephone conversation. As a result, lighting device 111 and/or lighting system 110 adjusts the control of light source 113 to offset the identified occupant's agitated state, once again based on a standardized response defined by the occupant's profile. In yet another example, lighting device 111 and/or lighting system 110 determines that the identified occupant is conducting the heated telephone conversation after recently posting to an on-line service about being upset and/or otherwise frustrated. As a result, lighting device 111 and/or lighting system 110 adjusts, based on the profile defined response, the control of light source 113 to both help reduce and/or alleviate the identified occupant's frustration and offset the identified occupant's agitated state. In this way, the system 110 discovers or learns "current activity" from and/or about the occupant and responds to such "current activity learning". In each of these examples, the adjustment, although based on "current activity learning", is predefined and/or standardized based on the occupant's profile.

As in steps S92 and S93, step S97 may additionally and/or alternatively adjust an environmental control function based on determining the on-line service and/or activity statuses in step S94. In the electromechanical blinds or shades example, system 110 may determine, based on task recognition 851, that an occupant has placed his or her head on the desk, in which case the system 110 operates the blinds or shades in such a way as to maximize the amount of sunlight entering the room or other type of space and encourage the occupant to return to other work activities. Furthermore, the system 110 also adjusts the control of light source 113 to enhance work lighting. Once again, these responses by system 110 are, for example, predefined by the occupant's profile.

The system in our example 'learns' in two ways. The system learns some current inputs and the system learns how best to respond to current inputs based on a control function 'learned' from historical information. The historical learning may use direct user feedback and/or earlier less direct user inputs. Hence, in the examples, such adjustments in step S97 are based on a determination of one or more current statuses of the identified occupant or "current activity learning" and a predefined and/or standardized response based on the occupant's profile. Alternatively, or in addition to, such adjustments are based, for example, on a determination of one or more current statuses and a determination of one, all, or some combination of prior determined statuses, in particular, prior determined statuses as a result of previous predefined and/or standardized responses. Such "historical or feedback based learning" takes prior determined statuses as a result of prior predefined and/or standardized responses as feedback into the learning system, such as learning system 100.

For example, in the context of FIGS. 13 and 20, learning system 100, as part of step S97, may take as input the determined activity status that the occupant is engaged in a heated telephone conversation (i.e., input 1201A). The learning system 100, further as part of step S97, may also take as input the fact, stored in data set 1203, that, during a previous heated conversation when the color characteristics of light source 113 were changed based on a standardized response (i.e., output 1207K), the conversation continued to remain heated while during a similar conversation when the occupant dimmed the light source 113, the conversation returned to normal tones. As a result, learning system 100, in step S97, may provide an output control signal that adjusts the light source 113 to be dimmed. In this way, the lighting device 111 and/or lighting system 110 receives prior determined statuses (i.e., discovered or learned "current activity" in the past) as feedback that allows the lighting device 111 and/or lighting system 110 to learn and modify the predefined and/or standardized responses based on such learning.

As an additional example of direct feedback, lighting device 111 and/or lighting system 110 is configured to operate in accordance with a preset lighting control function, such as the function described above in relation to FIGS. 14-17 above. Specifically, lighting device 111 and/or lighting system 110 operates some number of light sources 113, for example, in a manner that simulates the rise, traversal, and setting of the sun throughout a standard work day of 9 AM to 5 PM. In this example, however, an occupant's work day begins at 3 PM and continues until midnight. As such, when the system starts to transition the light source 113 into the evening hours, the occupant manually adjusts the light source 113 to reflect the occupant's modified work day. Over time and based on "historical or feedback based learning", lighting device 111 and/or system 110 will begin to operate based on a developed or modified lighting control function taking into account the occupant's manual adjustments and modified work day.

As a further learning example, in the case of the blinds or shades, system 110 may determine, based on previous activity status determinations, that the occupant regularly places his or her head on the desk at a similar time each day and for a similarly regular period of time. In addition, in response to the system 110 opening the shades and raising the lights on previous occasions, the occupant closes the shades and lowers the lights. In response, the system 110 learns that the occupant intends for this regular period of time to be a time of rest. As such, as the initial time approaches, system 10 operates the blinds or shades to minimize the amount of sunlight entering the room or other type of space and adjusts light source 113 to enhance the occupants rest. Then, after the regular period of time, system 110 operates the blinds or shades to maximize sunlight while also adjusting light source 113 to restore optimal working conditions.

That is, the system learns not only the occupants current activity, but also learns the occupant's previous responses to the system's predefined and/or standardized responses to similar previous activity as well as the occupant's previous responses to other conditions and/or situations. Thus, the system 110 learns how to modify the predefined and/or standardized responses in a personalized fashion, thereby developing or learning a modified profile associated with the identified occupant. In this example, the identified occupant previously made one or more manual adjustments to the lighting control function (i.e., increasing the light intensity while reviewing papers) corresponding to the lighting device 111 and/or lighting system 110 determining one or more previous statuses for the identified occupant and making an adjustment based on a standardized response (i.e., system 110 previously decreased the light intensity when task recognition 851 determined the occupant was reviewing papers). Such manual adjustments serve as feedback that the standardized response was not appropriate for this particular occupant. Utilizing learning system 100, as described above, lighting device 111 and/or lighting system 110 learns from the previous manual adjustments and previous determinations to influence the determination of current statuses and/or the adjustments to operations of the light source 113 (i.e., system 110 now increases the light intensity when task recognition 851 determines this occupant is reviewing papers). As such, the adjustments are a result of the current determined statuses, the current determined statuses influenced by previously determined statuses, and/or similar user adjustments in similar situations. In this way, the system 110 utilizes "historical or feedback based learning" to develop a modified profile for an identified occupant. In addition, system 110 utilizes this modified profile or "historical or feedback based learning" to respond to "current activity learning" of the identified occupant.

Figure 21:
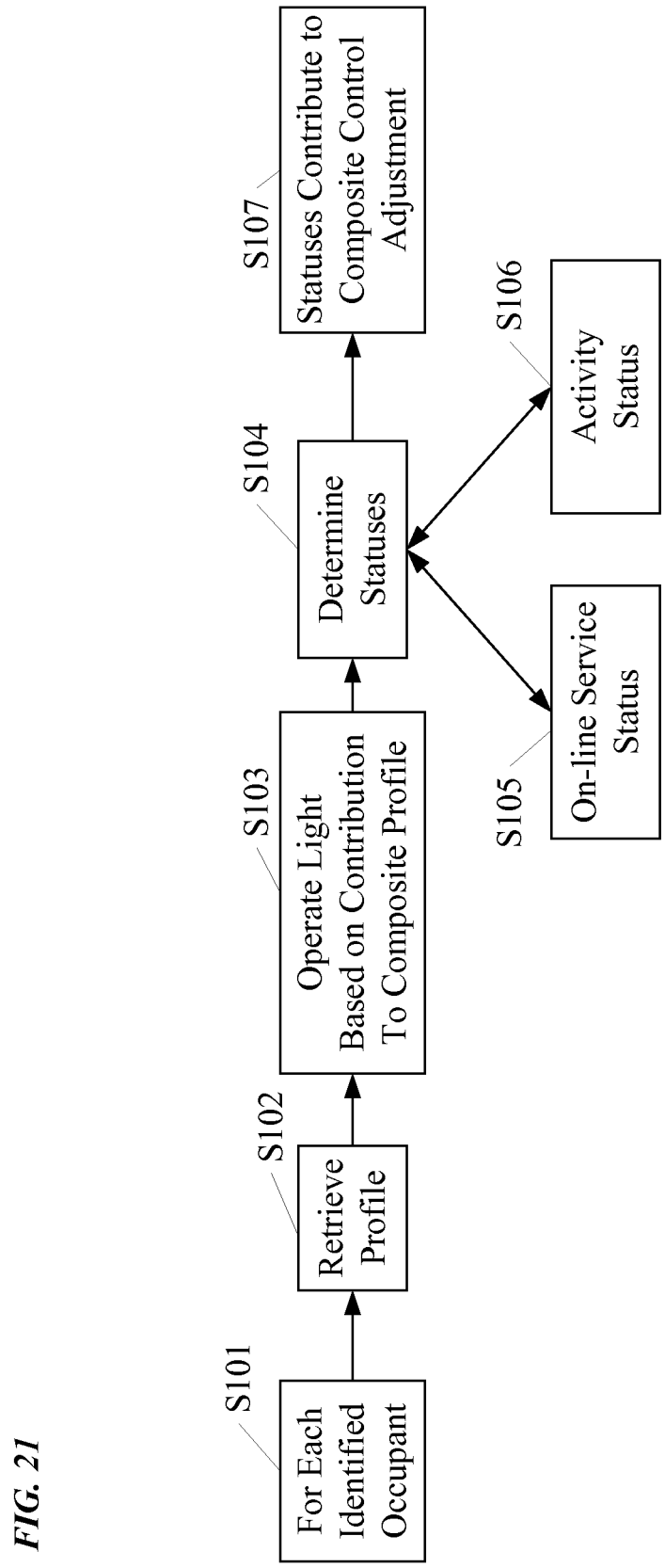
FIG. 21 is a flow chart of another example process to implement lighting with the system of FIG. 18A using the learning system of FIG. 12.

While FIG. 20 depicts an example of a process involving a single identified occupant, FIG. 21 illustrates an example of a process involving multiple identified occupants for use by the lighting device 111 and/or lighting system 110.

In step S101, a lighting device 111 and/or lighting system 110 identifies occupants, similar to step S91 of FIG. 20. In some situations, lighting device 111 and/or lighting system 110 is able to identify all of the occupants. In other situations, lighting device 111 and/or lighting system 110 may only identify one or more of the occupants. For each of the identified occupants in step S101, lighting device 111 and/or lighting system 110 retrieves a profile, established for the identified occupant, including a lighting control function in step S102.

Although not shown, a default profile, including a default lighting control function, is retrieved, for example, for any unidentified occupant. Furthermore, as with FIG. 20, any profile may additionally and/or alternatively include an environmental control function and lighting device 111 and/or lighting system 110 may operate and/or adjust one or more elements to control an environmental condition of the room or other type of space. For simplicity, however, the following examples only refer to a lighting control function and operation and/or adjustment of the light source 113.

In step S103, operation of the light source 113 is controlled based on the contribution each retrieved profile makes to a composite profile. For example, each profile contains a weight corresponding to how the retrieved profile contributes to the composite profile. The weight may be a single weight corresponding to the profile as a whole or the weight may comprise individual weights corresponding to individual parameters of visible light output controlled by the lighting control function (e.g., level has a corresponding weight, CCT has a corresponding weight, etc.). In some situations, the profile comprises a corresponding weight for each parameter controlled by the lighting control function. In other situations, the profile only comprises a corresponding weight for those parameters controlled by the lighting control function that differ from a default value. In still other situations, the lighting control function only comprises those parameters for which the lighting control function controls the parameter in variance to some default and the profile comprises weights for all of those parameters or only some subset of those parameters.

In one example, the retrieved profile with the highest (or lowest) weight controls and the composite profile is the retrieved profile with such weight. In another example, each retrieved profile contributes to the composite profile proportionally based on the corresponding weight. In such an example, a weighted utility function may be utilized to maximize or minimize the corresponding contribution of each retrieved profile.

Utility is an economic term generally referring to the total satisfaction received from consuming a good or service. A utility function represents a consumer's preference for an individual item in relation to a collection of items. Thus, utility functions are utilized in modeling or theory. In one example, the lighting device 111 and/or lighting system 110 develops a utility function, or preference relation, for each identified occupant. That is, based on the "historical learning" of learning system 100, lighting device 111 and/or lighting system 110 determines each identified occupant's preferences for the various parameters controlled by the lighting control function included in that identified occupant's profile. Further in the example, the lighting device 111 and/or lighting system 110 develops a composite utility function, or composite preference relation, that incorporates the utility function of each identified occupant and the weight corresponding to each identified occupant's profile (i.e., $U=f(U1, U2, \ldots, k1, k2)$). Finally, lighting device 111 and/or lighting system 110 maximizes or minimizes the composite utility function in order to determine a corresponding lighting control parameter value that incorporates the weighted preferences of each identified occupant (e.g., if the corresponding parameter is CCT, an optimal U will minimize the root mean square (RMS) between the actual value and the weighted preferences of each identified occupant).

In step S104, lighting device 111 and/or lighting system 110 determine statuses for each identified occupant, similar to step S94 of FIG. 20. In step S105, an on-line service status is determined for each identified occupant, if available, and an activity status is determined, in step S106, for each identified occupant, if available. As a result of determining one or more statuses for each identified occupant, lighting device 111 and/or lighting system 110, in step S107, performs a composite adjustment. Such composite adjustment is based, similar to step S103, on a contribution by each identified occupant and/or corresponding profile.

Like the example of FIG. 20, the process example of FIG. 21 may utilize the learning system 100 such that lighting control operations and adjustments are performed based on learning from some combination of current and/or previous operations and/or adjustments. Although not explicitly shown, such learning influences, for example, current operations and adjustments as well as future operations and adjustments.

Figure 22:
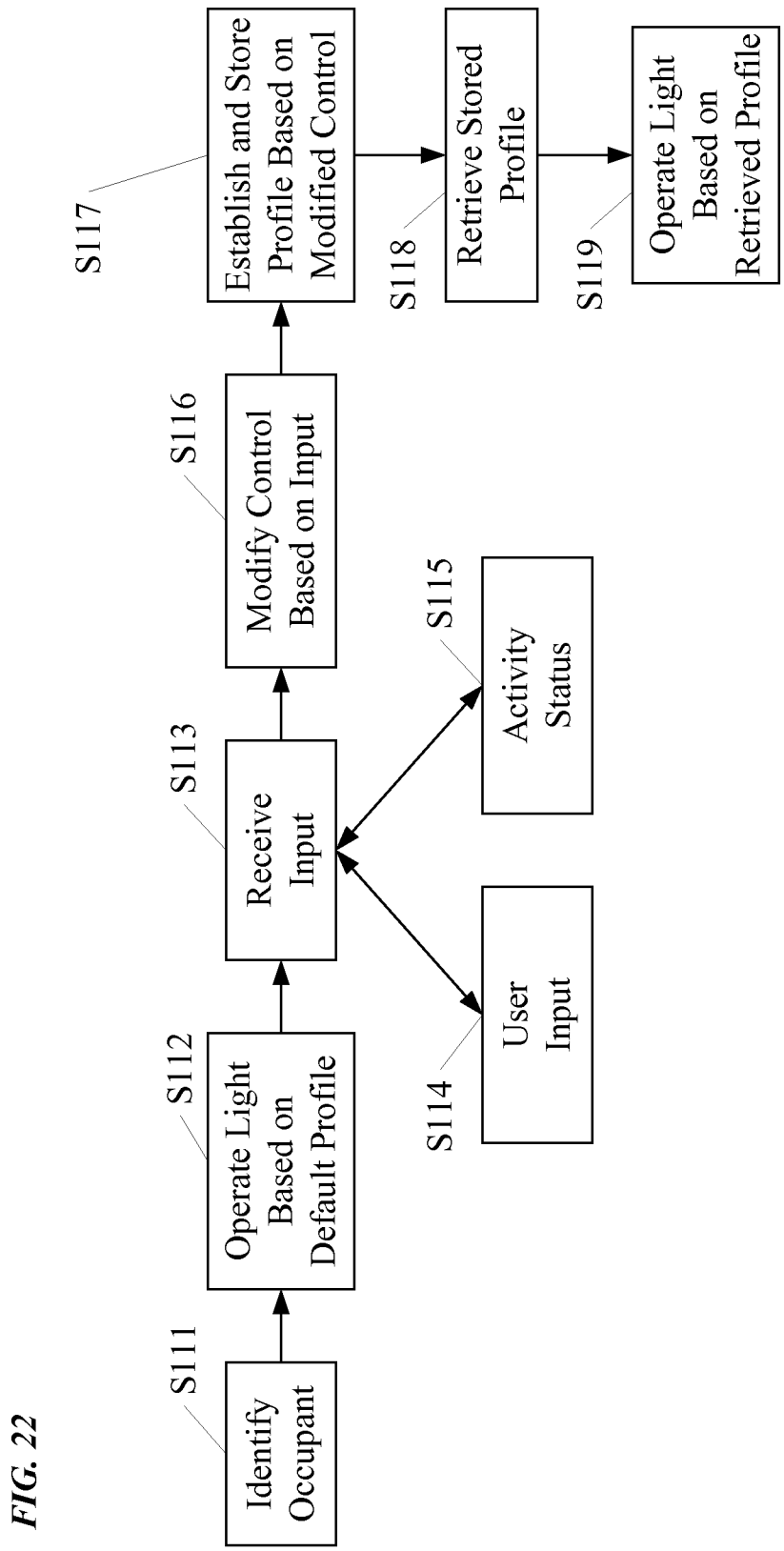
FIG. 22 is a flow chart of still another example process to implement lighting with the system of FIG. 18A using the learning system of FIG. 12.

FIGS. 20-21 depict examples of processes whereby an established lighting control function is implemented and adjusted based on determined statuses of one or more identified occupants. FIG. 22 illustrates an example process whereby a lighting control function is initially established and adjusted based on learning.

In step S111, a lighting device 111 and/or lighting system 110 identifies an occupant of a room or space serviced by lighting device 111. As discussed above, such identification is, for example, via passive sensing 805 and/or active sensing 803. In step S112, a light source 113 is operated based on a default profile. In step S113, input is received by the lighting device 111 and/or lighting system 110. In one example, the user provides an input in step S114. Such user input is one of a gestural control 831, a voice command 833, control via a smart device 835 and/or control via a control panel 837 as part of active sensing 803 discussed in greater detail above. In another example, the lighting device 111 and/or lighting system 110 utilizes passive sensing 805 to determine an activity status in step S115. In this example, lighting device 111 and/or lighting system 110 utilizes task recognition 851, voice recognition 859 and/or some other passive sensing to determine an activity for the identified occupant.

Based on the received input in step S113, operation of the light source 113 is modified in step S116. In step S117, a profile corresponding to the identified occupant and the received input is established and stored. That is, the profile is established based on learning implemented via learning system 100 by the lighting device 111 and/or lighting system 110. Such learning is based on current user input, in step S114, and/or current determined activity status, in step S115. As discussed above, such learning, in some situations, is also based on past user input and/or past user activity. In step S118, the stored profile is retrieved and, in step S119, light source 113 is operated based on the retrieved profile. As such, a profile is developed based on learning by the lighting device 111 and/or lighting system 110 and the learned profile is retrieved in order to operate a light source 113 in accordance with the learned profile.

The discussion above has outlined the structure and configuration of lighting devices 111 and systems 110 of such devices as well as several techniques for implementing an interactive user interface that relies on information retrieval as well as user inputs and learned behavior, including functions to adapt chaotic control to a particular occupant and/or learned preferences or the like. The user interface could be implemented via processing by as few as one of the lighting devices 111. However, many installations will take advantage of processing by a substantial number of the intelligent lighting devices 111. For complex operations, such as processing of audio or optical inputs to detect speech or gestural user inputs respectively, it may also be advantageous to perform some or all of the relevant processing using a distributed processing technique.

Figure 25:
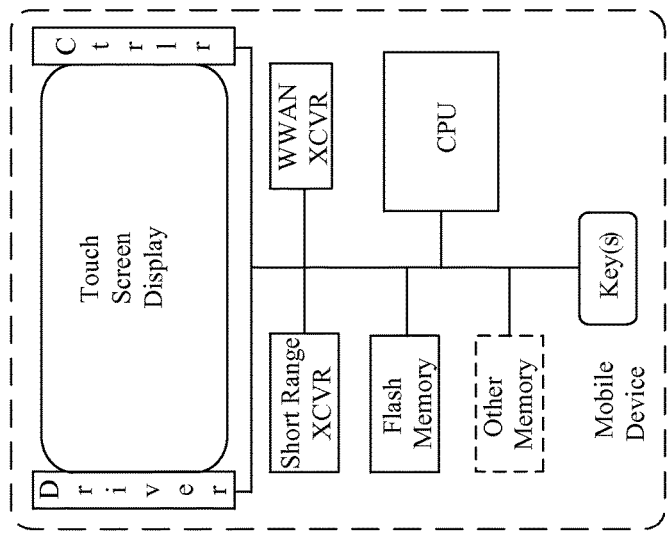
FIG. 25 is a simplified functional block diagram of a mobile device, as an alternate example of a user terminal device, for possible communication in or with the system of FIG. 18A.
Figure 24:
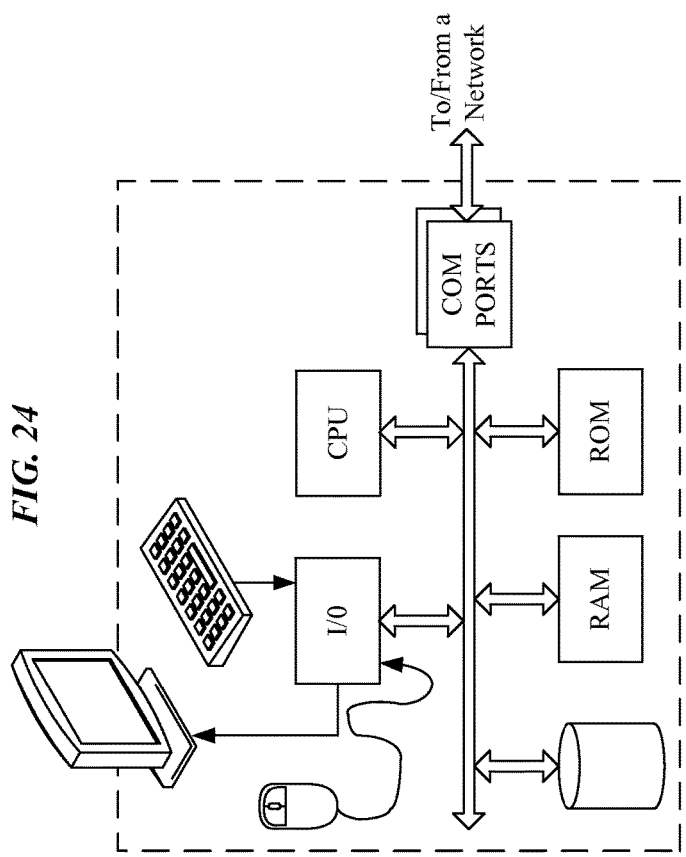
FIG. 24 is a simplified functional block diagram of a personal computer or other user terminal device, which may be used as the remote access terminal, in the system of FIG. 18A.
Figure 23:
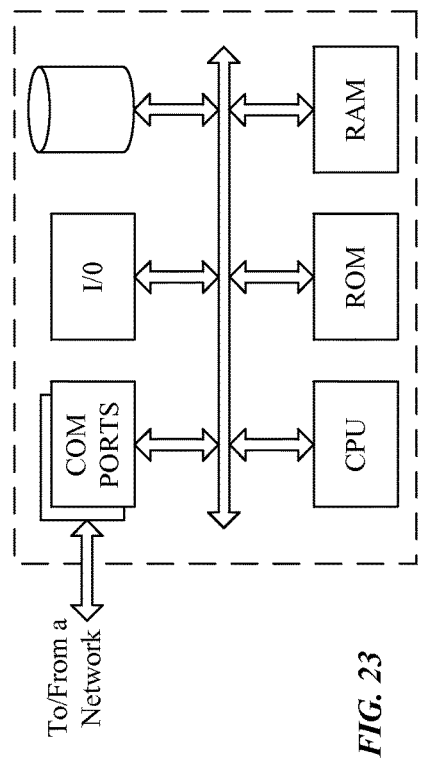
FIG. 23 is a is a simplified functional block diagram of a computer that may be configured as a host or server, for example, to function as the external server or a server if provided at the premises in the system of FIG. 18A.

As shown by the above discussion, at least some functions of devices associated or in communication with the networked lighting system 110 of FIG. 18A, such as elements shown at 227 and 229 (and/or similar equipment not shown but located at the premises 221), may be implemented with general purpose computers or other general purpose user terminal devices, although special purpose devices may be used. FIGS. 23-25 provide functional block diagram illustrations of exemplary general purpose hardware platforms.

FIG. 23 illustrates a network or host computer platform, as may typically be used to implement a host or server, such the computer 227. FIG. 24 depicts a computer with user interface elements, as may be used to implement a personal computer or other type of work station or terminal device, such as the terminal 229 in FIG. 18A, although the computer of FIG. 24 may also act as a server if appropriately programmed. The block diagram of a hardware platform of FIG. 25 represents an example of a mobile device, such as a tablet computer, smartphone or the like with a network interface to a wireless link, which may alternatively serve as a user terminal device like 229. It is believed that those skilled in the art are familiar with the structure, programming and general operation of such computer equipment and as a result the drawings should be self-explanatory.

A computer configured as a server (see e.g. FIG. 23), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs (see FIG. 24). A mobile device (see FIG. 25) type user terminal may include similar elements, but will typically use smaller components that also require less power, to facilitate implementation in a portable form factor. The example of FIG. 25 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer hardware platform of FIG. 23 and the terminal computer platform of FIG. 24 are shown by way of example as using a RAM type main memory and a hard disk drive for mass storage of data and programming, whereas the mobile device of FIG. 25 includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 24). The mobile device example in FIG. 25 touchscreen type display, where the display is controlled by a display driver, and user touching of the screen is detected by a touch sense controller (Ctrlr). The hardware elements, operating systems and programming languages of such computer and/or mobile user terminal devices also are conventional in nature, and it is presumed that those skilled in the art are adequately familiar therewith.

Although FIGS. 23-25 in their present form show computers and user terminal devices, generally similar configurations also may be used within other elements of the lighting system 110. For example, one implementation of the brain, communication and interface elements of a lighting device may utilize an architecture similar to that of one of the computers or mobile terminals. As a more specific example, the personal computer type hardware in FIG. 24 (except for the keyboard, mouse and display) could serve as the brain and communication elements of a lighting device, where the input/output interface I/O would interface to an appropriate light driver and to any sensor(s) or other enhancement input or output device(s) included within the lighting device.

If provided on the system 110, additional system elements, such as a standalone sensor or an additional user interface device, they may be similarly implemented using an architecture like one of the devices of FIGS. 23-25. For example, an additional other user interface device (UI) might utilize an arrangement similar to the mobile device of FIG. 25, albeit possibly with only one transceiver compatible with the networking technology of the particular premises (e.g. to reduce costs).

As also outlined above, aspects of the interactive user interface and any associated control and/or learning techniques of the lighting devices 111 may be embodied in programming of the appropriate system elements, particularly for the processors of intelligent lighting devices 111. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a management server or host computer of the lighting system service provider (e.g. implemented like the server computer shown at 227) into any of the lighting devices, etc. of or coupled to the system 110 at the premises 221, including programming for individual element functions, programming for user interface functions and programming for distributed processing functions. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

For information about additional examples of white lighting fixtures and associated controllers that may be programmed or otherwise configured in accordance with the discussion herein, attention may be directed to U.S. Utility patent application Ser. No. 13/218,148, Filed Aug. 25, 2011, entitled "TUNABLE WHITE LUMINAIRE," U.S. Pat. No. 8,760,074, the disclosure of which is entirely incorporated herein by reference.

The concepts outlined above are susceptible to a wide range of variation within the general range of the exemplary teachings herein. As an example of variants of the concepts outlined above, the user interface provided in the occupied/illuminated space may offer a greater degree of individual control. The specific examples described earlier provided ON/OFF and/or dimming type examples. The interface may also allow control of color characteristic(s) of the illumination in the space. Also, for some installations, it may be preferable to provide control over the chaotic function variations. For example, an occupant in one room may prefer less variation in lighting than an occupant in another room. Hence, the user interface might allow occupants in each of the rooms to individually control the chaotic function related variations in the different rooms.

As noted earlier, the technologies discussed in the examples may be applied to control lighting of spaces intended for other biological occupants in addition to or instead of humans. Examples of application with respect to other biological life forms include lighting applications for plants and animals, aquatic life forms, insects, etc. The lighting may help to increase growth and yield. As another example, the lighting may also help to contain animals or drive away animals or insects.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A system, comprising:
   a processor;
   a source of light, the source of light being configured to output visible light in a manner permitting control of a plurality of parameters of the visible light output, responsive to control by the processor;
   a storage device accessible by the processor; and
   a program in the storage device, wherein execution of the program by the processor configures the system to implement functions, including functions to:
   identify an occupant within a space;
   retrieve a profile of the identified occupant, the profile including a lighting control function established for the identified occupant to control operation of the light source so as to vary at least one parameter of the visible light output within the space over a period of time at least in part in accordance with a chaotic function, the chaotic function comprising a mathematical expression; and
   operate the light source to illuminate the space while the identified occupant is in the space, including control of at least one of the plurality of parameters of the visible light output in accordance with the lighting control function established for the identified occupant.

2. The system of claim 1, wherein:
   the system is configured to control an environmental condition in the space; and
   the retrieved profile includes a control function established for the identified occupant with respect to the environmental condition to include varying the environmental condition over a period of time at least in part in accordance with a chaotic function.

3. The system of claim 2, wherein execution of the program by the processor, configures the system to implement further functions, including functions to:
   control the environmental condition in accordance with the environmental control function established for the identified occupant; and
   based on at least one of the determined statuses of the identified occupant, adjust the control of the environmental condition.

4. The system of claim 1, further comprising:
   a sensor configured to detect a condition in the space illuminated by the system, the condition relating to an activity of the occupant when within the space, and to provide a condition responsive input to the processor; and
   a data communication interface, controlled by the processor, configured for communication of data from and to the system over a network,
   wherein further execution of the program by the processor configures the system to implement further functions, including functions to:

access information about the identified occupant from an on-line service, via communication over the network, to determine a status of the identified occupant for the on-line service;

process the condition responsive signal from the sensor to determine an activity status of the identified occupant while in the space; and based on at least one of the determined statuses of the identified occupant, adjust the control of the at least one of the plurality of parameters of the visible light output in accordance with the lighting control function established for the identified occupant.

5. The system of claim 4, further comprising a learning module configured to implement the function to adjust the control of the at least one of the plurality of parameters of the visible light output based upon previously determined statuses in response to previous light source operation or control adjustment as well as corresponding previous states of the chaotic function.

6. The system of claim 5, wherein:

the learning module comprises a neural network;

the neural network receives the currently determined statuses, the current state of the chaotic function, the previously determined statuses, and corresponding previous states of the chaotic function as input;

the neural network produces a status weight corresponding to each of the currently determined statuses based on the previously determined statuses;

the neural network produces a chaotic state weight corresponding to the current state of the chaotic function based on the corresponding previous states of the chaotic function; and the function to adjust the control of the at least one of the plurality of parameters of the visible light output is based on at least one of the currently determined statuses and corresponding status weight as well as the current state of the chaotic function and chaotic state weight.

7. The system of claim 5, wherein the learning module is further configured to implement the function to adjust the control of the at least one of the plurality of parameters of the visible light output by changing the chaotic function to a different chaotic function, based upon previously determined statuses in response to previous light source operation or control adjustment as well as corresponding previous states of the chaotic function.

8. The system of claim 5, wherein the learning module is further configured to implement the function to adjust the control of the at least one of the plurality of parameters of the visible light output by changing at least one parameter of the chaotic function, based upon previously determined statuses in response to previous light source operation or control adjustment as well as corresponding previous states of the chaotic function.

9. The system of claim 4, further comprising a learning module configured to implement the function to adjust the control of the at least one of the plurality of parameters of the visible light output based upon previously determined statuses in response to previous light source operation or control adjustment as well as corresponding previous states of the chaotic function in combination with corresponding previous states of a nominal function.

10. The system of claim 9, wherein:

the learning module comprises a neural network;

the neural network receives the currently determined statuses, the current state of the chaotic function, the current state of the nominal function, the previously determined statuses, corresponding previous states of the chaotic function, and corresponding previous states of the nominal function as input;

the neural network produces a status weight corresponding to each of the currently determined statuses based on the previously determined statuses;

the neural network produces a chaotic state weight corresponding to the current state of the chaotic function based on the corresponding previous states of the chaotic function;

the neural network produces a nominal state weight corresponding to the current state of the nominal function based on the corresponding previous states of the nominal function; and the function to adjust the control of the at least one of the plurality of parameters of the visible light output is based on at least one of the currently determined statuses and corresponding status weight as well as the current state of the chaotic function and chaotic state weight in combination with the current state of the nominal function and nominal state weight.

11. The system of claim 9, wherein the learning module is further configured to implement the function to adjust the control of the at least one of the plurality of parameters of the visible light output by changing at least one of the chaotic function or the nominal function to a different function, based upon previously determined statuses in response to previous light source operation or control adjustment as well as corresponding previous states of the chaotic function in combination with corresponding previous states of a nominal function.

12. The system of claim 9, wherein the learning module is further configured to implement the function to adjust the control of the at least one of the plurality of parameters of the visible light output by changing at least one parameter of the chaotic function and the nominal function, based upon previously determined statuses in response to previous light source operation or control adjustment as well as corresponding previous states of the chaotic function in combination with corresponding previous states of a nominal function.

13. The system of claim 1, wherein the at least one of the plurality of parameters of the visible light output includes one or more light parameters selected from the group consisting of: intensity of light, spectral content of light, polarization of light, color temperature of light, and chromaticity difference (Delta uv) of light from the Planckian locus.

14. A system, comprising:

a processor;

a source of light, the source of light being configured to output visible light in a manner permitting control of a plurality of parameters of the visible light output, responsive to control by the processor;

a sensor configured to detect a condition in a space illuminated by the system, the condition relating to an activity of at least one of a plurality of occupants when the occupants are within the space, and to provide a condition responsive input to the processor;

a data communication interface, controlled by the processor, configured for communication of data from and to the system over a network;

a storage device accessible by the processor; and a program in the storage device, wherein execution of the program by the processor configures the system to implement functions, including functions to:

identify at least one of the plurality of occupants;

for each identified occupant:
retrieve a profile of the identified occupant, the profile including a lighting control function established for the identified occupant to control operation of the light source so as to vary at least one parameter of the visible light output within the space over a period of time at least in part in accordance with a chaotic function, the chaotic function comprising a mathematical expression;
determine a control setting for at least one of the plurality of parameters of the visible light output from the lighting control function established for the identified occupant;
access information about the identified occupant from an on-line service, via communication over the network, to determine a status of the identified occupant for the on-line service;
process the condition responsive signal from the sensor to determine an activity status of the identified occupant while in the space; and
based on at least one of the determined statuses of the identified occupant, adjust the control setting of the at least one of the plurality of parameters of the visible light output in the lighting control function established for the identified occupant; and
operate the light source and adjust the control of the at least one of the plurality of parameters of the visible light output in accordance with a composite lighting control function based on each identified occupant's contribution to a composite operation of the light source and a composite adjustment to the control setting of the at least one of the plurality of parameters of the visible light output in accordance with each identified occupant's adjusted lighting control function.

15. The system of claim 14, further comprising a learning module configured to, based on previously determined statuses, previous operations, previous adjustments, previous contributions and previous states of the chaotic function, influence the contribution of each identified occupant to the composite lighting control function.

16. The system of claim 14, further comprising a learning module configured to, based on previously determined statuses, previous operations, previous adjustments, previous contributions and previous states of the chaotic function in combination with previous states of a nominal function, influence the contribution of each identified occupant to the composite lighting control function.

17. A system, comprising:
a processor;
a source of light, the source of light being configured to output visible light in a manner permitting control of a plurality of parameters of the visible light output, responsive to control by the processor;
a sensor configured to detect a condition in a space illuminated by the system, the condition relating to an activity of an occupant when within the space, and to provide a condition responsive input to the processor;
a user input element, for providing user input for processing to the processor;
a storage device accessible by the processor;
a program in the storage device, wherein execution of the program by the processor configures the system to implement functions, including functions to:
identify a user as the occupant of the space illuminated by the system;
operate the light source to illuminate the space while the identified occupant is in the space, including control of at least one of the plurality of parameters of the visible light output in accordance with a predetermined lighting control function to include varying at least one parameter of the visible light output within the space over a period of time at least in part in accordance with a chaotic function, the chaotic function comprising a mathematical expression;
while illuminating the space, receive an input from at least one of:
the identified occupant representing a desired change of at least one of the parameters of the visible light output via the user input element; or
the sensor representing an activity status of the identified occupant while in the space based upon the condition responsive input to the processor;
modify the predetermined lighting control function responsive to the received input in accordance with the received input;
store the modified lighting control function, including the chaotic function, in association with an identification of the occupant in the storage device, as a profile established for the identified occupant;
while the identified occupant is in the space, use the identification of the occupant to retrieve the stored profile; and
use the retrieved profile to operate the light source to illuminate the space while the identified occupant is in the space, including control of at least one of the plurality of parameters of the visible light output in accordance with the modified lighting control function to include varying at least one parameter of the visible light output within the space over a period of time at least in part in accordance with the chaotic function.

18. The system of claim 17, wherein the user input element is at least one of:
a control panel responsive to tactile input;
a capacitive sensor;
a microphone responsive to audio input;
a camera or image sensor responsive to motion; and
programming in the storage device responsive to user input via a computer, a tablet, a smartphone or other electronic device.

19. The system of claim 18, wherein the user input element is integral to the space illuminated by the system.

20. The system of claim 17, wherein:
the user input element is an application executing on a tablet, a smartphone or other electronic device; and
the application communicates with the processor over a network via a data communication interface of the system.

21. The system of claim 17, wherein the sensor is configured to detect, as the condition, one or more conditions selected from the group consisting of:
an image of the space;
audio within the space;
motion of the occupant within the space; and
light from the occupant within the space.

22. The system of claim 17, further comprising a learning module configured to implement the function to modify the predetermined lighting control function responsive to the received input based upon previously received inputs as well as corresponding previous states of the chaotic function.

23. The system of claim 22, wherein:
the learning module comprises a neural network;

the neural network receives the received input, a current state of the chaotic function, previously received inputs and corresponding previous states of the chaotic function;

the neural network produces a received input weight corresponding to the received input based on the previously received inputs;

the neural network produces a chaotic state weight corresponding to the current state of the chaotic function based on the corresponding previous states of the chaotic function; and the function to modify the predetermined lighting control function responsive to the received input is based on the received input and corresponding received input weight as well as the current state of the chaotic function and chaotic state weight.

24. The system of claim 22, wherein the learning module is further configured to implement the function to modify the predetermined lighting control function responsive to the received input by changing the chaotic function to a different chaotic function, based upon previously received inputs as well as corresponding previous states of the chaotic function.

25. The system of claim 22, wherein the learning module if further configured to implement the function to modify the predetermined lighting control function responsive to the received input by changing at least one parameter of the chaotic function, based upon previously received inputs as well as corresponding previous states of the chaotic function.

26. The system of claim 17, further comprising a learning module configured to implement the function to modify the predetermined lighting control function responsive to the received input based upon previously received inputs as well as corresponding previous states of the chaotic function in combination with corresponding previous states of a nominal function.

27. The system of claim 26, wherein:
the learning module comprises a neural network;
the neural network receives the received input, a current state of the chaotic function, previously received inputs and corresponding previous states of the chaotic function;

the neural network produces a received input weight corresponding to the received input based on the previously received inputs;

the neural network produces a chaotic state weight corresponding to the current state of the chaotic function based on the corresponding previous states of the chaotic function;

the neural network produces a nominal state weight corresponding to the current state of the nominal function based on the corresponding previous states of the nominal function; and the function to modify the predetermined lighting control function responsive to the received input is based on the received input and corresponding received input weight as well as the current state of the chaotic function and chaotic state weight in combination with the current state of the nominal function and nominal state weight.

28. The system of claim 26, wherein the learning module if further configured to implement the function to modify the predetermined lighting control function responsive to the received input by changing at least one of the chaotic function and the nominal function to a different function, based upon previously received inputs as well as corresponding previous states of the chaotic function in combination with corresponding previous states of a nominal function.

29. The system of claim 26, wherein the learning module if further configured to implement the function to modify the predetermined lighting control function responsive to the received input by changing at least one parameter of the chaotic function or the nominal function, based upon previously received inputs as well as corresponding previous states of the chaotic function in combination with corresponding previous states of a nominal function.

30. The system of claim 17, wherein the at least one of the plurality of parameters of the visible light output includes one or more light parameters selected from the group consisting of: intensity of light, spectral content of light, polarization of light, color temperature of light, and chromaticity difference (Delta uv) of light from the Planckian locus.

* * * * *